United States Patent [19]

Trujillo

[11] 4,225,924

[45] Sep. 30, 1980

[54] MANUAL-ENTRY SEMI-AUTOMATIC ELECTRONIC BOWLING SCORER

[76] Inventor: Vito A. Trujillo, 2940 Braun Ct., Golden, Colo. 80401

[21] Appl. No.: 937,999

[22] Filed: Aug. 30, 1978

[51] Int. Cl.$^2$ .......................... A63D 5/04; G06F 15/44
[52] U.S. Cl. .................................... 364/411; 273/54 C
[58] Field of Search ...................... 364/411; 273/54 C; 340/323 B

[56] References Cited

U.S. PATENT DOCUMENTS

| | | | |
|---|---|---|---|
| Re. 28,503 | 8/1975 | Townsend et al. | 273/54 C |
| 3,375,352 | 3/1968 | House et al | 364/411 |
| 3,550,939 | 12/1970 | Walker | 364/411 X |
| 3,858,198 | 12/1974 | Ross | 273/54 C X |
| 4,092,727 | 5/1978 | Warner | 340/323 B X |

OTHER PUBLICATIONS

Mason, "Automatic Score Keeper for Bowling" *IBM Tech. Disclosure Bulletin*, vol. 19 No. 5, Oct. '76, pp. 1556–1557.

Primary Examiner—David H. Malzahn

[57] ABSTRACT

Disclosed herein is a manual-entry electronic bowling scorer utilizing keyboard console. The console has a minimum number of data entry keys for supplying scoring data to a pair of individual CRT scoring displays, associated with a pair of adjacent lanes, and includes CRT instruction displays for indicating the desired sequence of data entry to be made through the keyboard. The video generation circuits for the scoring displays include separate border and character memories enabling a wide variety of scoring formats to be entered on such displays, and a single display control module controls the pair of scoring displays and the instruction displays by the use of two-port memories in the video generation circuits.

33 Claims, 112 Drawing Figures

Fig. 3.

| | 1 | 2 | 3 | 4 | 5 | 6 | 7 | 8 | 9 | 10 | | | | |
|---|---|---|---|---|---|---|---|---|---|---|---|---|---|---|
| MARTHA | X | 9/ | 5/ | 7/ | 5/ | 9/ | | | | | | | | |
| 1 | | 9 | 53 | 71 | 51 | 9/ | | | | | | | | |
| RANDY | 19 | 28 | 36 | 43 | 62 | 72 | | | | | | | | |
| 154 | | | | | | | | | | | | | | |
| B | 6/ | 6/ | 6/ | 6/ | 6/ | 5/ | | | | | | | | |
| LUCY | 16 | 32 | 48 | 61 | 79 | 89 | | | | | | | | |
| C | 54 | 7F | C9- | 64 | X | 62 | | | | | | | | |
| 3 | | | | 9- | 52 | 60 | | | | | | | | |
| HOWARD | 9 | 16 | 25 | 34 | 52 | 60 | | | | | | | | |
| | 8F | 18 | 3/ | C8/ | 5/ | X | | | | | | | | |
| P | | | | | | | | | | | | | | |
| 162 | | | | | | | | | | | | | | |
| TOM | 8 | 17 | 35 | 44 | 53 | | | | | | | | | |
| C | 8/ | P2/ | 6F/ | 5/ | X | | | | | | | | | |
| 5 | | | | | | 6 | | | | | | | | |
| 27 | | | | | | | | | | | | | | |
| KAREN | 9 | 25 | 31 | 38 | 54 | 60 | | | | | | | | |
| | | | | | | | | | | | | | | |
| | | | | | | | | | | | | | | |
| | | | | | | | | | | | | * | | 378 |
| C126 | 1. 963 | | 13 | | | 1467 | + | 125 | | | | -1 | | -52 |
| 832 | 2. 504 | ALLEY CATS | | | | | | | | | | | | |

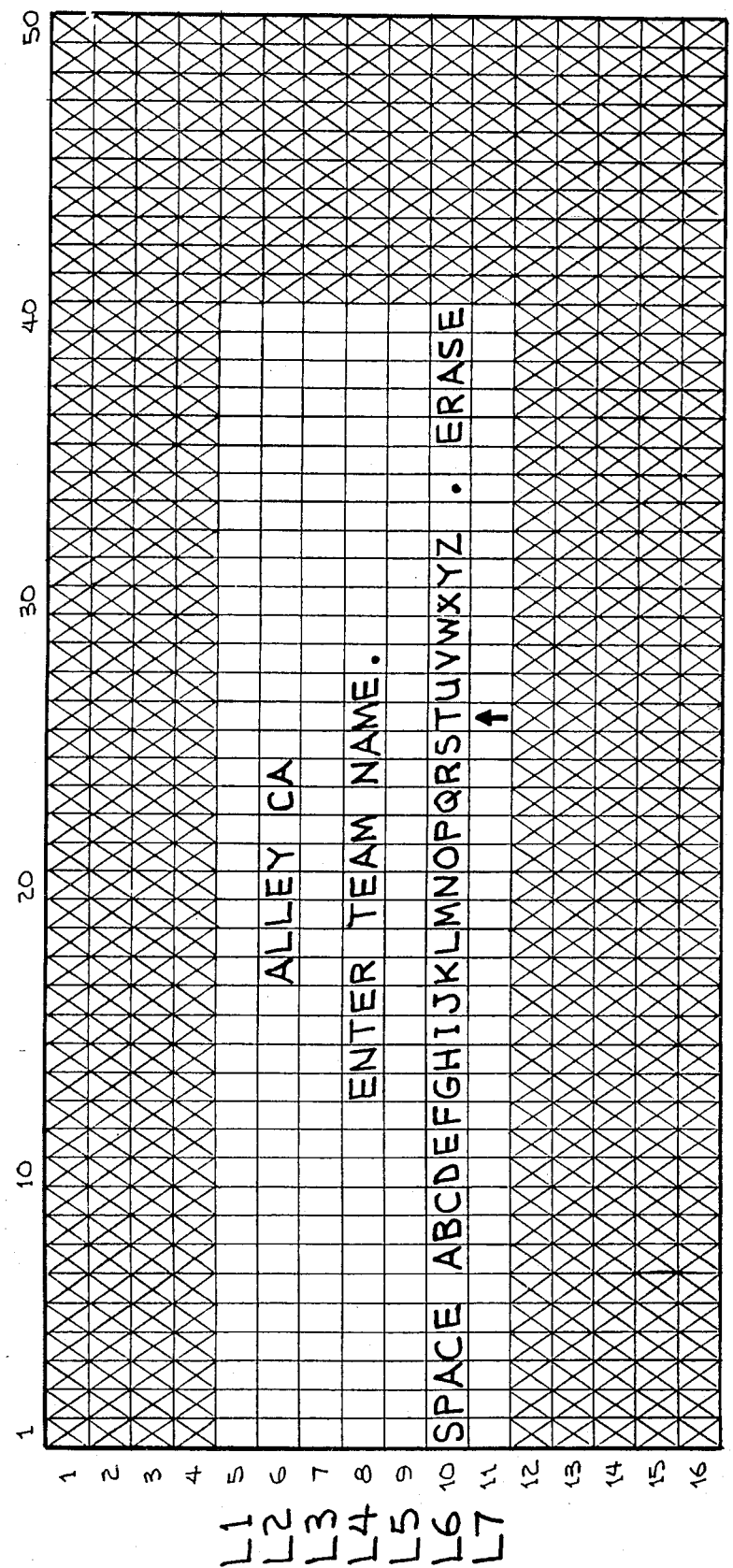

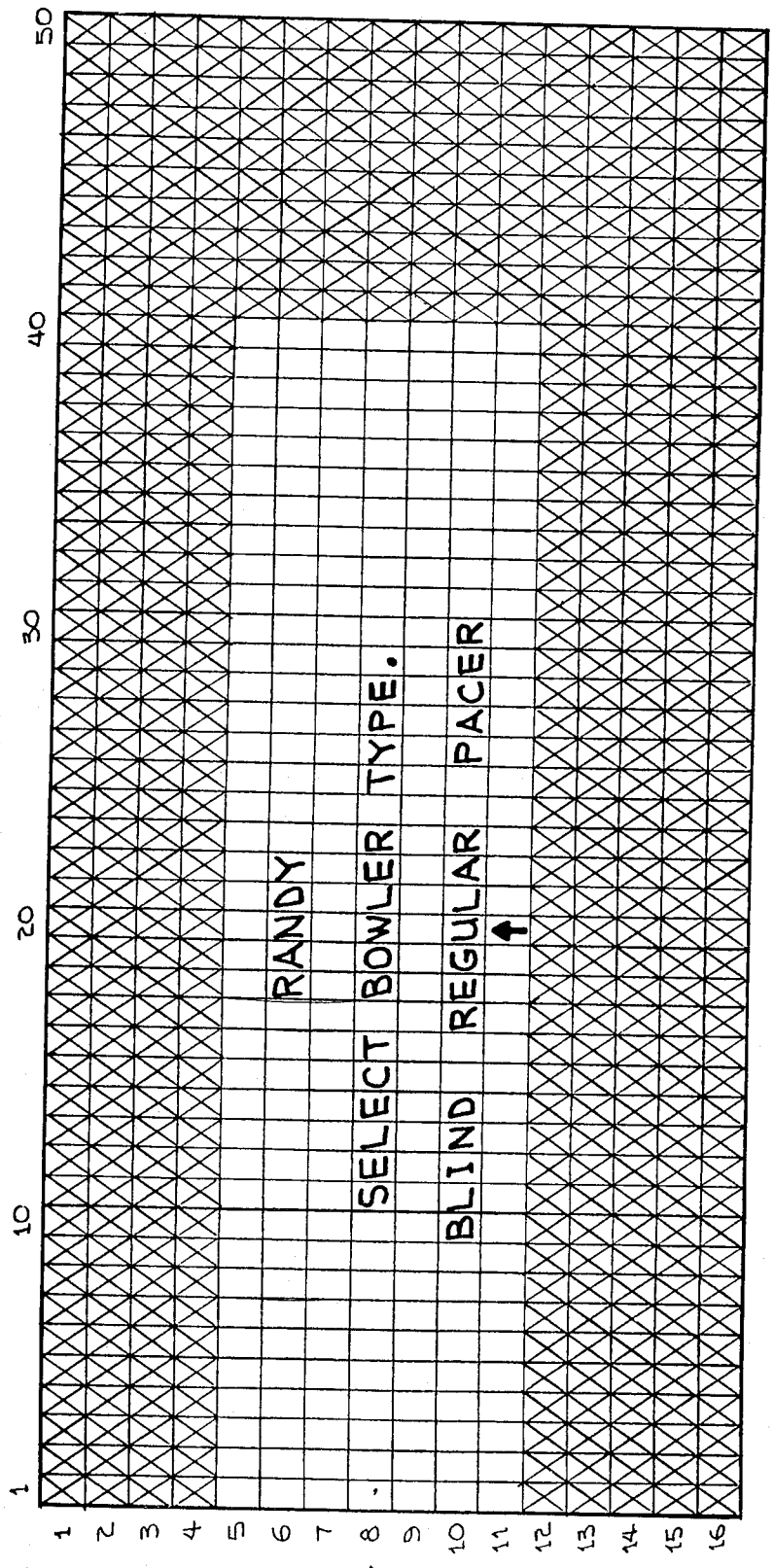

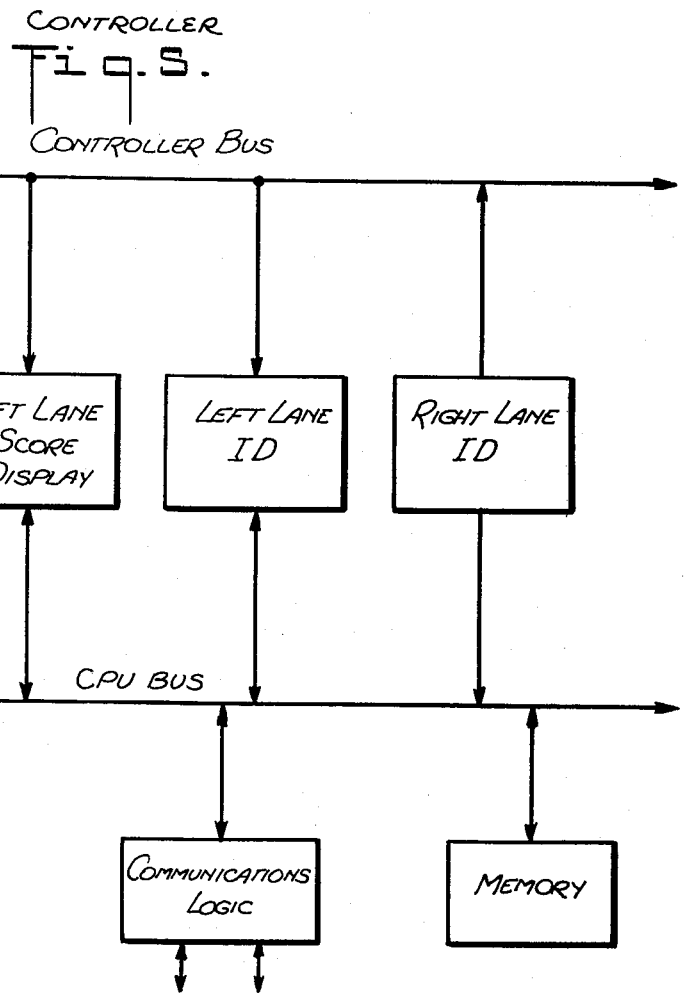
Fig. 5. Controller
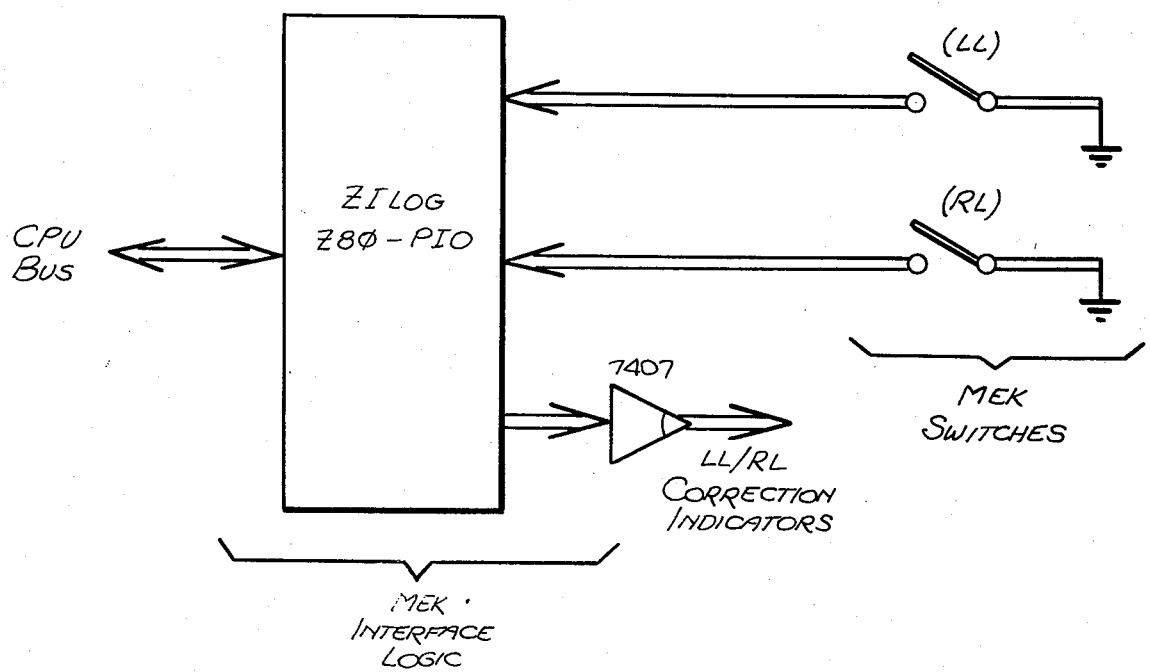
Fig. 6. Manual Entry Keyboard and Interface Logic

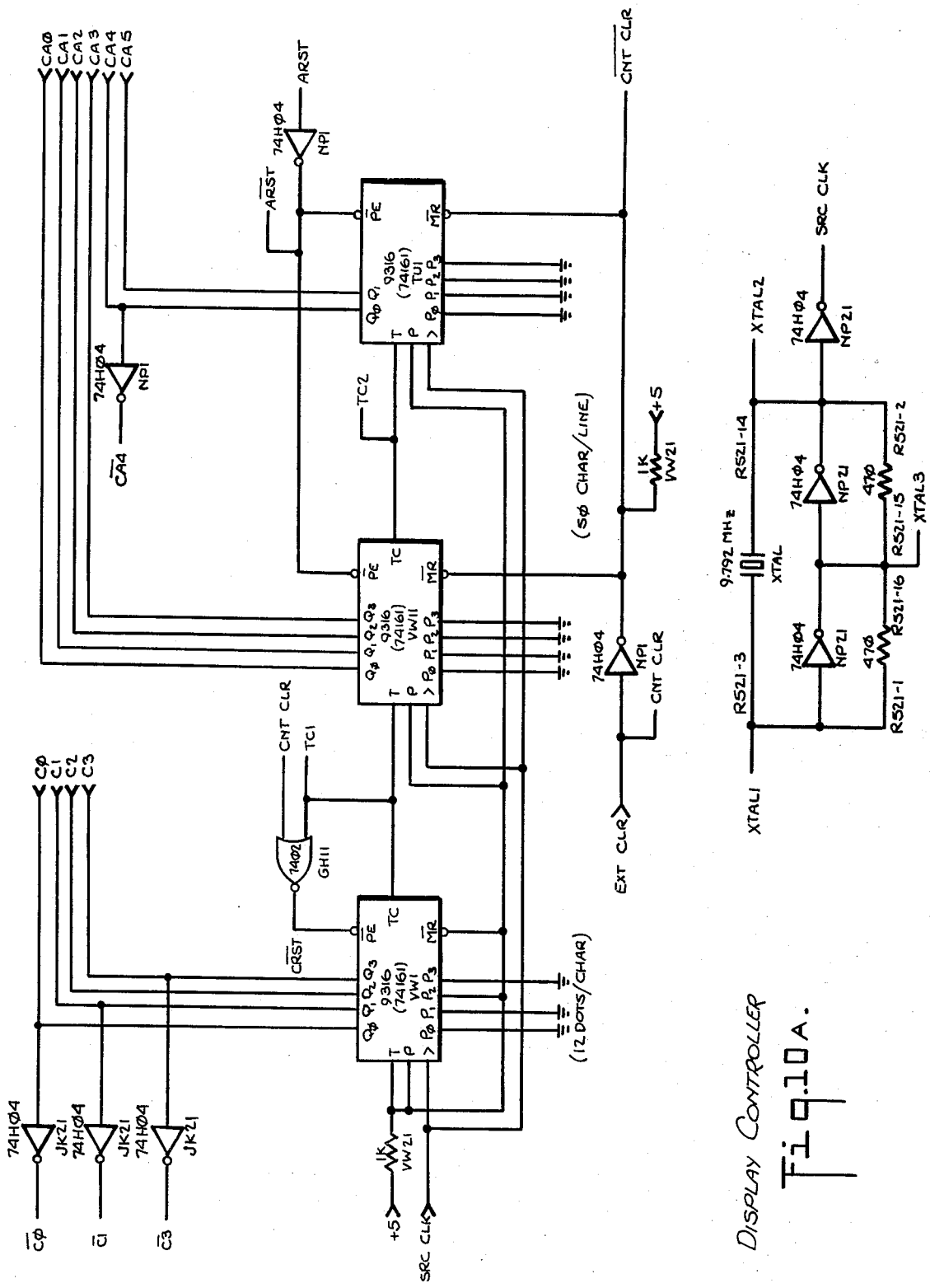

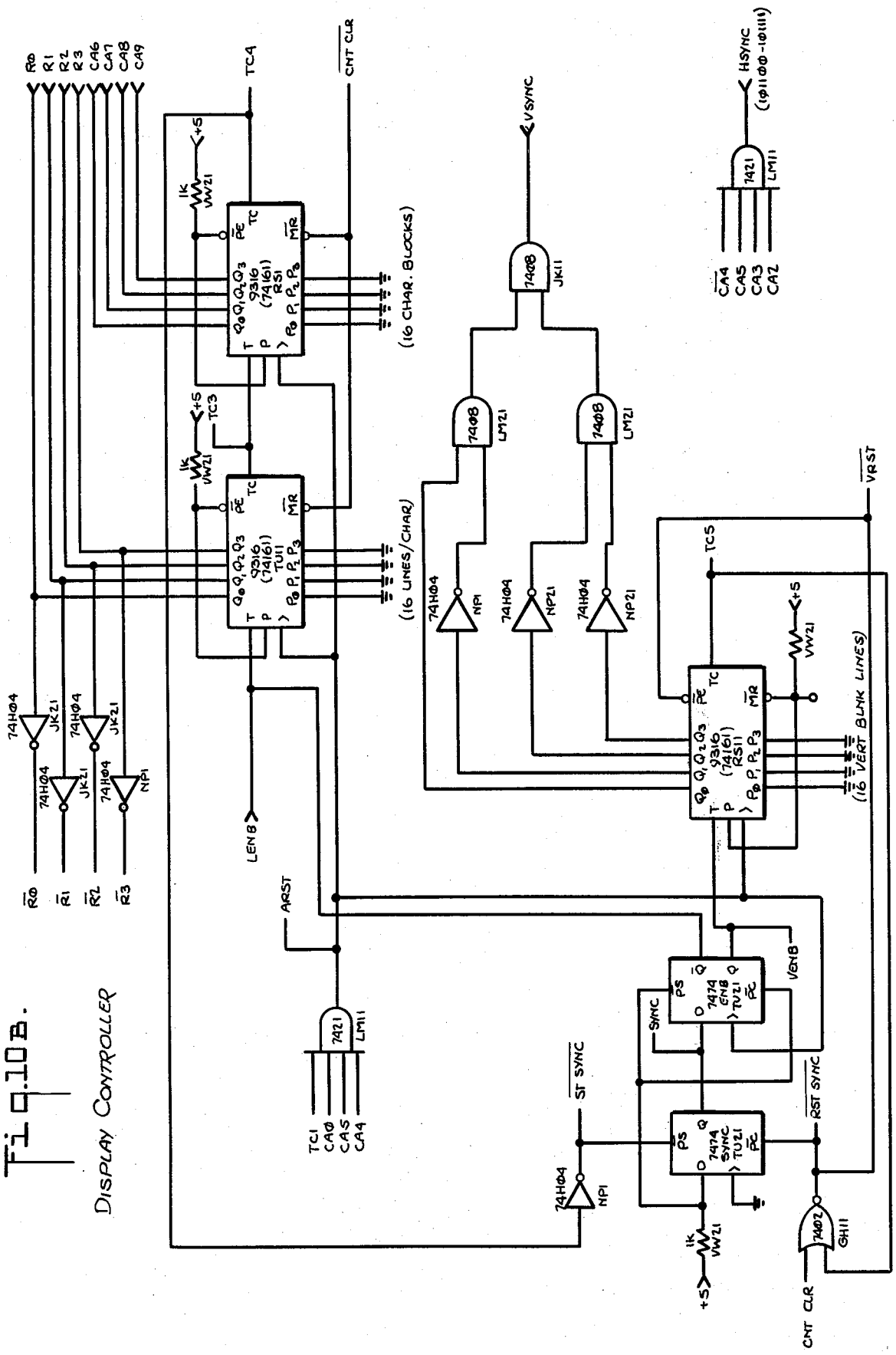

INSTRUCTION DISPLAY

Instruction Display

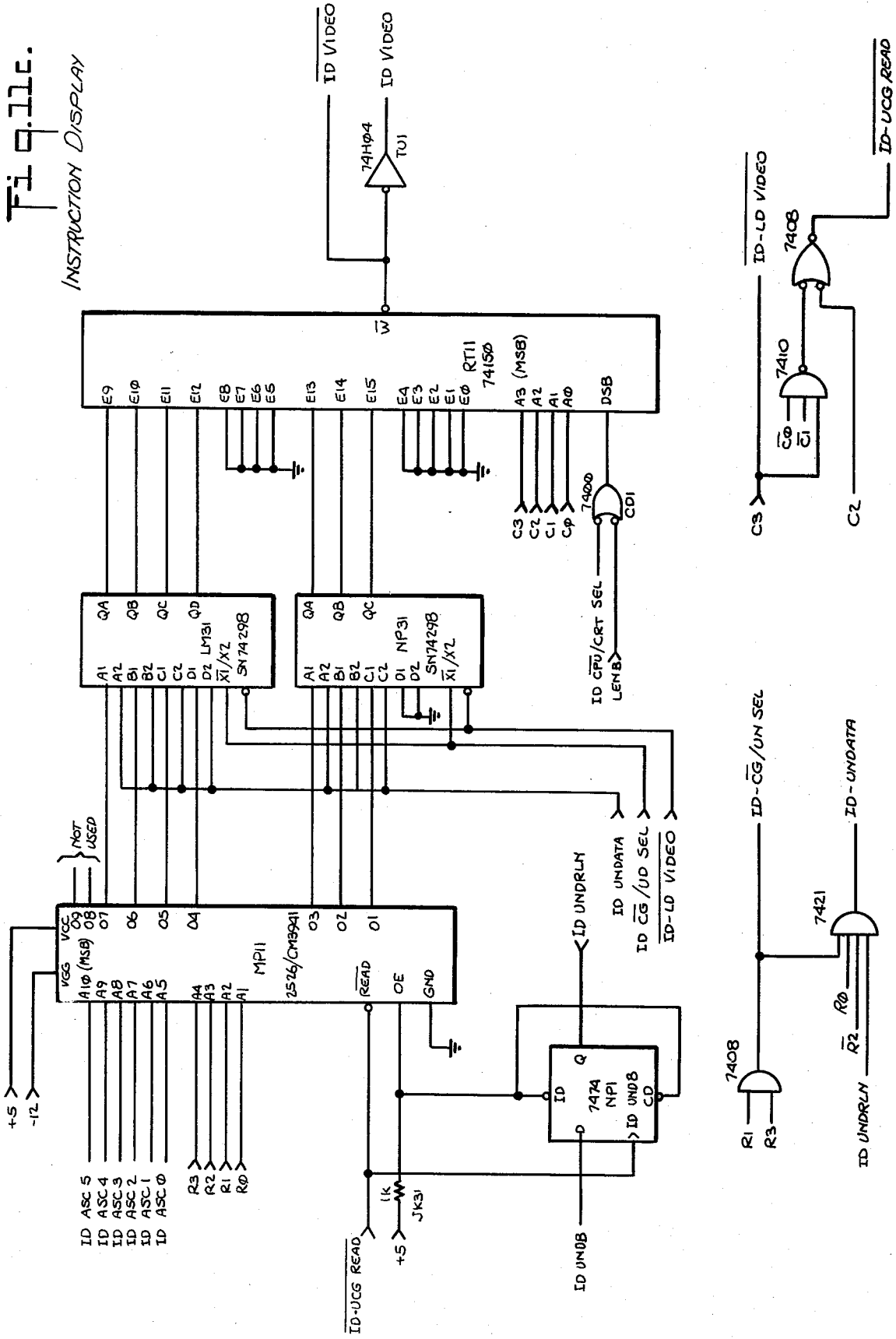
Fig. 11c. Instruction Display

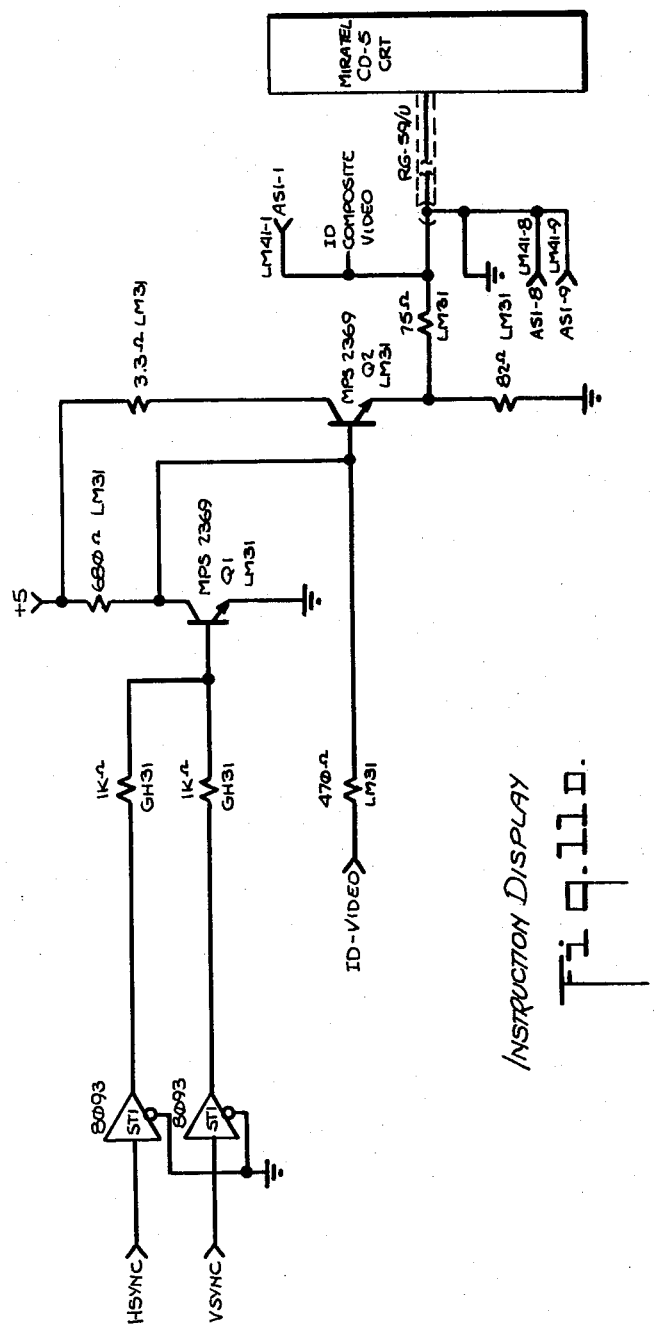

SCORE DISPLAY LOGIC

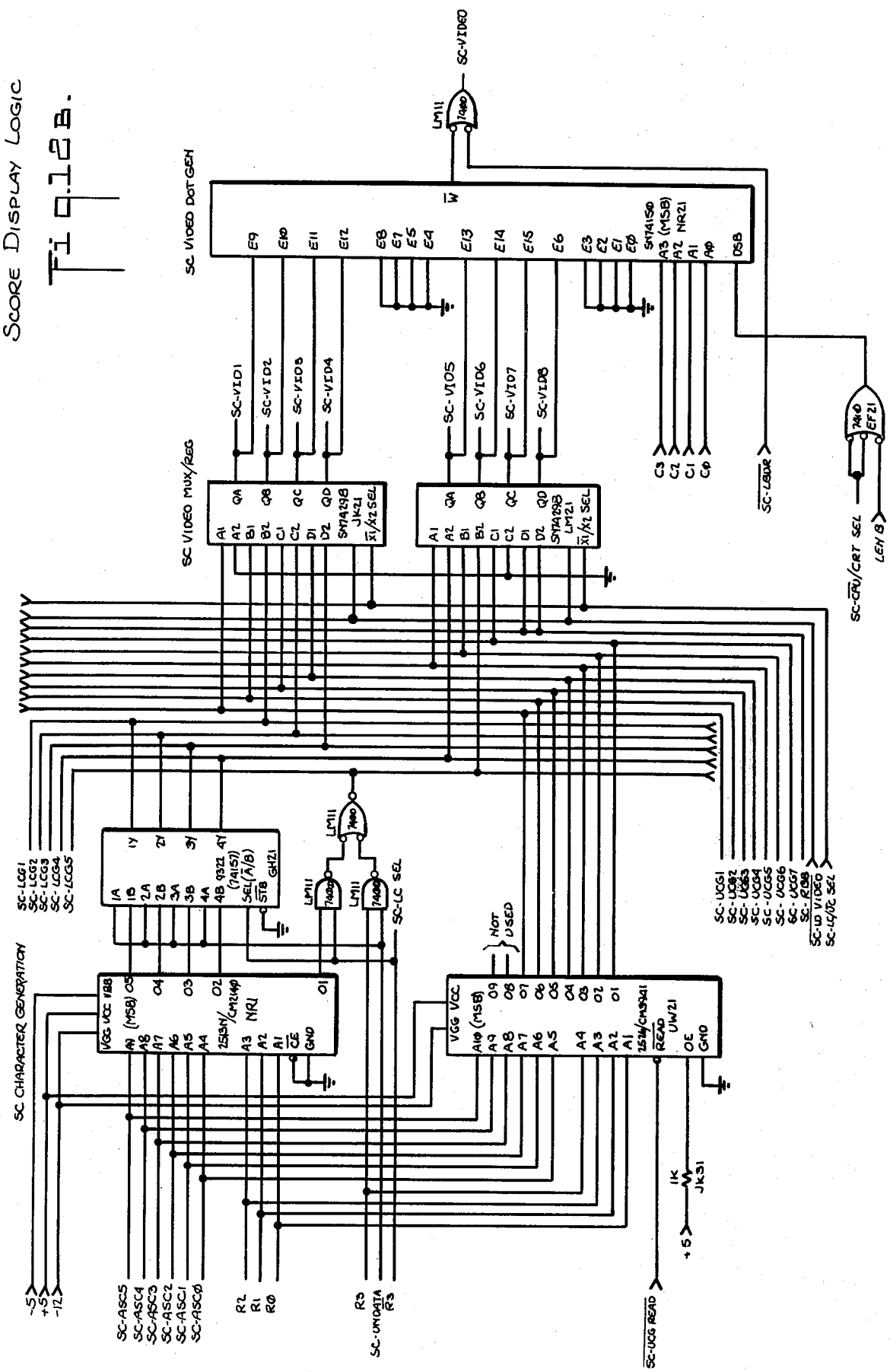

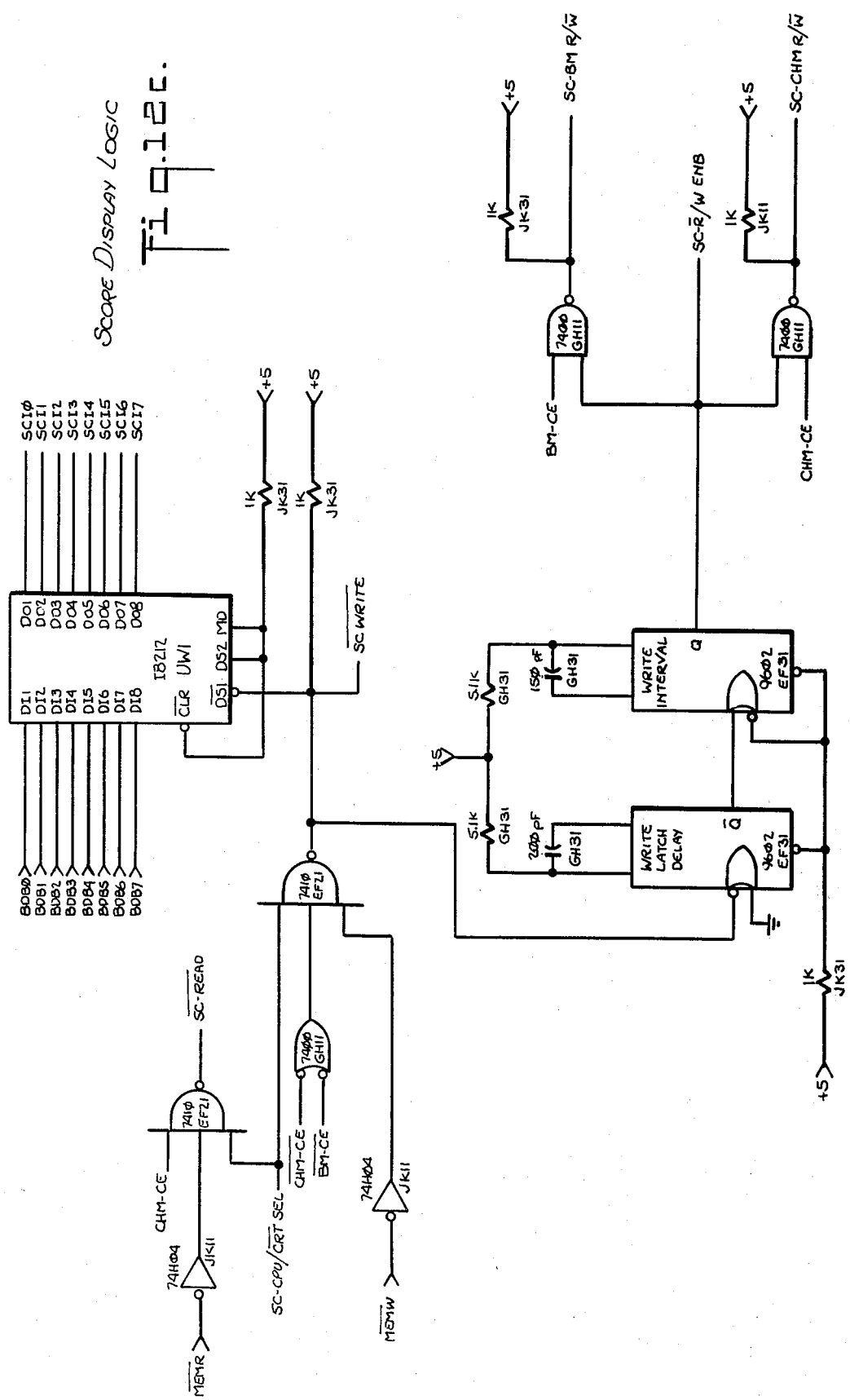

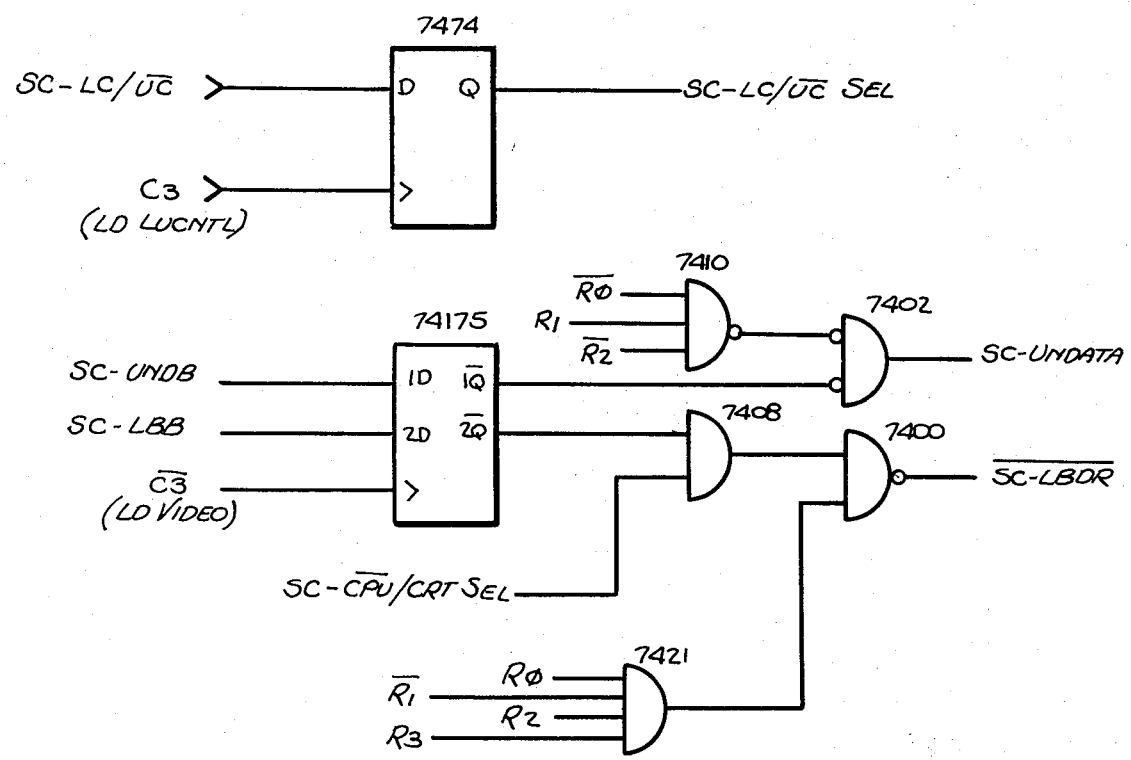
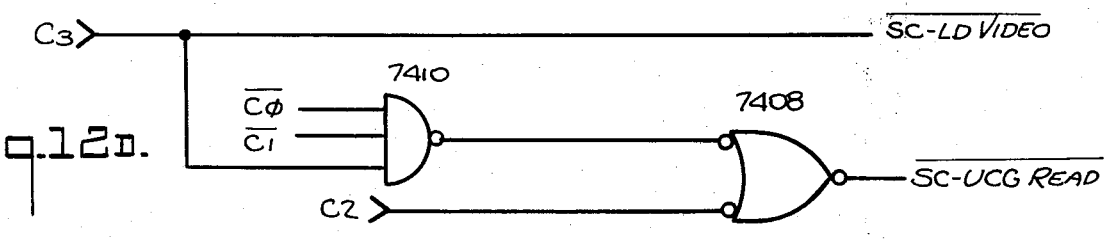
Fig.12D.
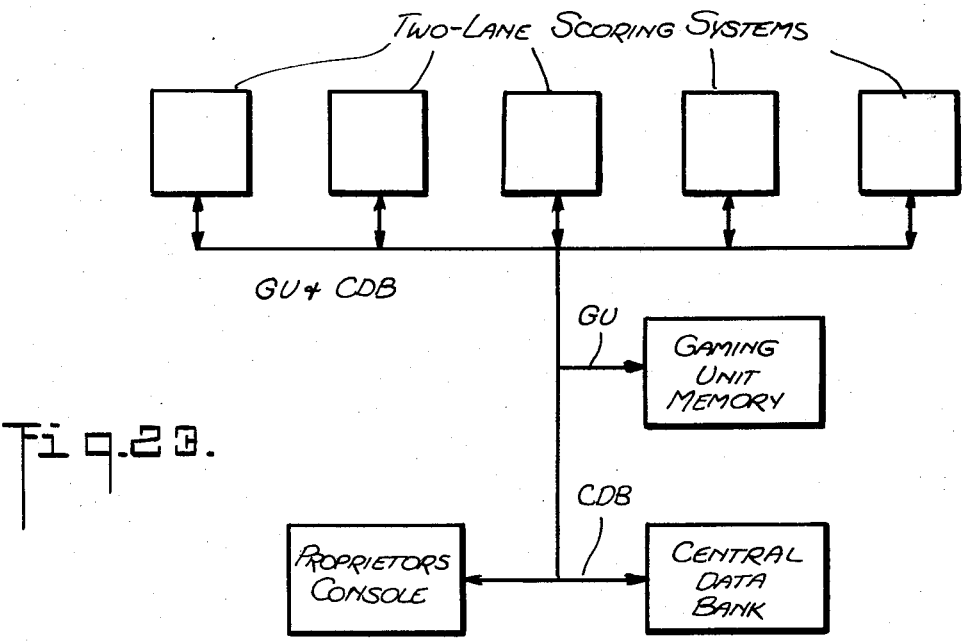
Fig.23.

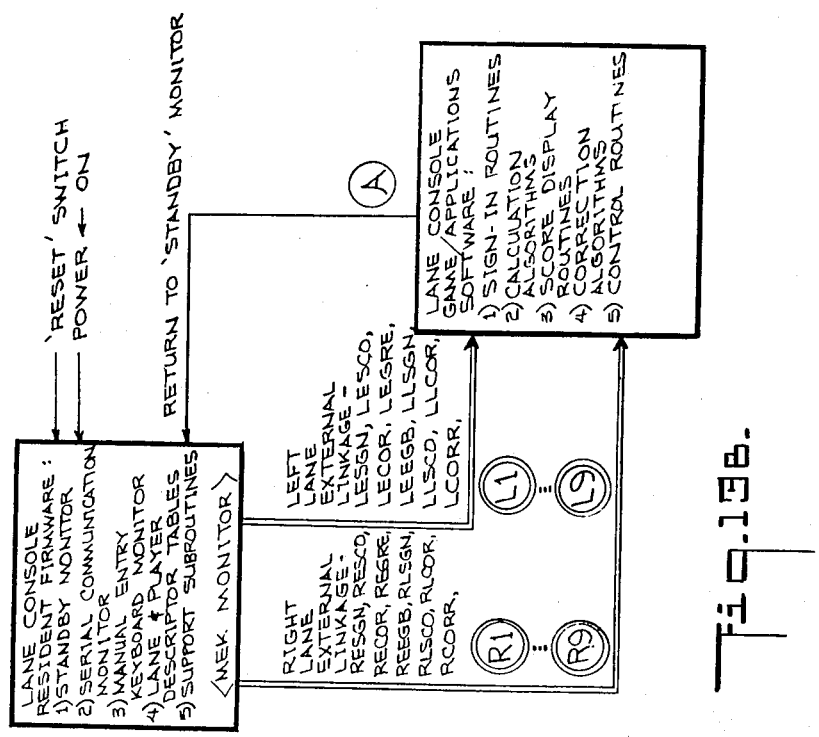
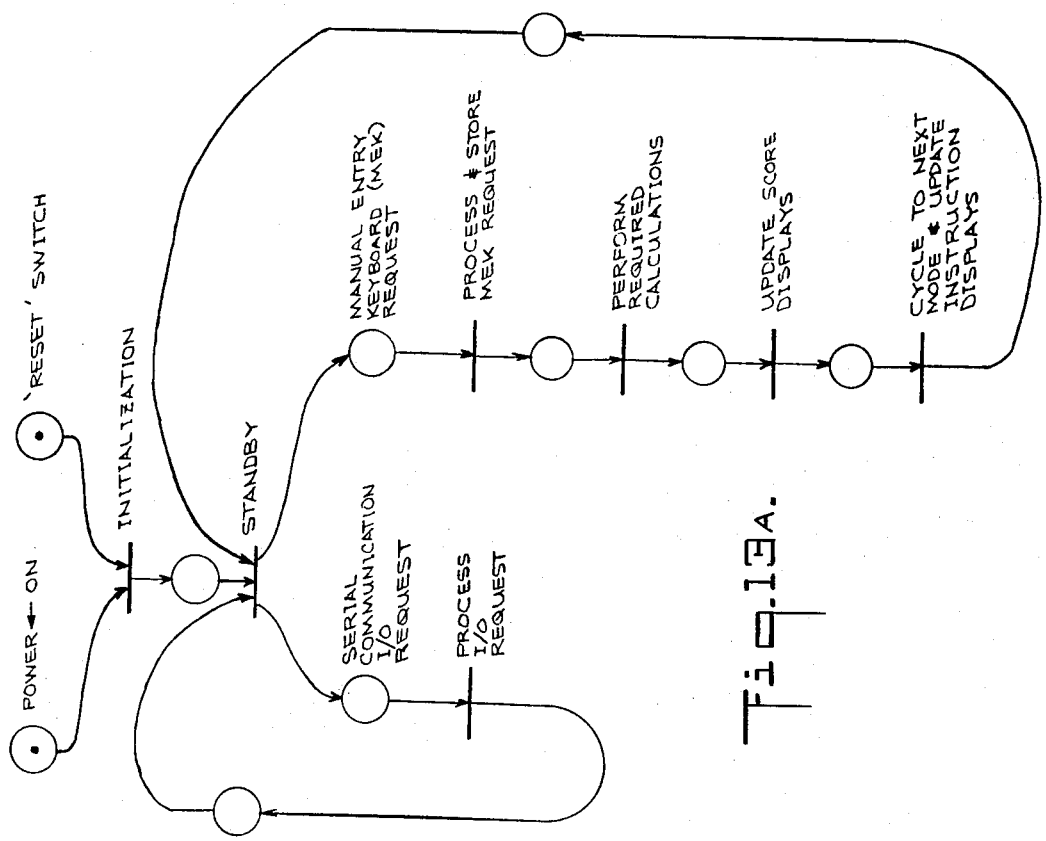
Fig.13B.
Fig.13A.

Fig. 14C.

PLAYER DESCRIPTOR TABLE xMDj: 
1) PLAYER CONTROL PARAMETERS
   a) PLAYER MODE FLAGS - PMODE, PMOD2
   b) SCORE ENTRY FLAG - SCORF
2) PLAYER NAME - PN COUNT, PN⟨1:8⟩
3) PLAYER GAME CONTROL PARAMETERS
   a) PINFALL STATUS - FRAME, BALL
   b) LEAGUE FLAGS - XFRAM, PLRLN, PTYPE, DFRAM
4) PLAYER SCORE CALCULATION PARAMETERS
   a) PINFALL ENTRY QUEUE - BK, B3, BI
   b) SCORE FLAGS - TSUM, FSUM, DFRAM
   c) PERMANENT SCORE - SUM⟨1:2⟩
   d) TEMPORARY SCORE - DSUM⟨1:2⟩
5) PLAYER SCORE CORRECTION PARAMETERS - CFRAM, CBAL⟨1:3⟩, SPMOD, SFRAM, SBALL
6) PLAYER LEAGUE CALCULATION PARAMETERS
   a) PLAYER SUM - PSUM⟨1:2⟩
   b) PLAYER SCRATCH AVG - BSA COUNT, BSA⟨1:3⟩
   c) PLAYER HANDICAP - PH COUNT, PH⟨1:5⟩

Fig. 14B.

LANE DESCRIPTOR TABLE xLDT:
1) GAME CONTROL PARAMETERS
   a) GAME MODE FLAGS - GMODE, GMOD2
   b) CURSOR POSITION + TRANSITION FLAGS - CPOS, CFRR, CFRL, CRX⟨1:2⟩, CLX⟨1:2⟩, CRS⟨0:2⟩, CLS⟨0:2⟩
   c) PLAYER FLAG - PLYR
   d) GAME ID FLAG - GNNAL
2) TEAM CONTROL PARAMETERS
   a) TYPE - LTYPE
   b) NUMBER - GNMBR
   c) CONTROL FLAGS - TMFLG, SPLYR, TMCRF, EOGF,
3) TEAM IDENTIFICATION PARAMETERS
   a) TEAM NAME - TN COUNT, TN⟨1:16⟩
   b) TEAM SCRATCH AVERAGE TSA COUNT, TSA⟨1:4⟩
   c) TEAM HANDICAP - TH COUNT, TH⟨1:3⟩
4) TEAM SCORE CALCULATION PARAMETERS

Fig. 14A.

RESIDENT MEMORY TABLES

LEFT LANE TABLES / RIGHT LANE TABLES (LANE DESCRIPTOR) LLDT: / RLDT:

(PLAYER DESCRIPTORS) LLP1: / RLP1:
LLP2: / RLP2:
LLP3: / RLP3:
LLP4: / RLP4:
LLP5: / RLP5:
LLP6: / RLP6:

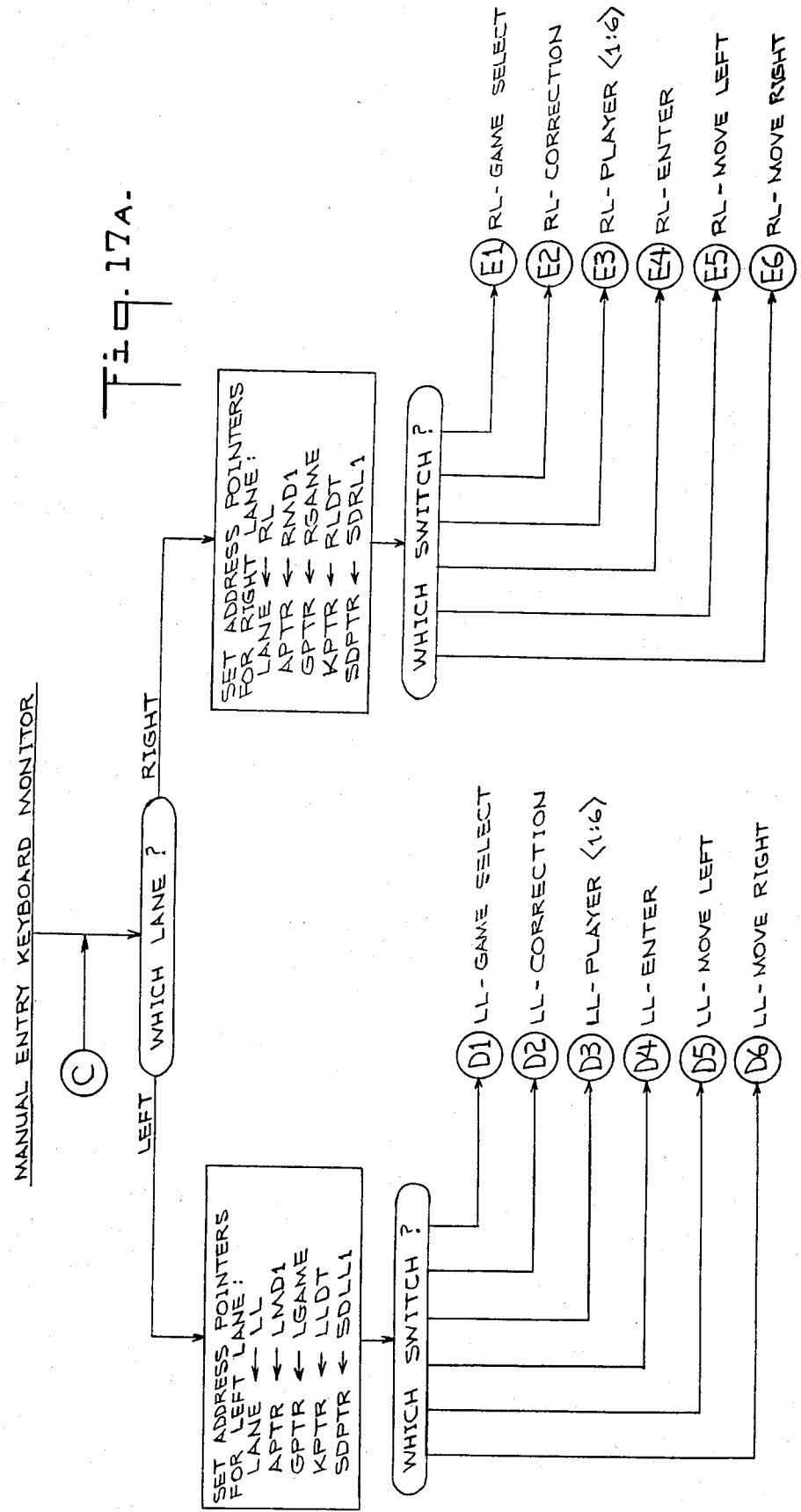

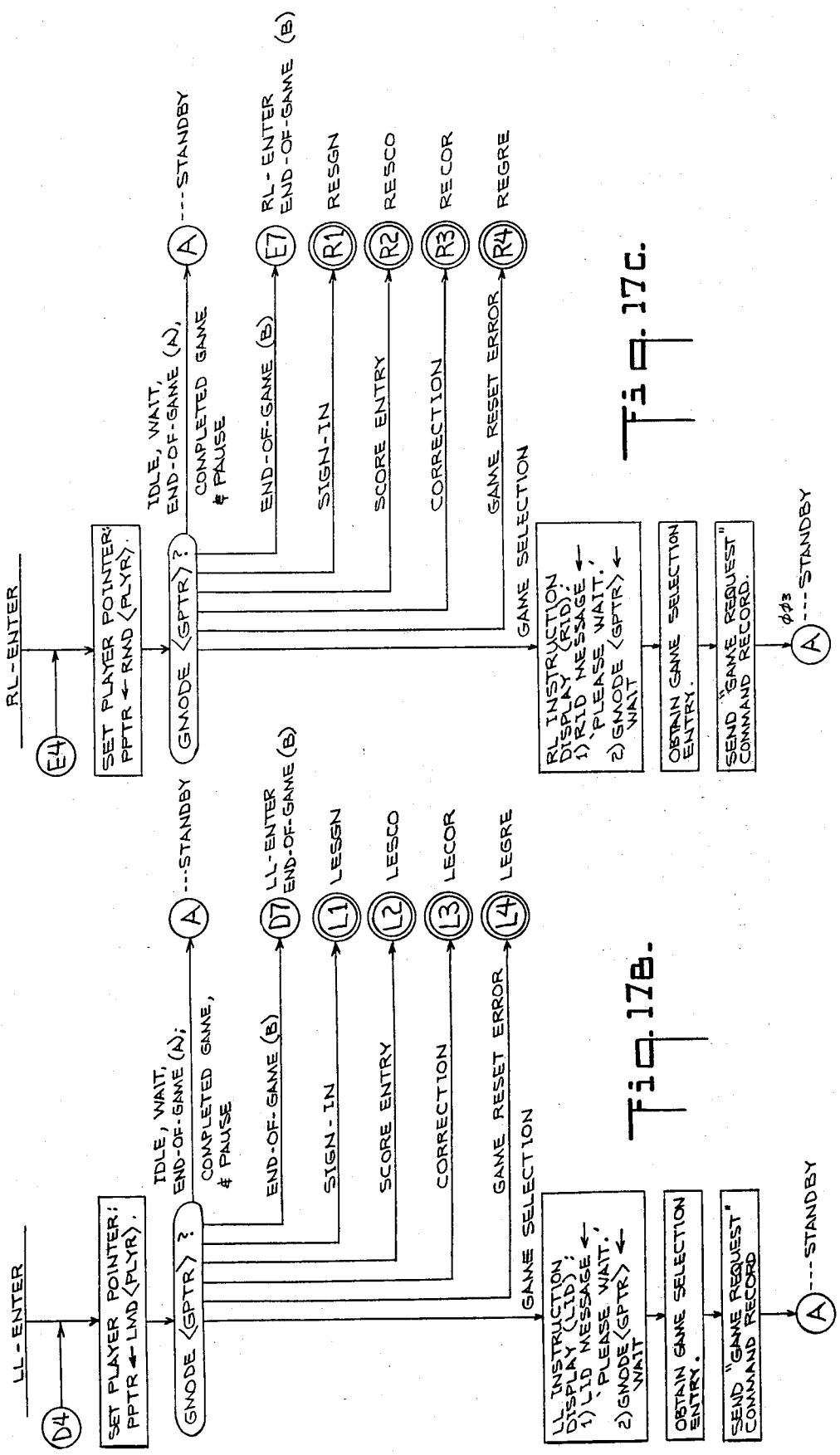

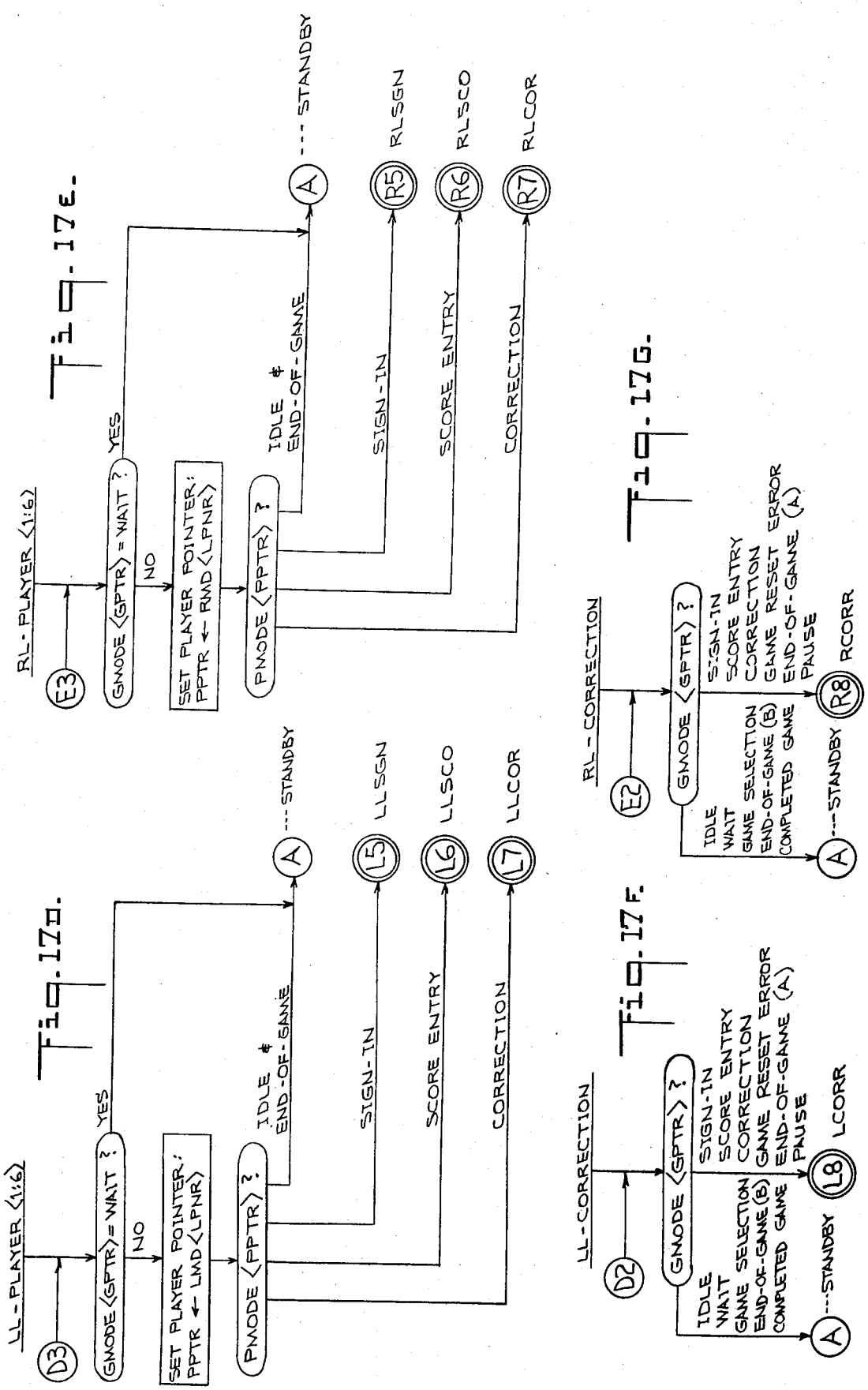

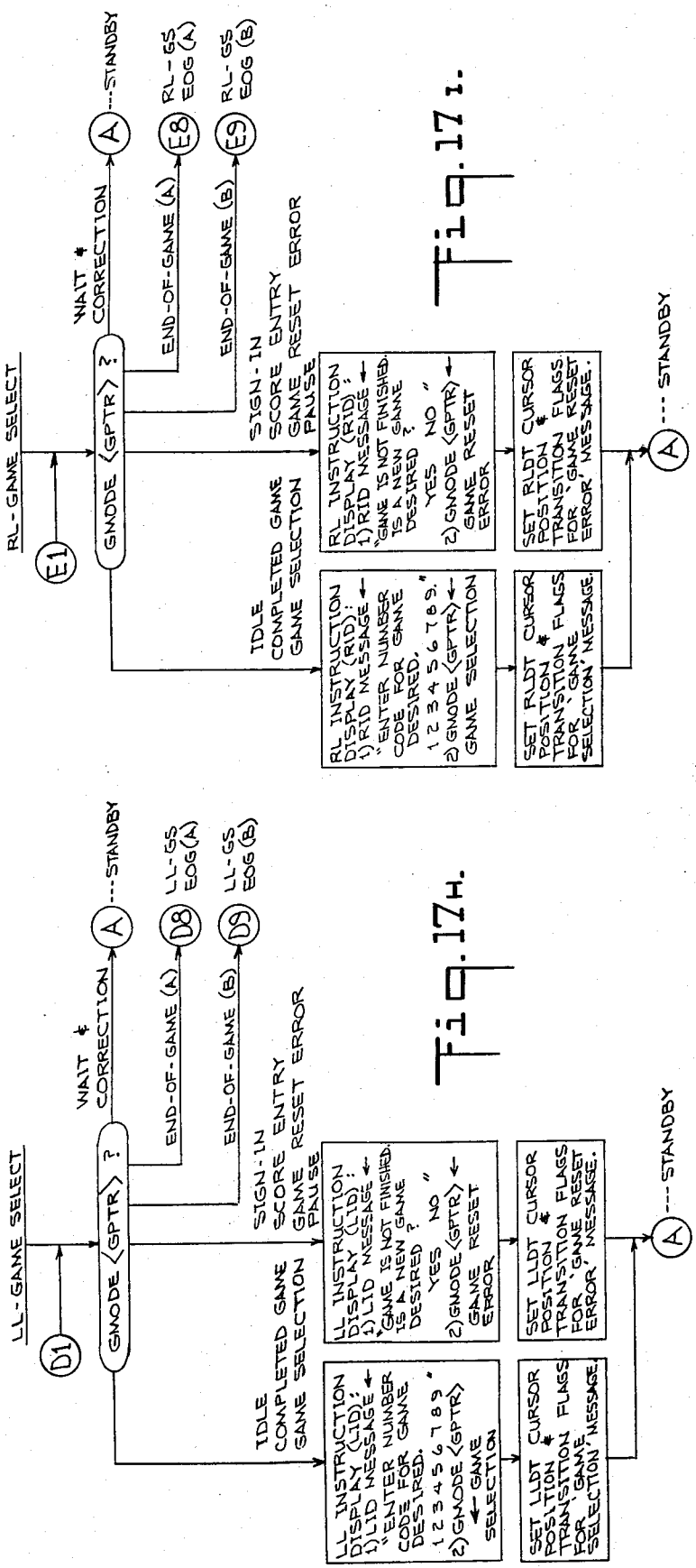

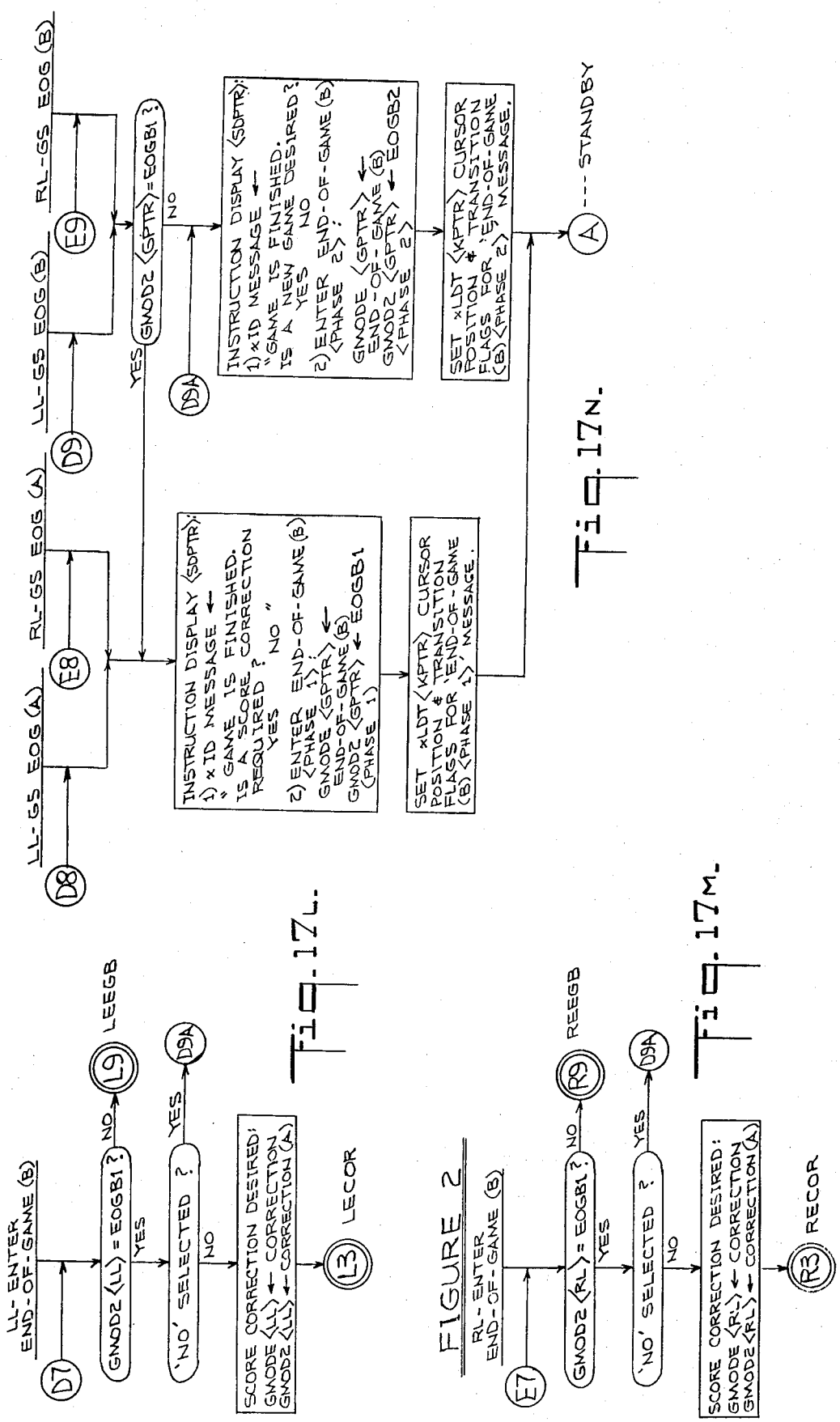

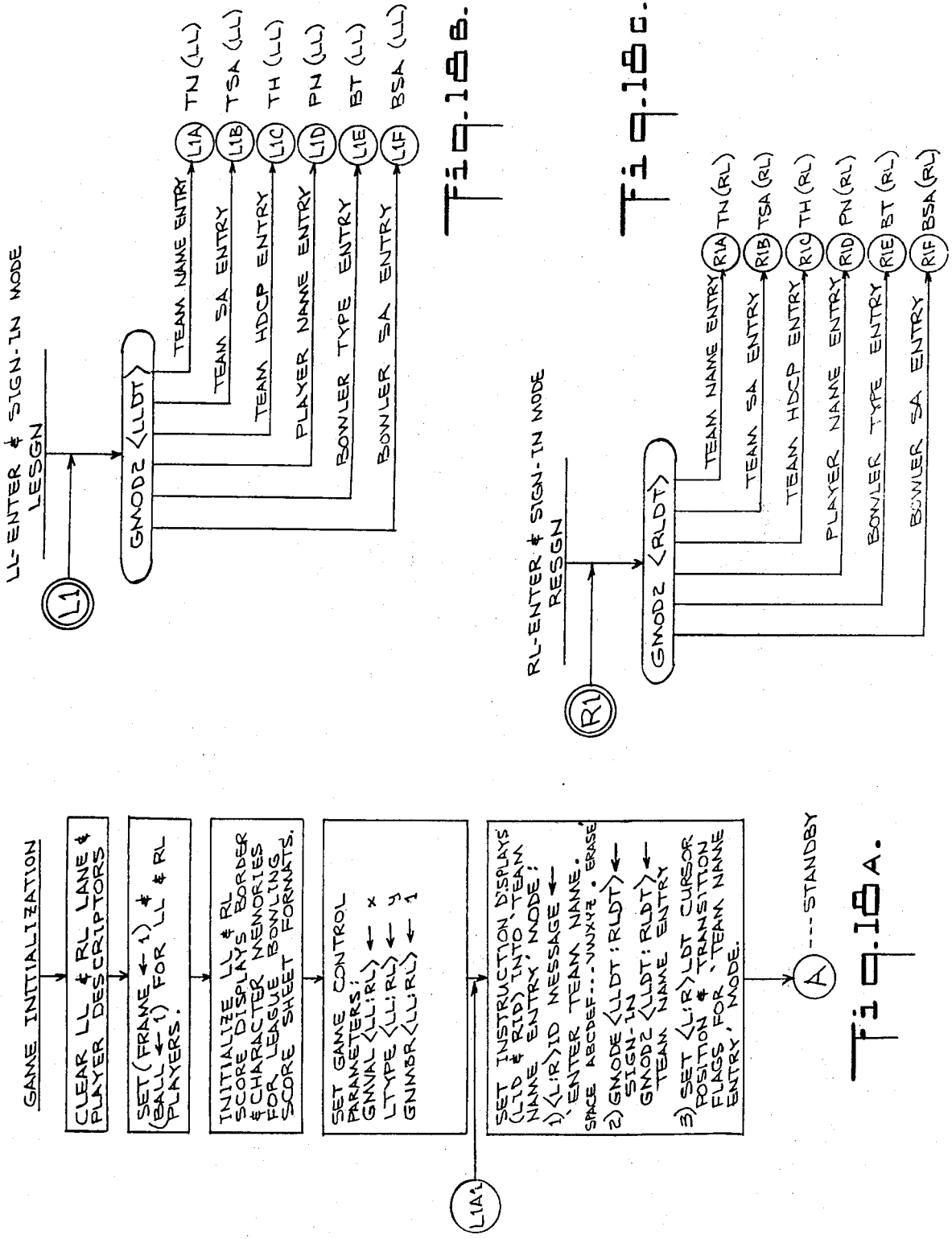

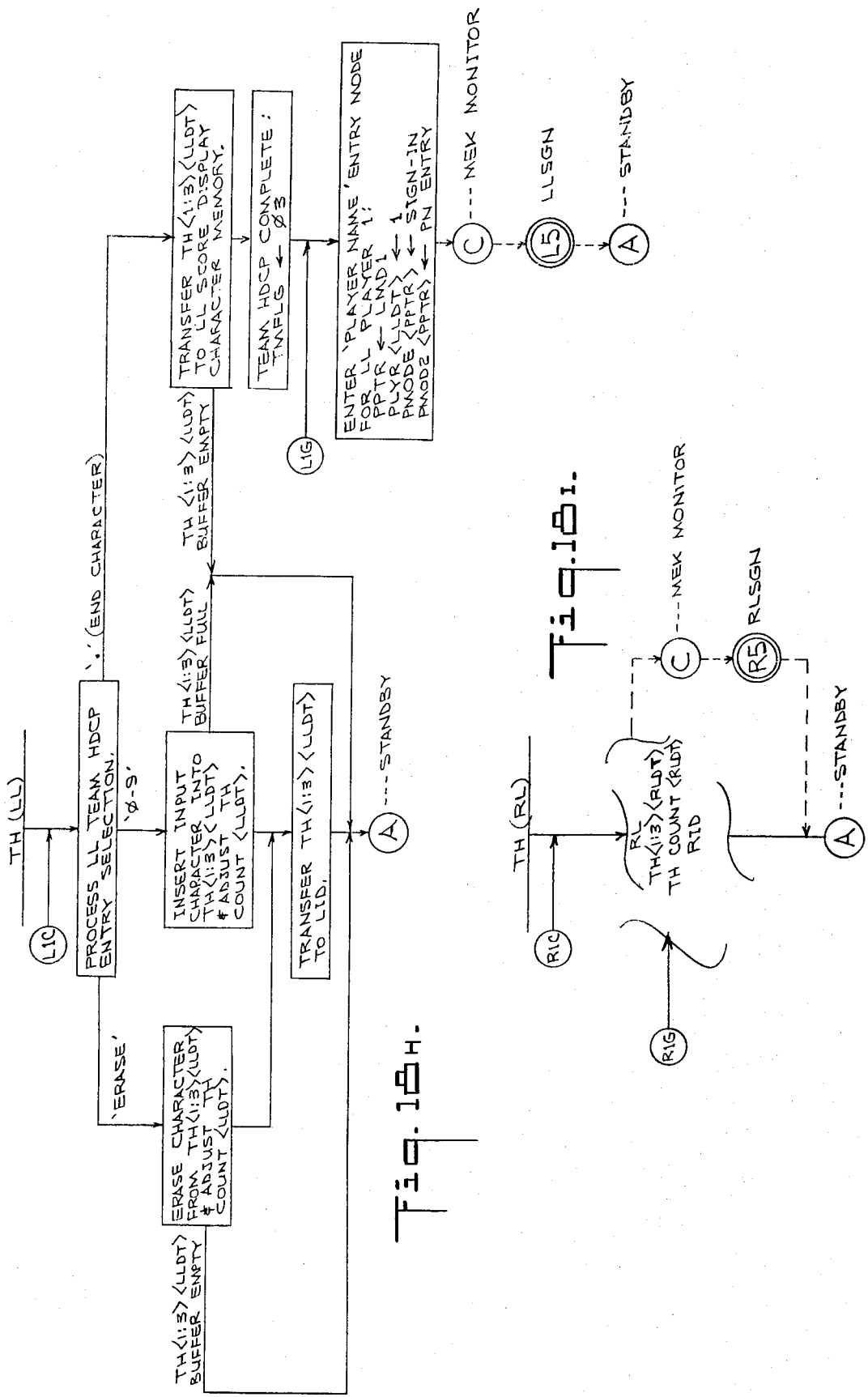

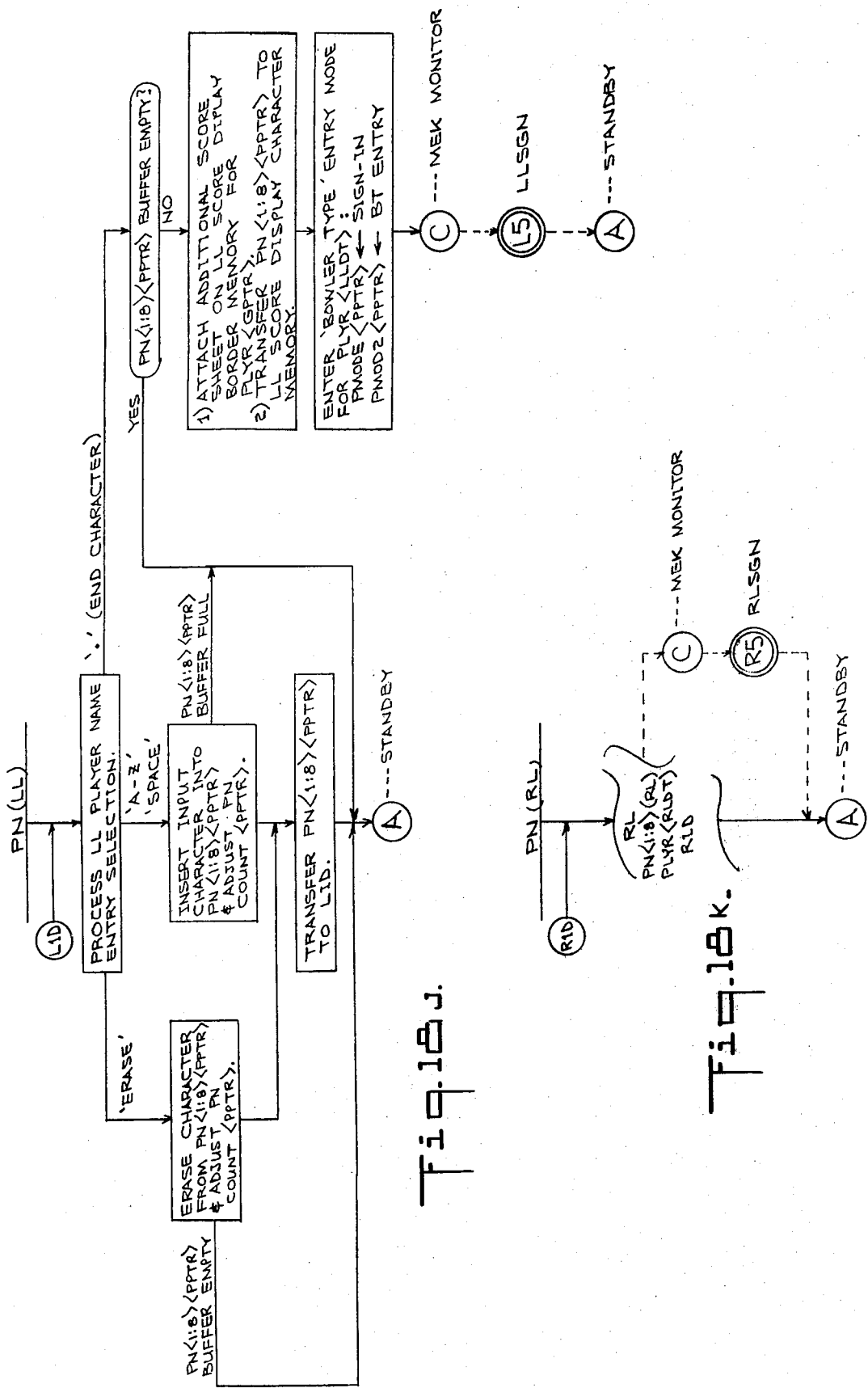

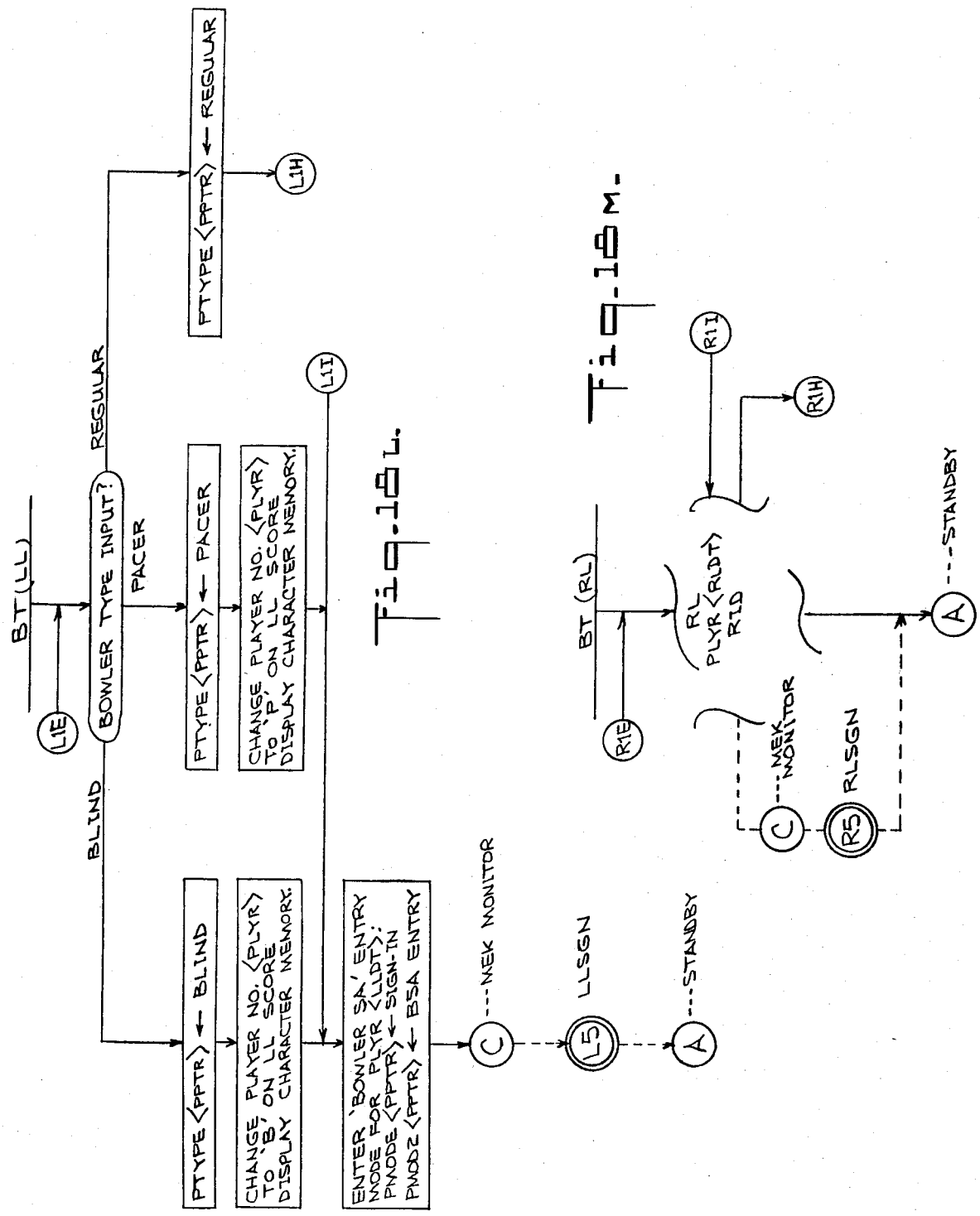

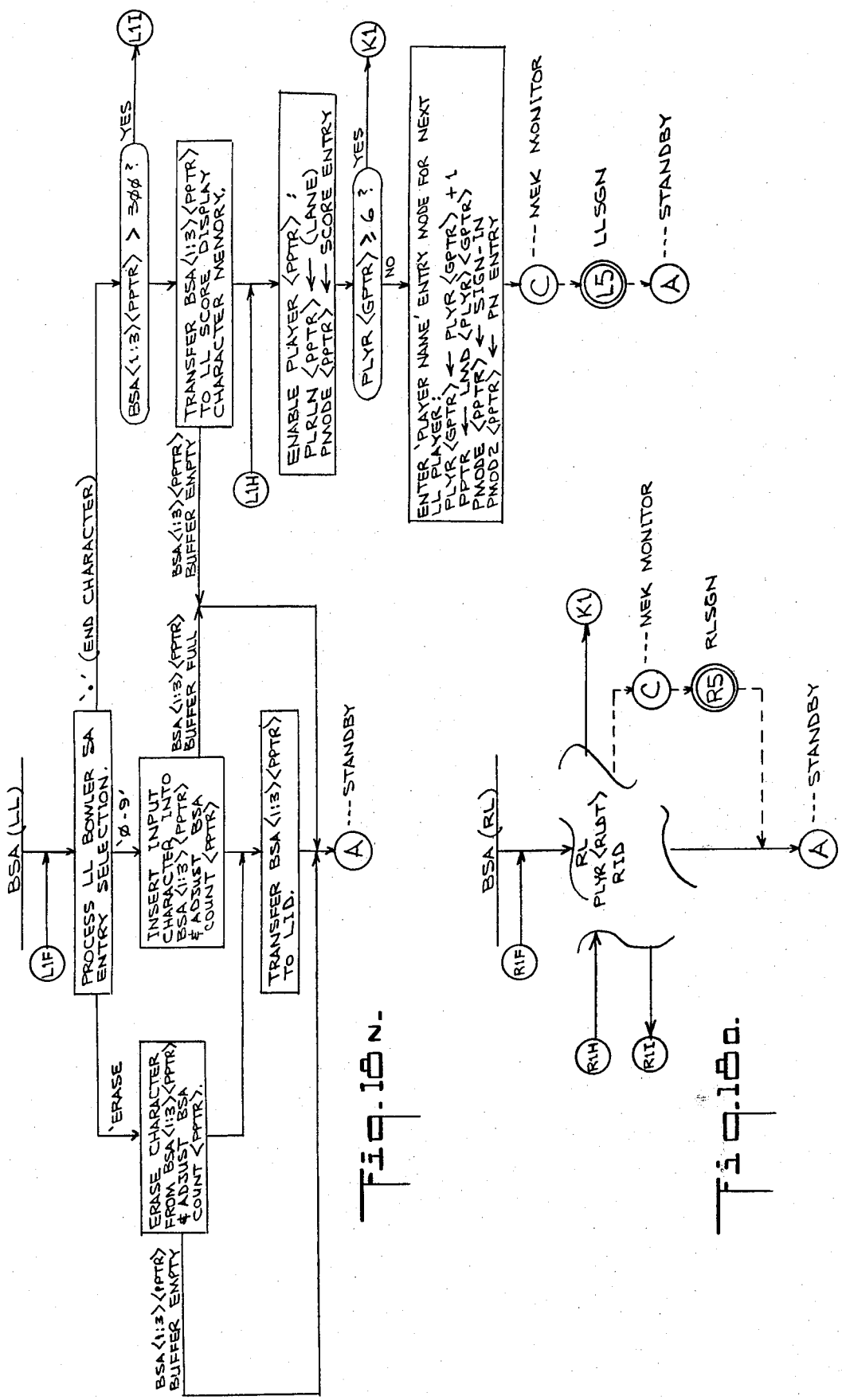

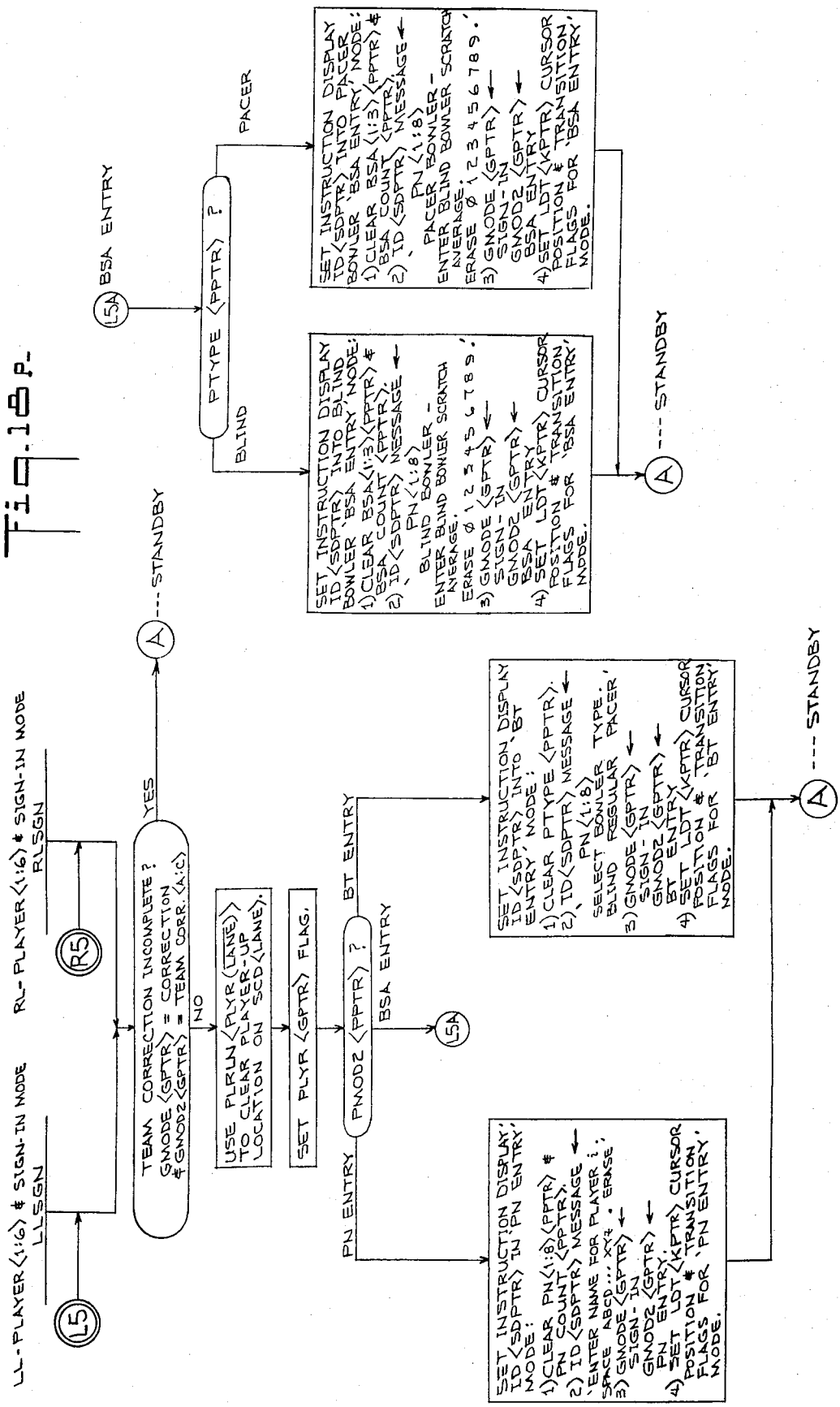

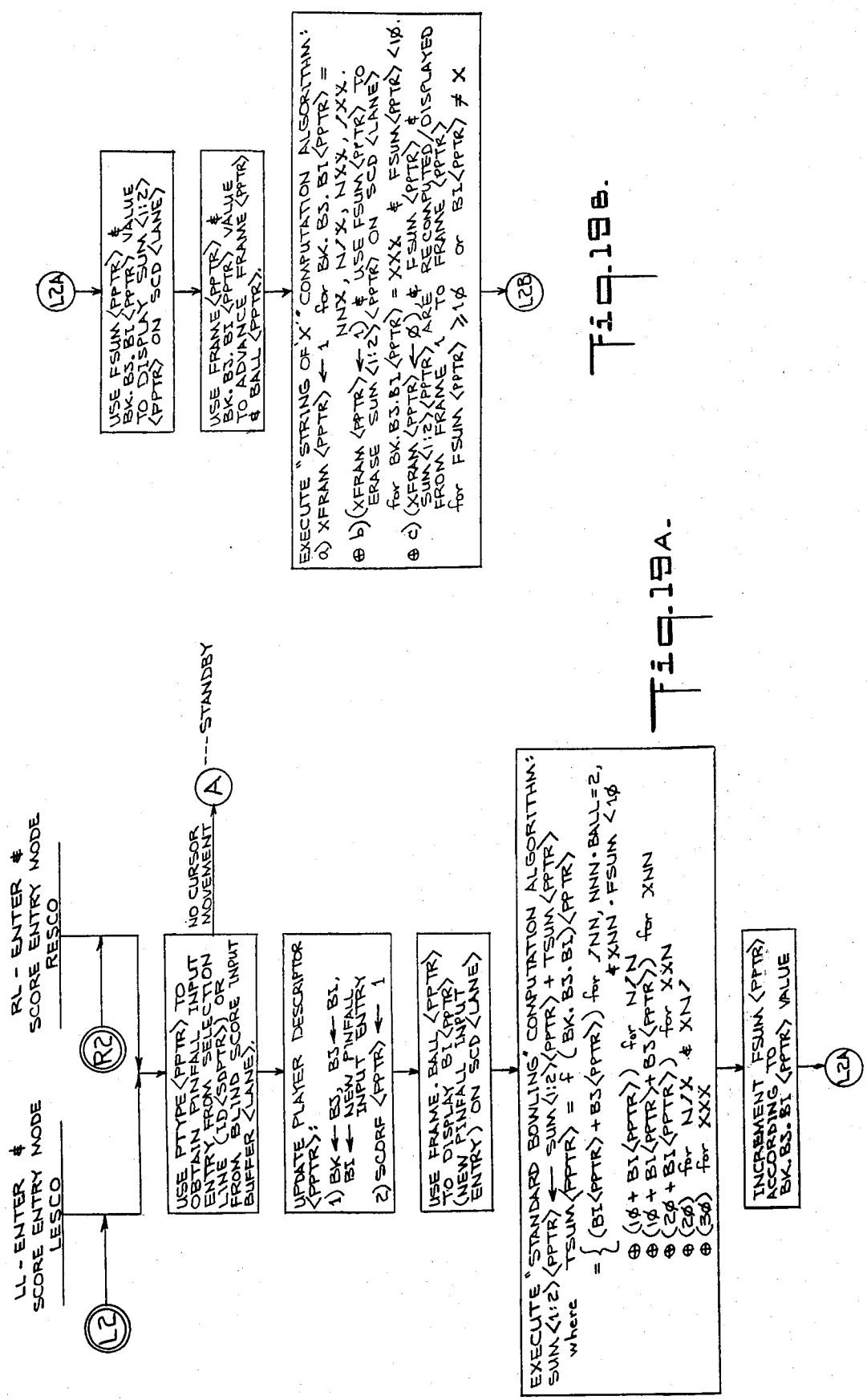

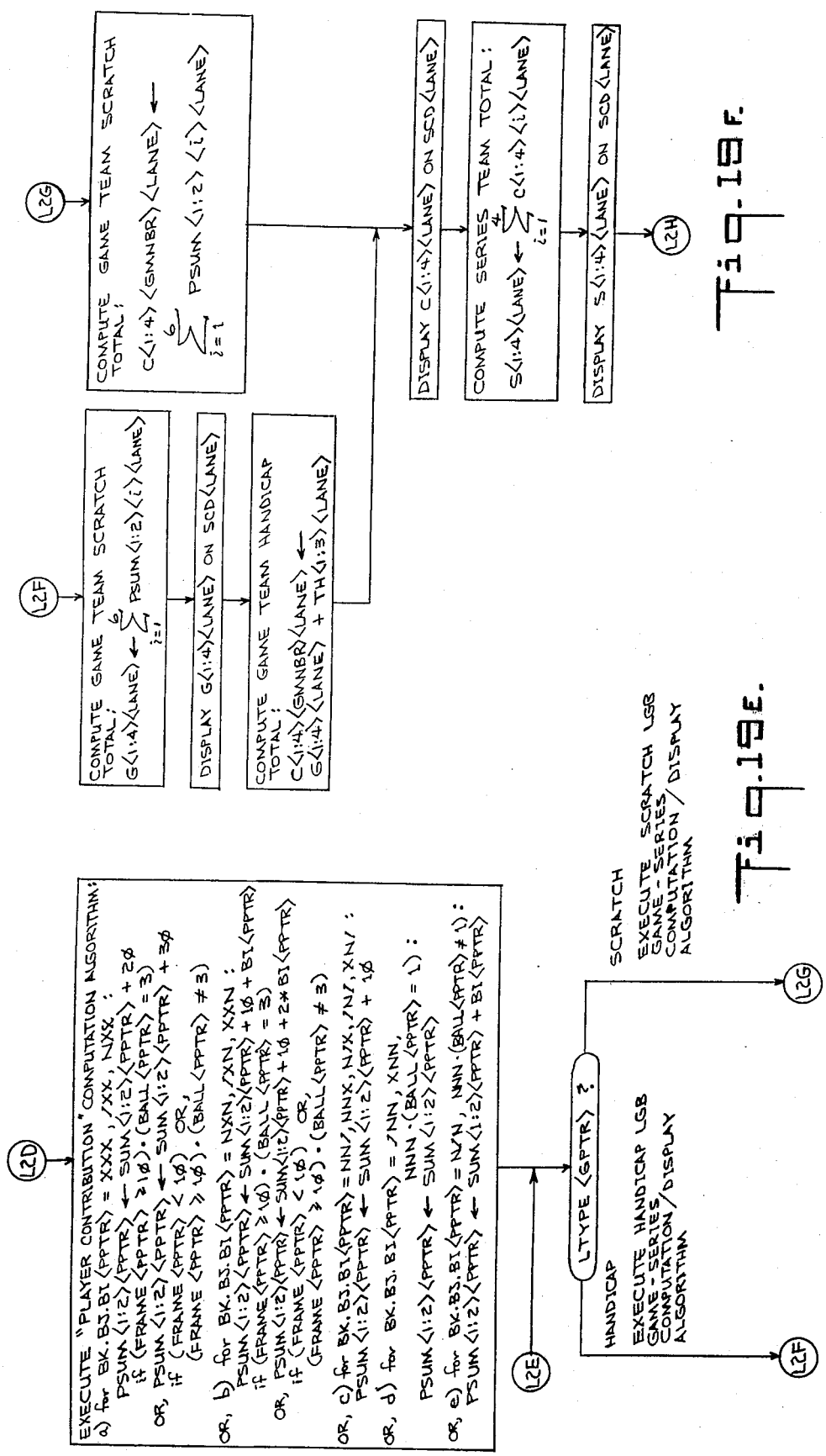

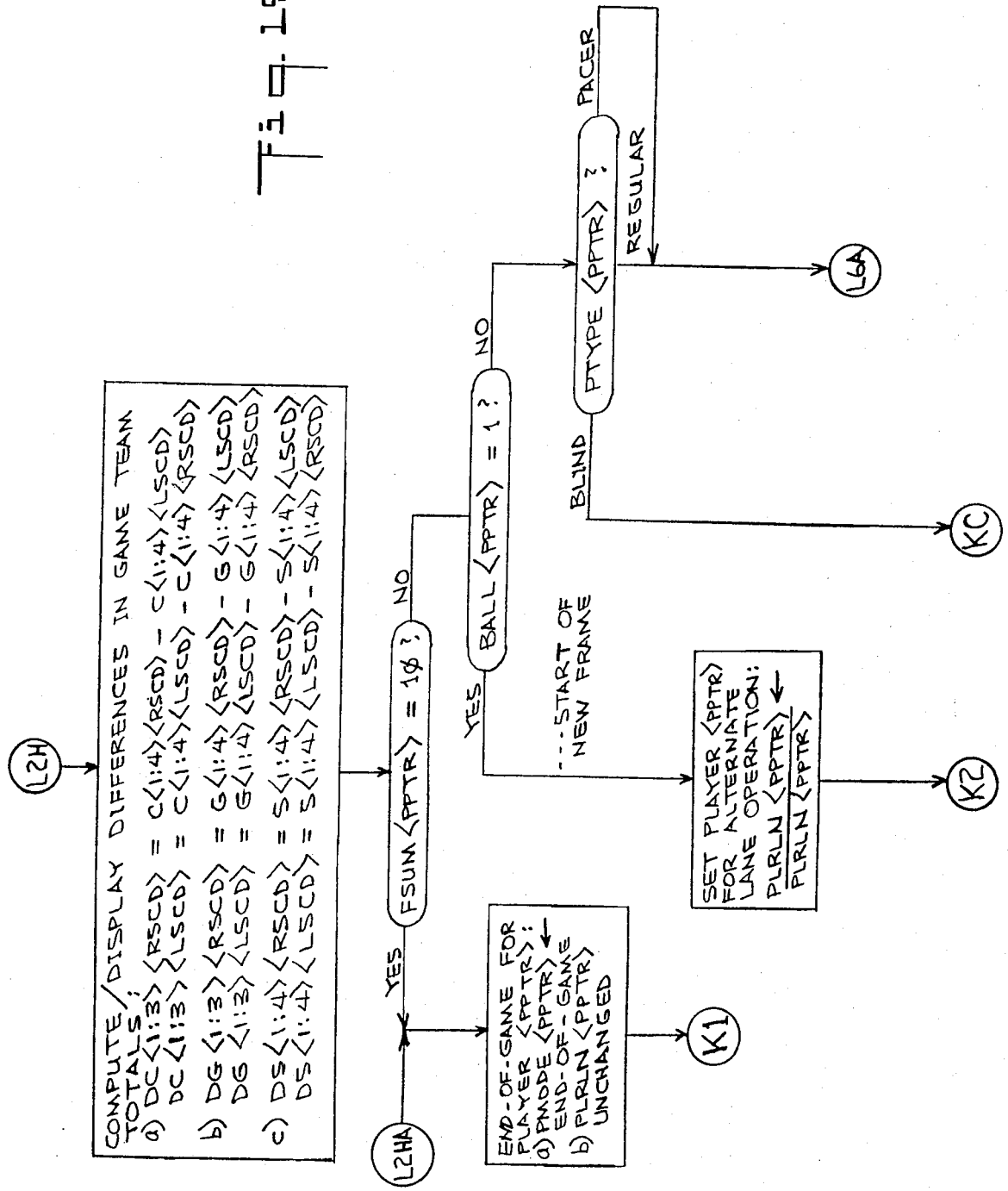

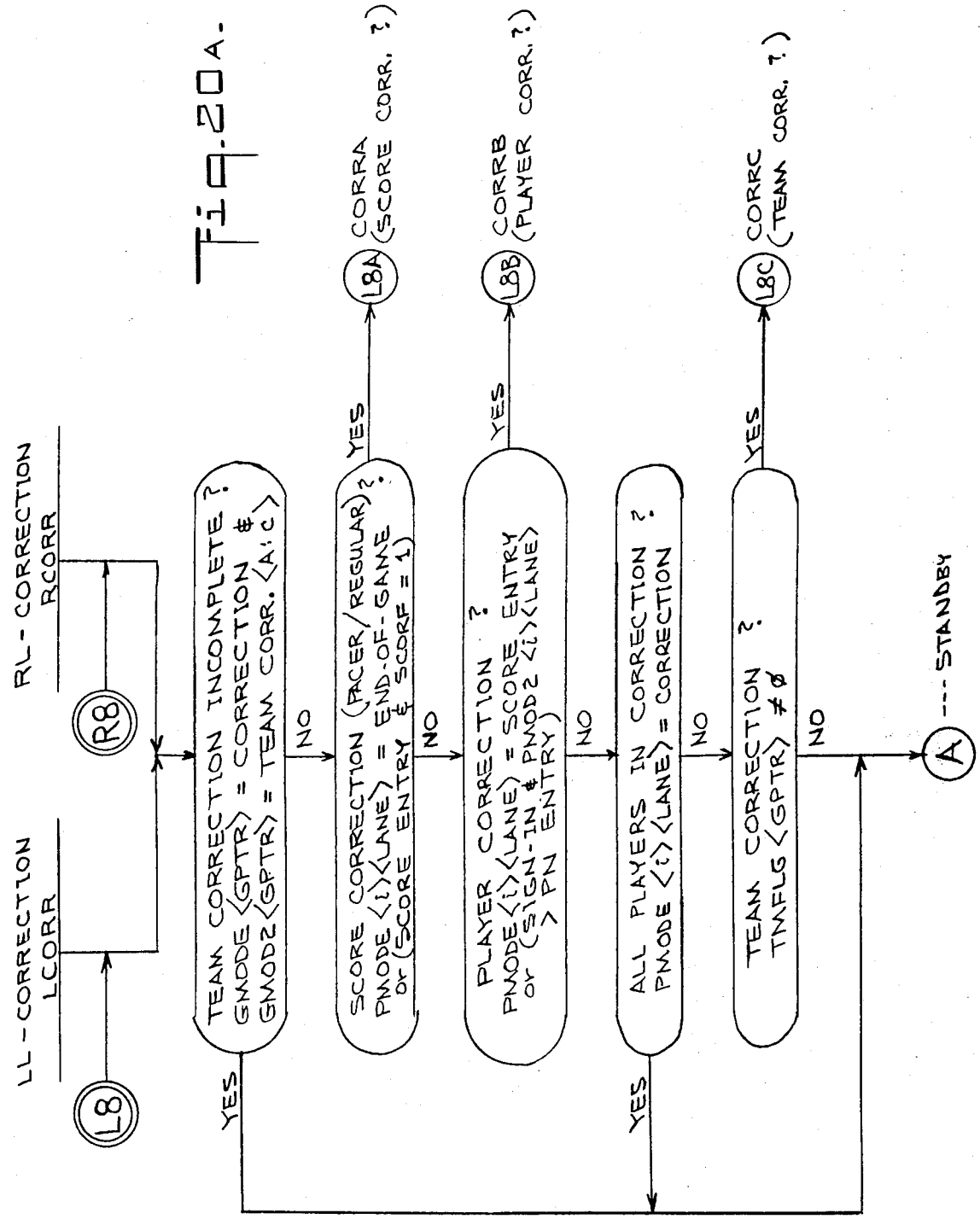

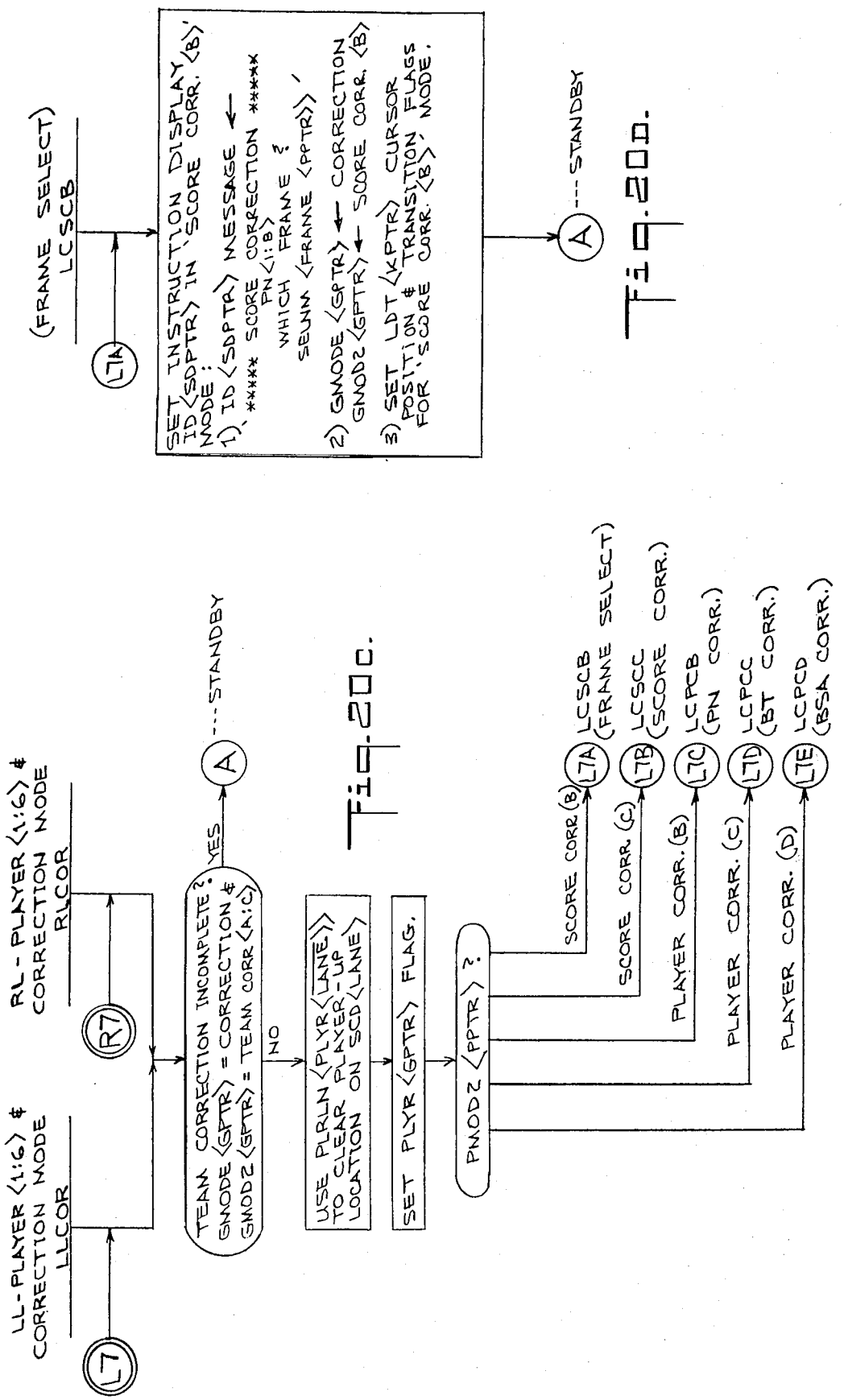

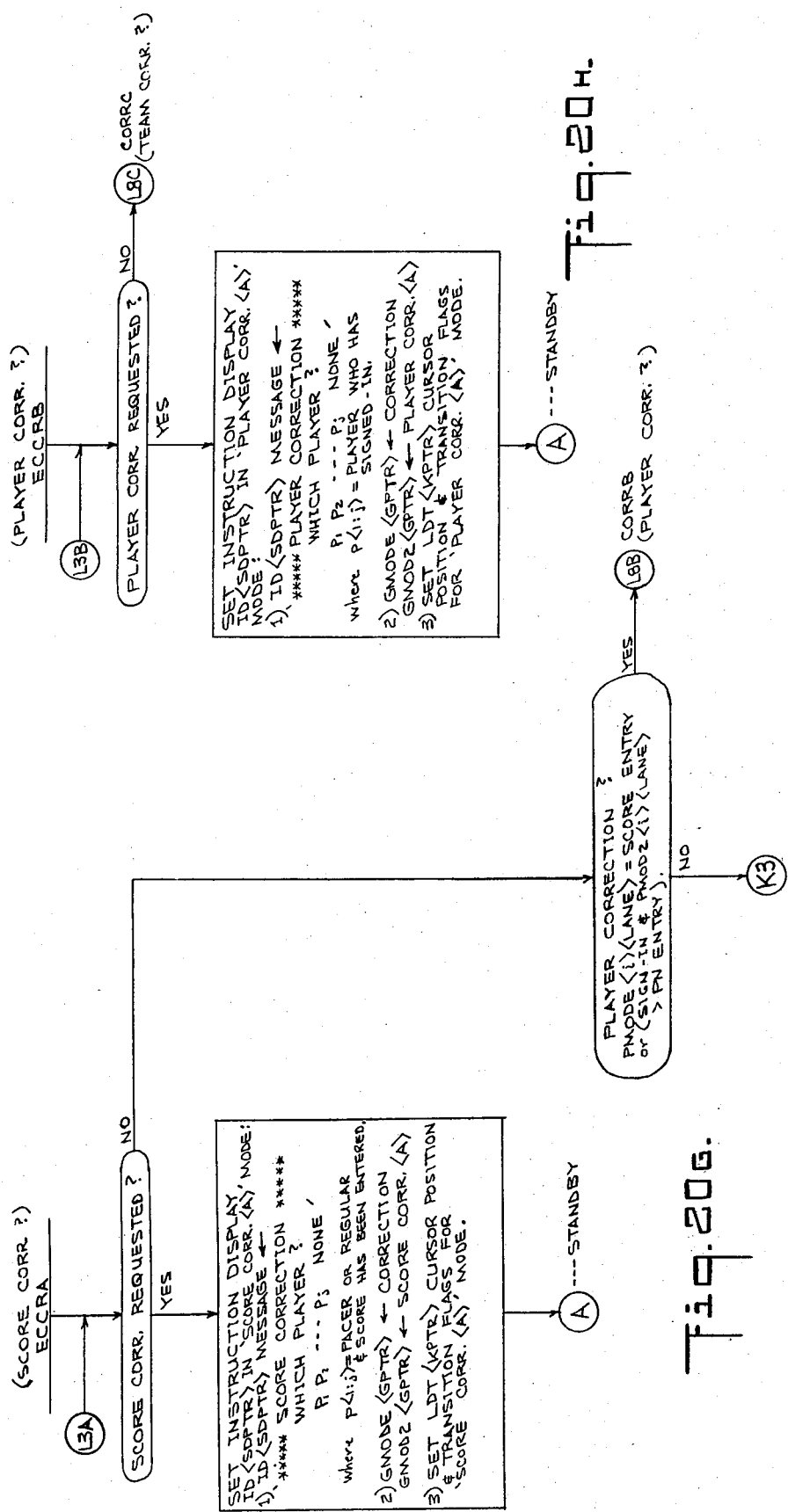

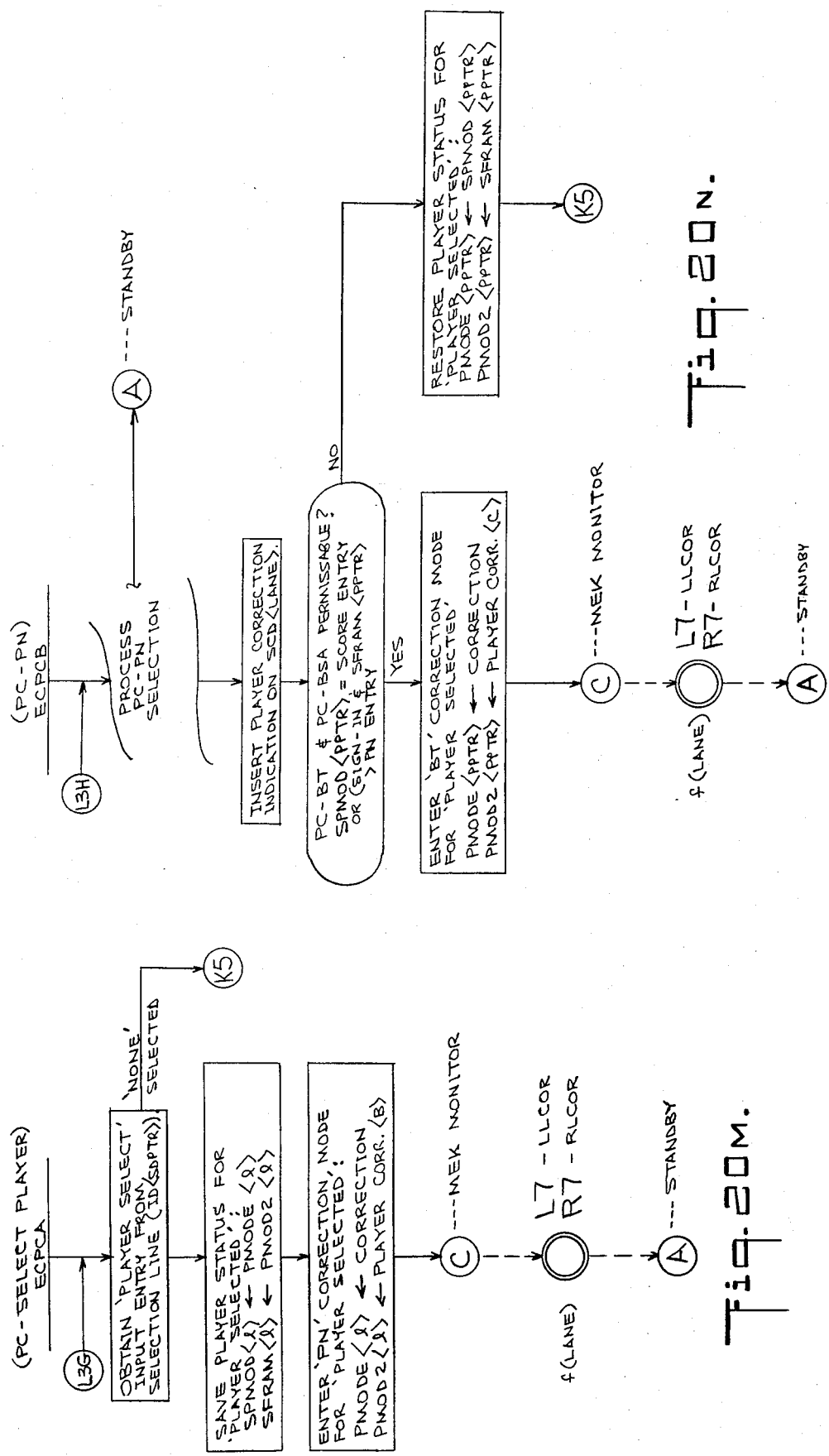

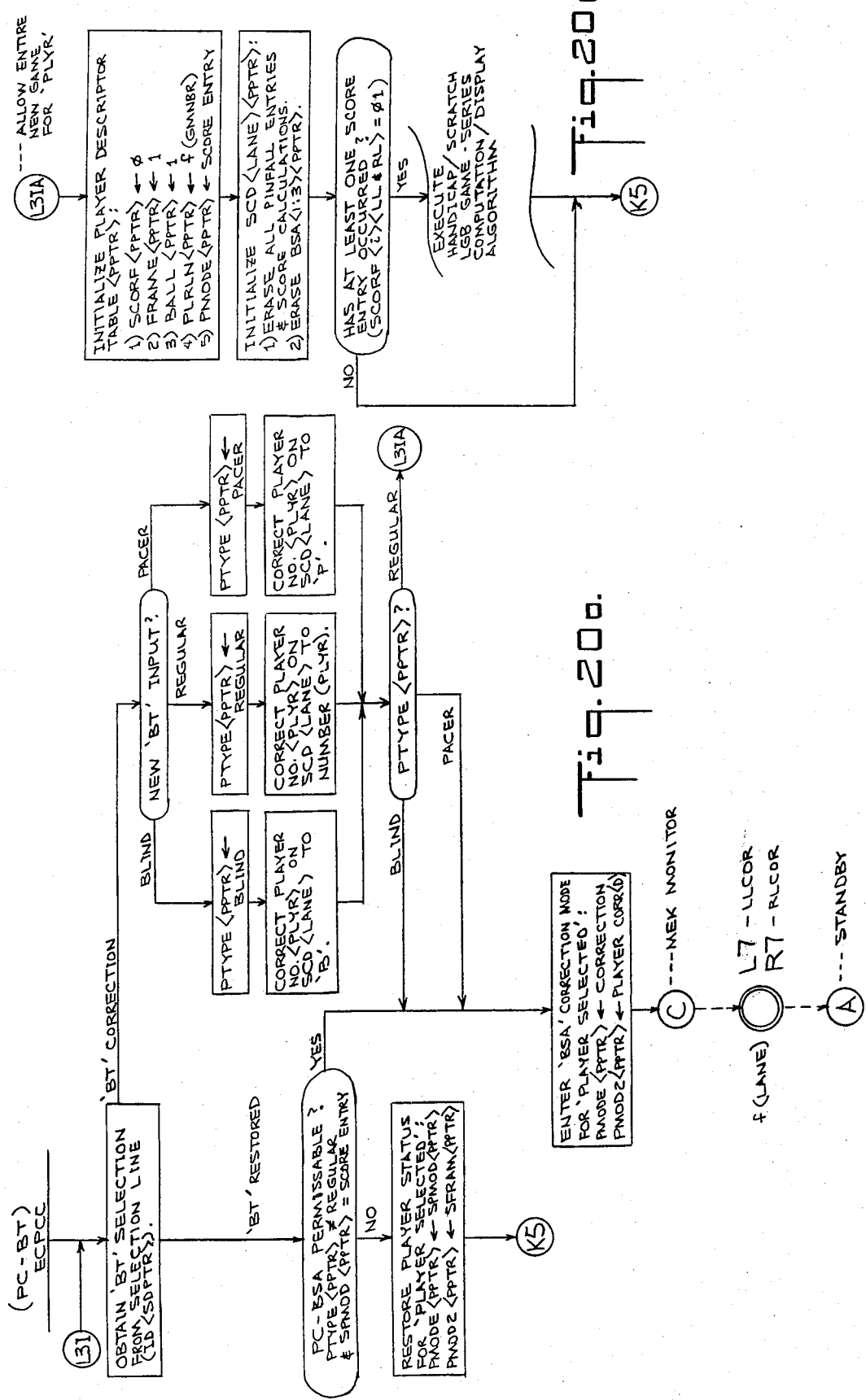

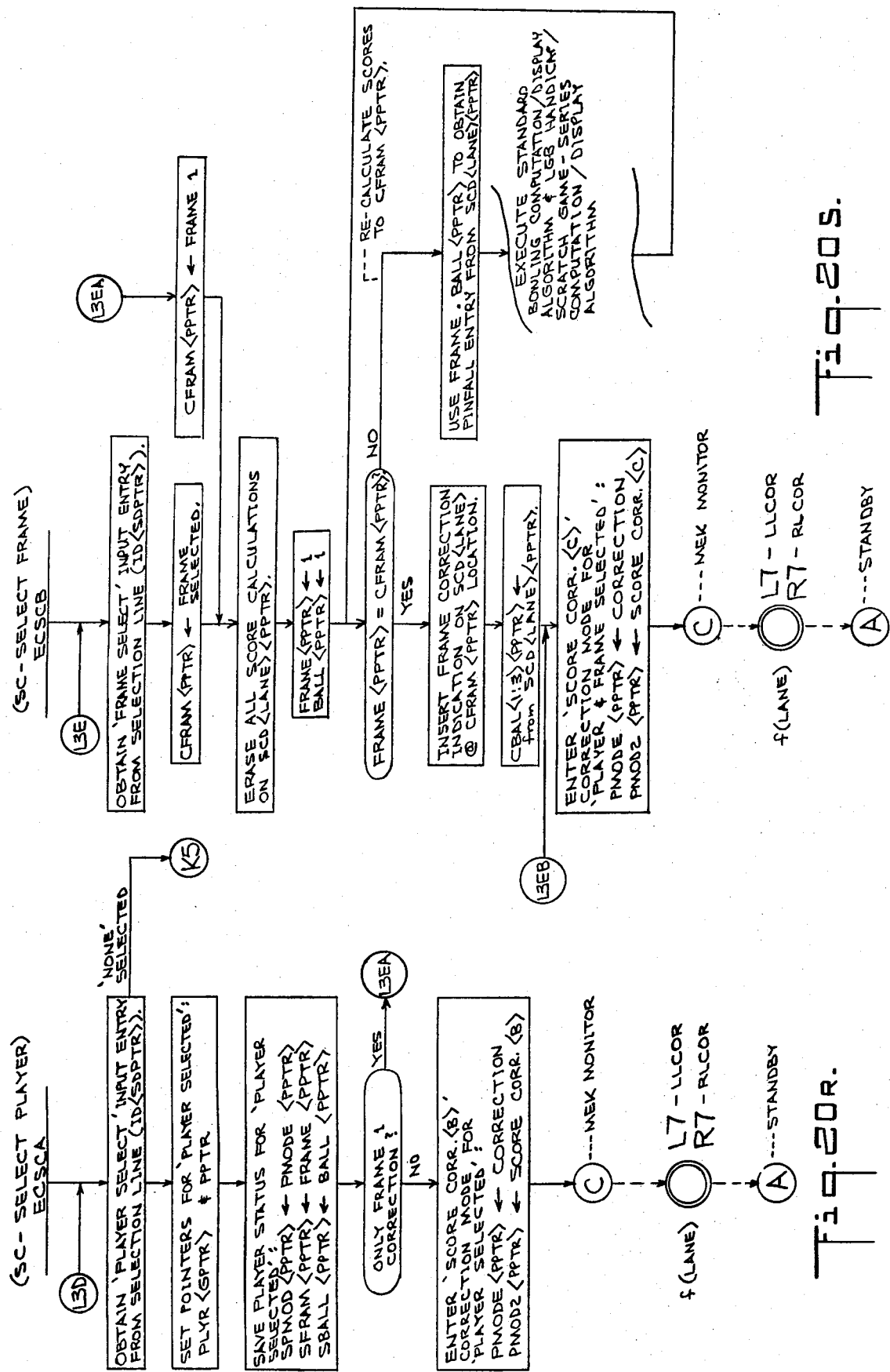

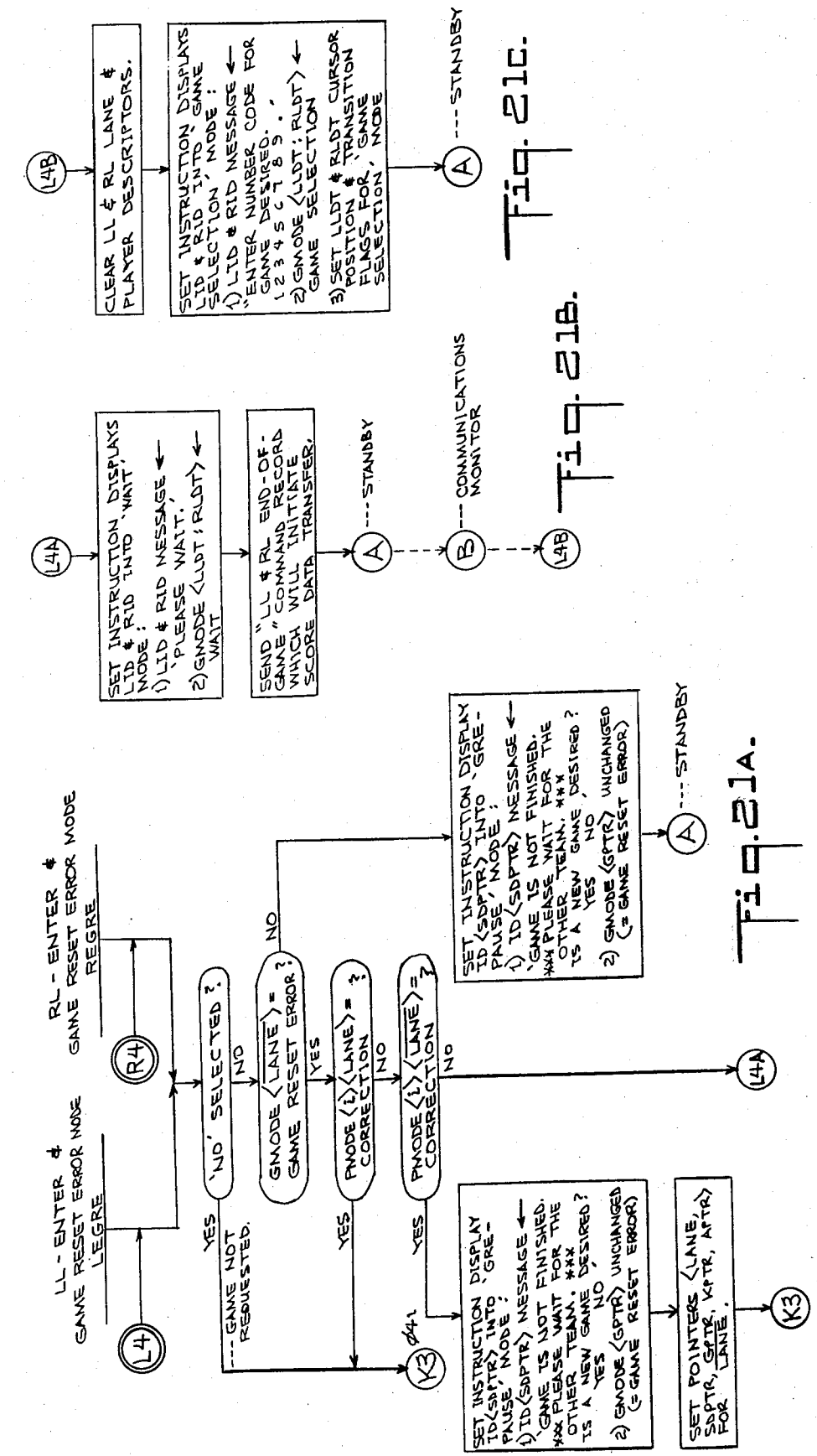

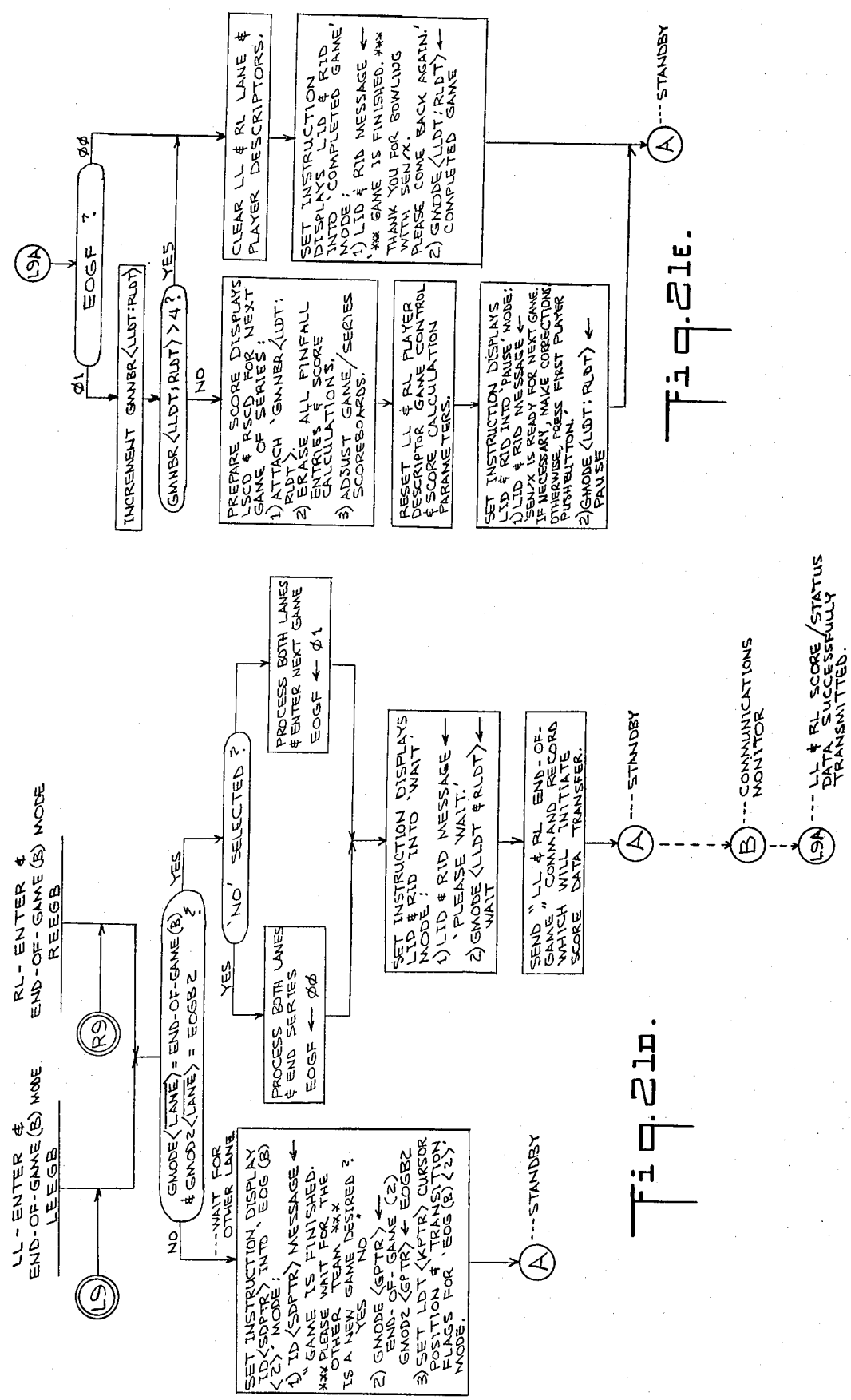

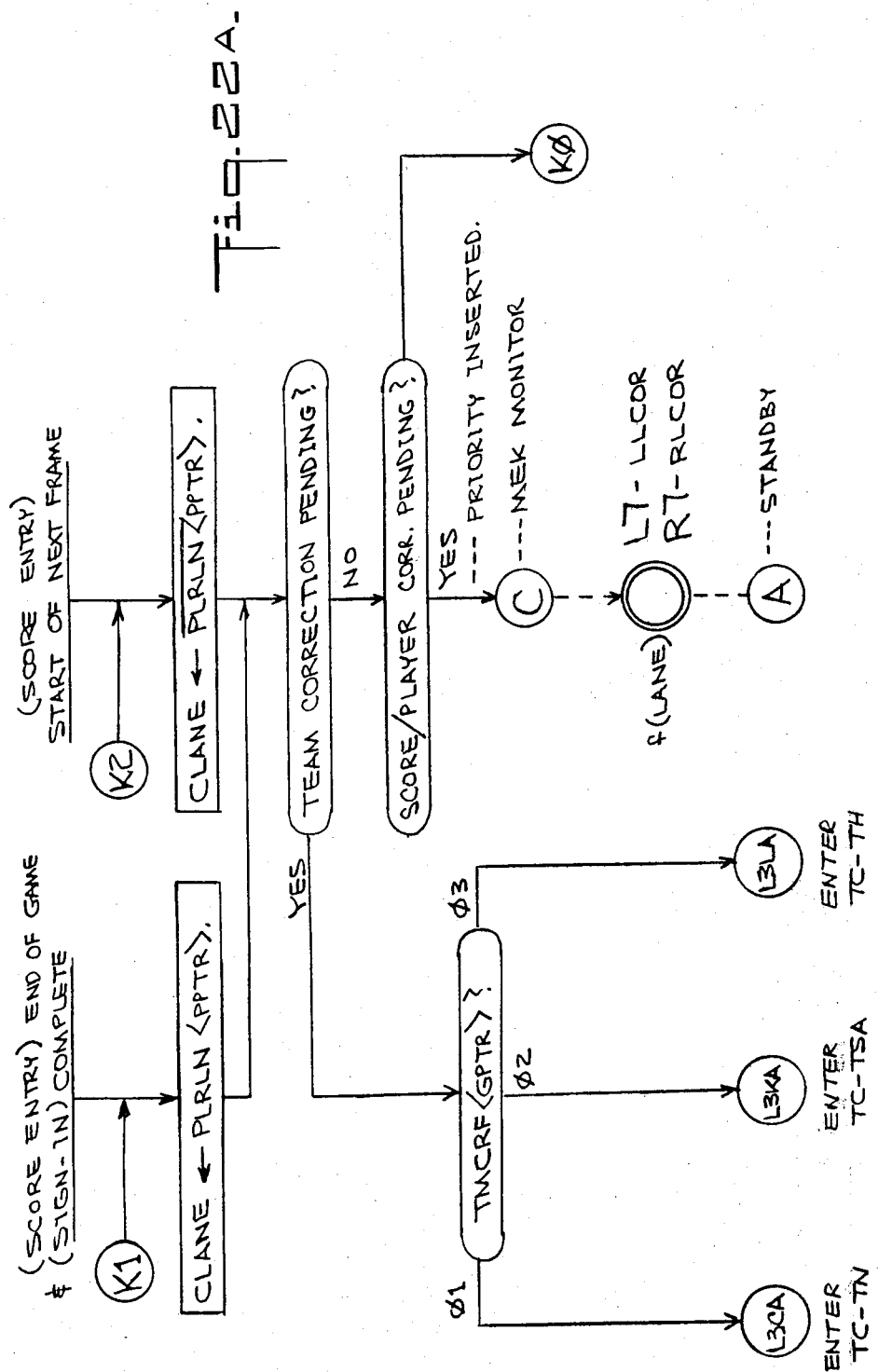

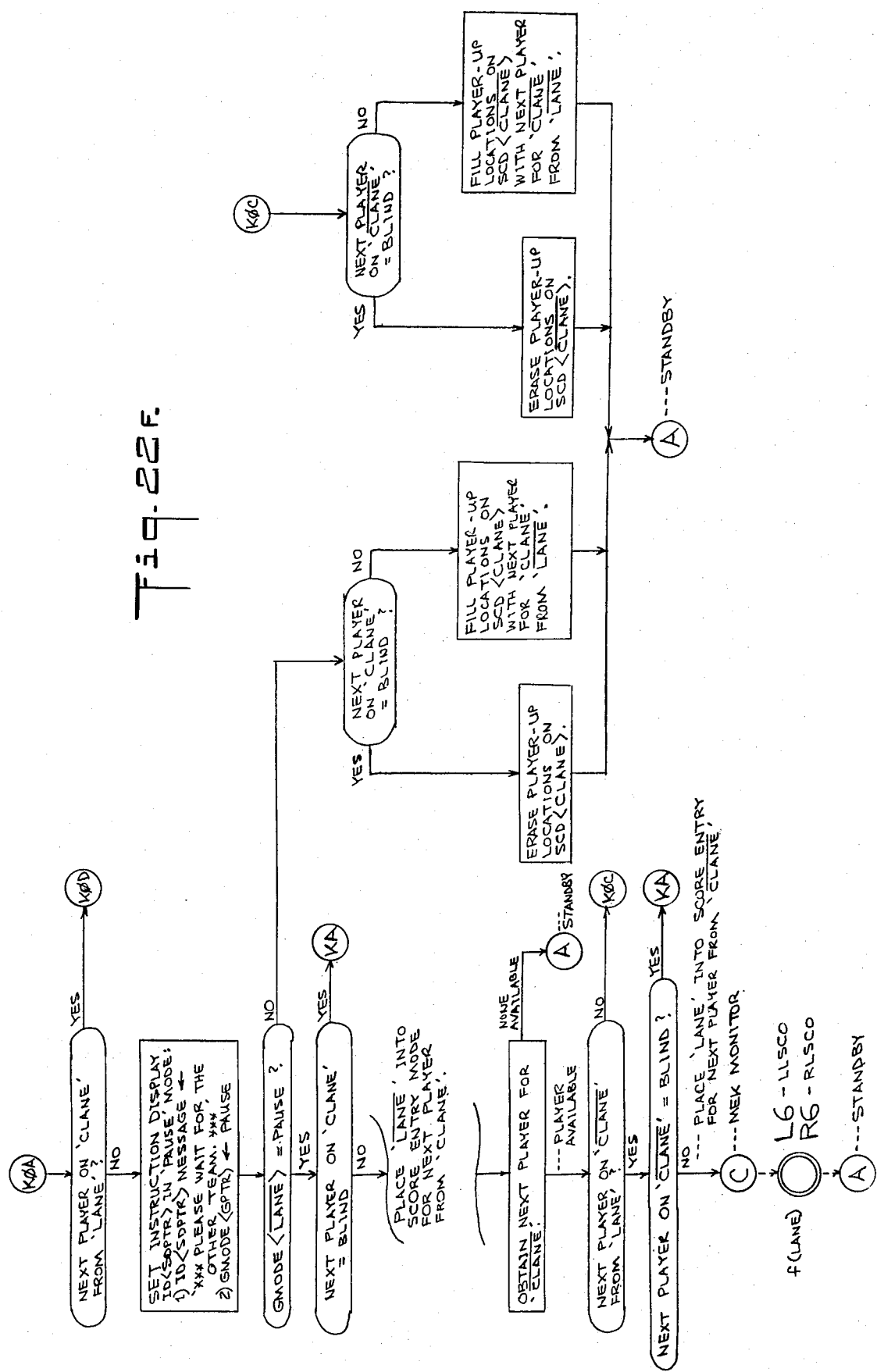

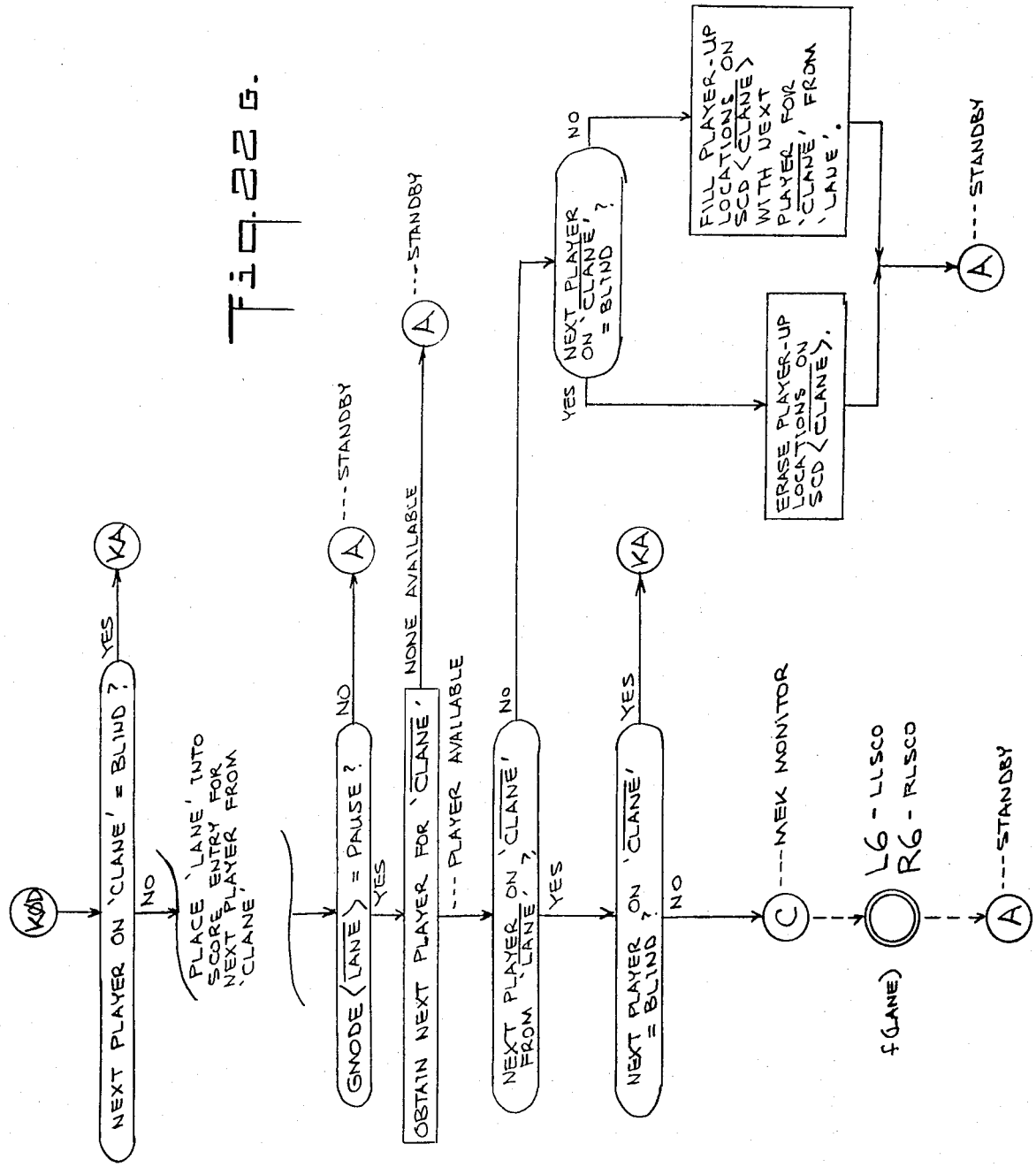

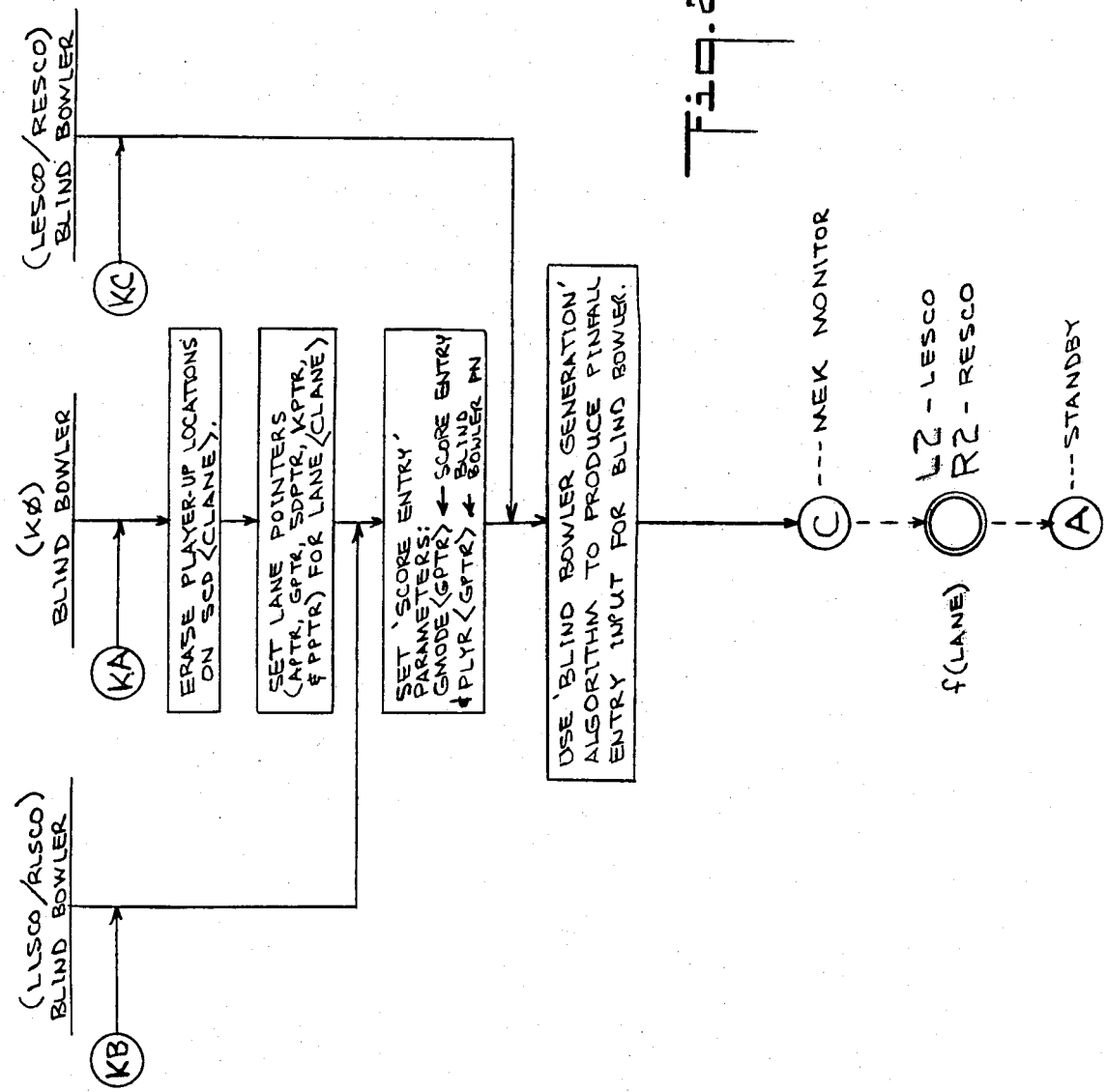

Fig. 24.

OPEN BOWLING II

| | 1 | 2 | 3 | 4 | 5 | 6 | 7 | 8 | 9 | 10 |
|---|---|---|---|---|---|---|---|---|---|---|
| CHRIS | 9/ 9 | 7 2 17 | X 44 | - 8 52 | 2 6 60 | X 80 | 7 X 90 | | | |
| GERRI | 3/ 17 | 8/ 11 26 | 6/ 7/ | 5/ 4 54 | 3/ 6 65 | 7/ 1 71 | X 0 71 | | | |
| ANGELO | 1 8 18 | 2 6 26 | 4 1 41 | 5 0 50 | 5 6 56 | X 73 | 7/ 83 | | | |
| CHRIS | 4 5 9 | 9F | 3/ 29 | 1 5 35 | X 62 | X 79 | 7 86 | | | |

HANDICAP SINGLES TOURNAMENT ***

| | 1 | 2 | 3 | 4 | 5 | 6 | 7 | 8 | 9 | 10 |
|---|---|---|---|---|---|---|---|---|---|---|
| ANGELO | 9/ | 8F | 5/ | 7/ | X | 9- | X | X | X | |
| 32 | 18 | 26 | 43 | 63 | 82 | 91 | 121 | 148 | 165 | |
| ANGELO | X | 9/ | 8/ | X | X | X | 9/ | 8/ | X | 7 |
| 41 | 20 | 38 | 58 | 88 | 117 | 137 | 155 | 166 | 176 | 172 |
| CHRIS | 1 | 2 | | | | | | | | |

| ANGELO | | CHRIS | |
|---|---|---|---|
| GAME 1: | 215 | GAME 1: | 241 |
| GAME 2: | 204 | GAME 2: | 217 |
| GAME 3: | | GAME 3: | |
| SERIES: | 419 | SERIES: | 458 |

Fig.26.

HANDICAP DOUBLES TOURNAMENT

| | 1 | 2 | 3 | 4 | 5 | 6 | 7 | 8 | 9 | 10 |
|---|---|---|---|---|---|---|---|---|---|---|
| CHRIS 26 | X | 9/ | X | 9/ | X | 9 | 8 | 9 | | *** |
| | 20 | 40 | 60 | 80 | 99 | 108 | | | | |
| CHRIS 31 | 4/ | 9/ | X | 5/ | 7/ | | | | | |
| ANGELO | 19 | 39 | 59 | 76 | 86 | | | | | |

GAME 1: 454
GAME 2: 251
GAME 3:
SERIES: 705

MANUAL-ENTRY SEMI-AUTOMATIC ELECTRONIC BOWLING SCORER

BACKGROUND OF THE INVENTION

The most common scoring system for bowling involves the use of a specialized printed score pad, wherein a scorekeeper records by hand the pin-fall for each ball rolled by the bowlers. In several instances, however, attempts have been made to provide automatic scoring systems wherein detectors are provided to sense the pin-fall for each ball, and outputs from the detectors are utilized to form input signals to a CRT display so that the bowler's scores are automatically "printed" on the display. Many difficulties have been encountered with such fully automatic scoring systems due in part to the psychological disadvantage of eliminating player participation in the scorekeeping, and due to the fact that their operation is not error free, thus requiring a system which permits manual data entry to correct errors in the automatically obtained score. Also, if the pin-fall detector portion of the system fails, a manual entry backup system is required to enter data on the CRT displays. Semi-automatic scoring systems also exist in the prior art wherein such systems use keyboards having complex data entry provisions utilizing a large plurality of instruction keys. Problems exist with this type of system in that the data entry format is so complex that it becomes difficult to train players in its operation. Due to these drawbacks, the commercial use of all earlier proposed automatic and semi-automatic scoring systems has been very limited.

Accordingly, it is an object of the present invention to overcome the disadvantages of the earlier proposed devices and to provide a unique and easily operable semi-automatic scoring system. A further object is to provide such a scoring system, utilizing computer circuitry and a CRT display, to calculate bowlers' scores for presentation in the conventional scoring format, wherein pin-fall data is entered through a key-board console.

SUMMARY OF THE INVENTION

In accordance with the present invention, at least three CRT display units are provided, wherein two of such units constitute scoring displays associated respectively with a pair of adjacent bowling lanes, and the third CRT unit constitutes a pair of instruction displays for instructing the scorekeeper as to the proper sequence of data entries for the pair of scoring displays. Scoring data is manually entered from a keyboard in accordance with the sequential instructions presented on the instruction display unit, whereas the apparatus processes the scoring data for application to the scoring display. This is, all of the scoring data entered through the keyboard is processed by a central processing unit (CPU) which controls video generation circuitry for the various displays. Video generation is also controlled by the output of a single display controller circuit, wherein the score displays and the instruction displays each include two-port memories having inputs coupled respectively to the display controller logic and the CPU.

The combination of elements, and especially the use of a programmable instruction display, permits the utilization of a minimum number of data entry keys on the keyboard, wherein the preferred embodiment described herein requires only eleven instruction keys for each scoring display unit, while permitting scorekeeping for league bowling and many other types of bowling games. Instruction messages requesting the various scoring entries which must be made by the scorekeeper are sequentially presented on the instruction display. Another important feature of the keyboard is that numerous entries can be made utilizing only three keys, two of which are used to control the direction of a cursor which permits the selection of a number of alpha-numeric characters presented on the instruction display, while the third button in the group is used as an ENTRY key for entering desired characters indicated by the cursor. The other eight keys on each keyboard include six player identification keys, a correction key and a game select key. The six player identification keys are included to provide a single identification of the players for whom subsequent scoring data is entered. In response to actuation of the game select key, and the subsequent identification of a selected scoring format, the instruction CRT unit displays a sequence of instructions corresponding to the selected game and such instructions may be programmed to provide any combination of an infinite number of messages. As described in detail herein, the correction key initiates a sequence of instructional messages which permit previously entered data such as pin-fall scores, player's names, etc., to be corrected, whereupon the apparatus automatically recalculates the bowler's accumulated score to provide a corrected display.

The instruction display as well as the two scoring displays are operable by a single display controller module due to the use, in each of such displays, of two port-memories, so that one of such ports in each memory receives access instructions from the single controller module, and the other port receives access instructions from the central processing unit. The video generating circuitry for the scoring displays includes separate border and character memories, each of which is operated as a refresh memory. The border memory is capable of producing any format of horizontal and vertical lines on the scoring displays, since it provides signals usable to produce such lines at any one or more of 40 horizontally spaced locations. Furthermore, the video generating circuitry for producing characters on the scoring displays, as disclosed herein, permits the display of two different sizes of scoring numerals so that individual ball scores can be recorded, as well as temporary and permanent cumulative scores. Furthermore, the versatility of the video generating circuitry permits the presentation on the score displays of updated team-comparison differential scores for league and tournament competition, such scores being updated and displayed continuously during a game. For example, in the case of league competition, a team's actual average may be displayed, as well as its handicap, adjusted average, and a score indicating the relative score advantage or disadvantage, including handicap pins, of each team.

BRIEF DESCRIPTION OF THE DRAWINGS

Specific embodiments of the invention are disclosed herein for purposes of illustration and description, and are shown in the accompanying drawings forming a part of this specification, wherein:

FIG. 3 is an enlarged view of one of the score displays illustrated in FIG. 1;

FIG. 5 is a block diagram illustrating the electronic components and interconnections of the scoring console and the various displays;

FIG. 6 is a schematic diagram of the manual entry keyboard and the interface logic illustrated in FIG. 5;

FIGS. 10a and b show schematic diagrams of the display controller logic illustrated in FIG. 5;

FIGS. 11a–d are schematic diagrams of the instruction display illustrated in FIG. 5;

FIGS. 12a–d are schematic diagrams of the score display logic illustrated in FIG. 5;

FIGS. 13a and 13b disclose general and detailed operation flow diagrams for controlling the operation of the CPU;

FIGS. 14a and 14b show general descriptor tables;

FIGS. 19a–h show score entry mode control, computation and display routines for scoring league bowling;

FIGS. 21a–e relate to end-of-game mode control and display routines for league bowling;

FIGS. 22a–h relate to bowling instruction cycle control routines;

FIG. 23 is a block diagram indicating communication lines between a plurality of the scoring systems, disclosed in FIG. 1, when connected with centralized data processing equipment;

FIG. 24 illustrates a score sheet format for open bowling; and

FIGS. 25–29 show specialized score sheet formats for other types of bowling games.

DETAILED DESCRIPTION OF THE INVENTION

Figure 1:
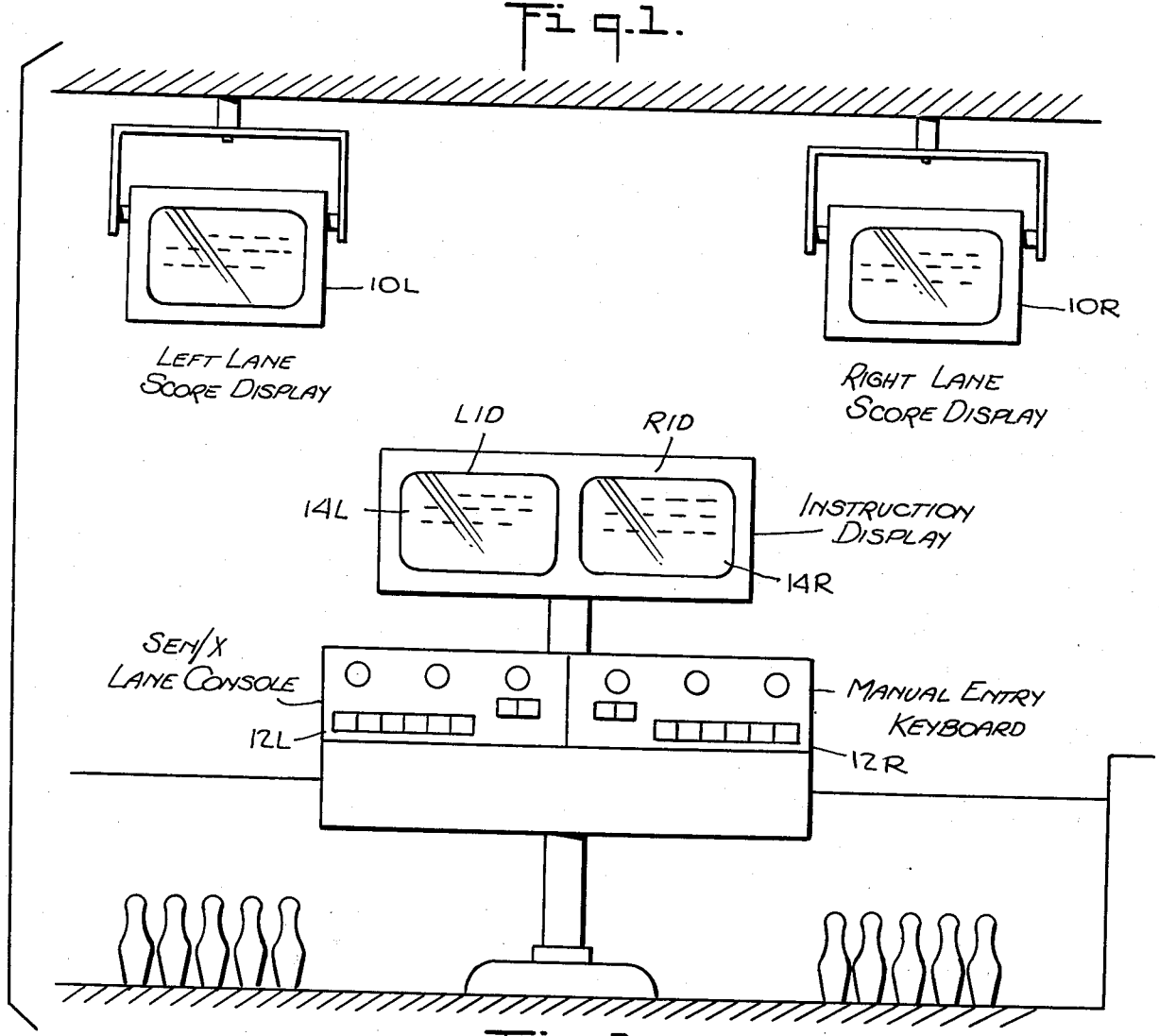
FIG. 1 is a pictorial view showing a scoring console comprising a manual-entry data input device and instruction displays, and showing a pair of scoring displays for a corresponding pair of bowling lanes.

The present invention as illustrated in FIG. 1, provides a scoring console wherein data may be entered on a keyboard for presentation on a pair of individual CRT score displays associated with a pair of adjacent bowling lanes.

Figure 2:
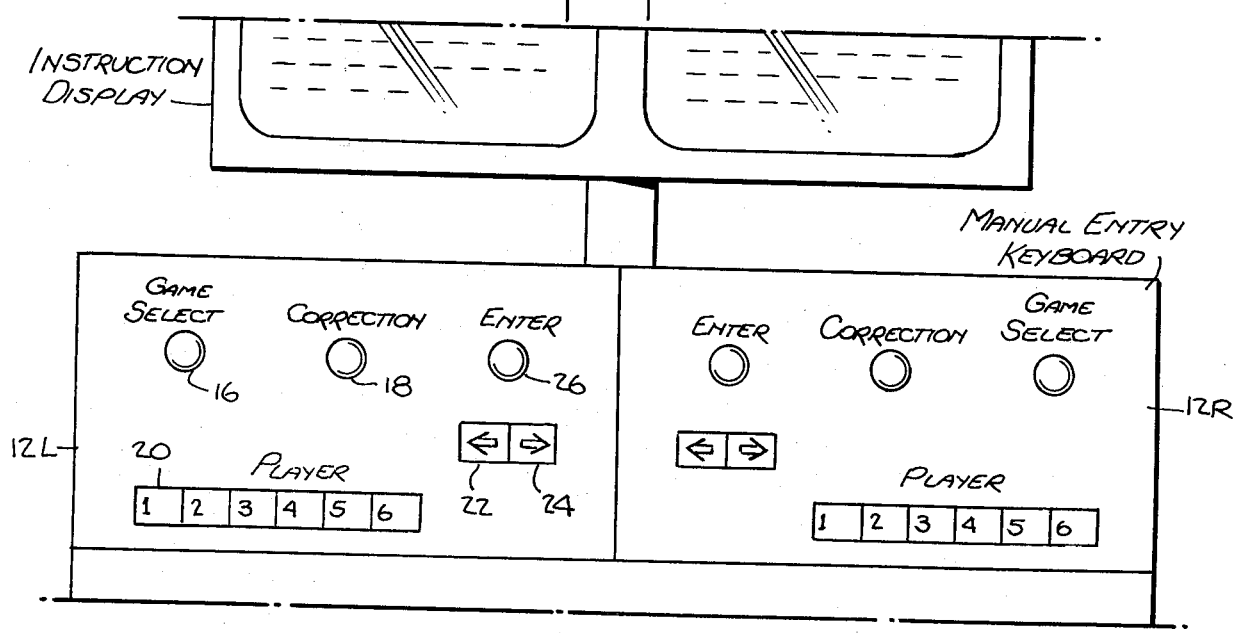
FIG. 2 is an enlarged view of the manual entry keyboard and instruction display console illustrated in FIG. 1.

The score displays illustrated in FIG. 1 may constitute, for example, 23 inch CRT's 10L and 10R suspended respectively over a pair of adjacent bowling lanes, and any one of various scoring formats may be presented on the displays in response to instructions entered on the keyboard having positions 12L and 12R. The console includes instruction displays 14L and 14R disposed above the keyboard for instructing the scorekeeper as to what data must be entered on the keyboard, and the instructions are presented in a sequential manner as described in detail below with relation to FIGS. 2 and 4. The specific keys required in a preferred embodiment of the invention, as shown in FIG. 2, include a game select key 16, the actuation of which permits the scorekeeper to select any one of a number of different types of bowling games, wherein the formats for scoring those games may differ. A correction key 18 is also provided to permit a scorekeeper to enter a correction in the score presentation on the score displays. Furthermore, the keyboard, which is divided into left and right sections 12L and 12R, for operation in response to the two instruction displays 14L and 14R, has 11 keys on each section, including, respectively, the game select and correction keys 16 and 18, six player selection buttons 20, and a group of three keys, two of which (22 and 24) control the direction of a cursor for use in selecting one of various numerals presented on the instruction display, and the third key 26 of which provides an ENTER key to instruct the entry of the numeral indicated by the cursor. Representative instructions are provided on the instruction displays, wherein the scorekeeper may be instructed to press the game select button 16 to indicate which type of bowling game is intended to be scored.

Disposed at the upper portion of the instruction displays 14L and 14R are respective indicator lamps, wherein such lamps provide a signal to alert the scorekeeper that a correction is being entered on one of the score displays.

The apparatus of the invention is capable of generating a wide variety of scoring formats for display on the score displays, and such a format utilized for standard league bowling is illustrated in FIG. 3 which constitutes an enlarged view of one of the score displays illustrated in FIG. 1. In the score display of FIG. 3, the player's names are entered in a column at the left side of the presentation, thus corresponding to a standard bowling score sheet, and the players' identification number is entered immediately to the left of his name, such number corresponding to the player keys 1–6 provided on the manual entry keyboard of the console as illustrated in FIG. 2. Furthermore, the display illustrated in FIG. 3 provides an indication of the name of the bowler whose turn is next in the game, and that indication is provided at the upper left corner of the presentation, wherein it is seen that the score display indicates that "MARTHA" should be the next bowler. The presentation in FIG. 3 also indicates, for example, that the first bowler listed on the score display is "RANDY", and that "LUCY" is a "blind" bowler, and thus the letter "B" is entered to the left of her name. This indicates that no one is bowling in the second position but that a score for the second bowler has been entered as indicated by the number "154" set forth above the entry "LUCY". In this case, as will be discussed hereinbelow, the scores are automatically entered at each frame for a "blind" bowler, wherein the sum of such scores equals the scratch average entered for that bowler. For example, in FIG. 3, the apparatus would automatically enter a score of "6/" in Frames 1–5 and a score of "5/" in Frame 6, as the game progresses, whereas the final score for the second player would equal "154".

Further, with respect to FIG. 3, there will be noted the presentation of a small "C" in the third frame for the third bowler. The entry of such a correction will be described hereinafter with respect to FIGS. 4f–h. Other informational entries are shown with respect to the fourth bowler "TOM" wherein the letters "P and C" are entered to the left of his name, and wherein a scratch bowling average (i.e. a nonhandicapped average) of "162" is entered immediately above his name. The letter "P" indicates that the bowler "TOM" is a pacer bowler, and the entry "162" indicates the scratch average which has been entered for the fourth bowler on the team. The letter "C" indicates that a correction has been made to the bowler identification, as for example, some other bowler having an average of "162" may have bowled in earlier games in the series whereas a pacer bowler "TOM" has now taken over.

In the second frame for the fifth bowler "KAREN", a "P" is entered to the left of the pin-fall indications "2" and "/" and that designation "P" indicates that a provisional score has been entered. That is, a dispute may have arisen as to the number of pins which fell as a result of the second ball bowled by the fifth player "KAREN" in the second frame, wherein it was provisionally agreed that a spare would be entered but that a record would be made as to the dispute, and such record is indicated above the player's name by the pin-fall entries "2" and "7". In summary, it will be seen that the dispute is with respect to the second ball rolled by the player "KAREN", and that there is a question as to whether seven or eight pins fell as a result of that ball. As also shown in the fifth line of the score sheet presentation of FIG. 3, the score entries for the last two frames are smaller than the remaining score entries, thus indicating temporary scores, since the permanent scores for those frames can not be ascertained until that bowler rolls another ball.

Various continually updated scoring indications are presented in the lower portion of the display illustrated in FIG. 3. For example, the first number entry "126" in the lefthand portion thereof indicates the team handicap for the "ALLEY CATS", and the number "832" presented immediately therebelow indicates their team scratch average. To the right thereof, there is an indication as to the completed results of Game 1 wherein the team score plus the handicap is indicated as being "963" for the first game, and the asterisk immediately to the right thereof indicates that the "ALLEY CATS" won that first game. Directly therebelow is an indication of the present status of the second game which is the game presented on the score display in FIG. 3, and that indication is the total score plus handicap approximately midway through the game is "504" but that the team is 13 pins behind, as indicated by the " −13" entry, due to the relative scores between the "ALLEY CATS" team and their opponents midway through the second game. Moving to the right, the next entry, namely, the presentation "1467+125" indicates that for the series the "ALLEY CATS" team has a handicap series score of 1467 and that they are 125 pins ahead. Finally, at the righthand portion of the figure there is a presentation "378", and the presentation "−52" immediately therebelow. Those entries indicate that the actual score of the team midway through the second game is 378 pins, and that the team is 52 pins behind their opponents in scratch scores.

Figure 4A:
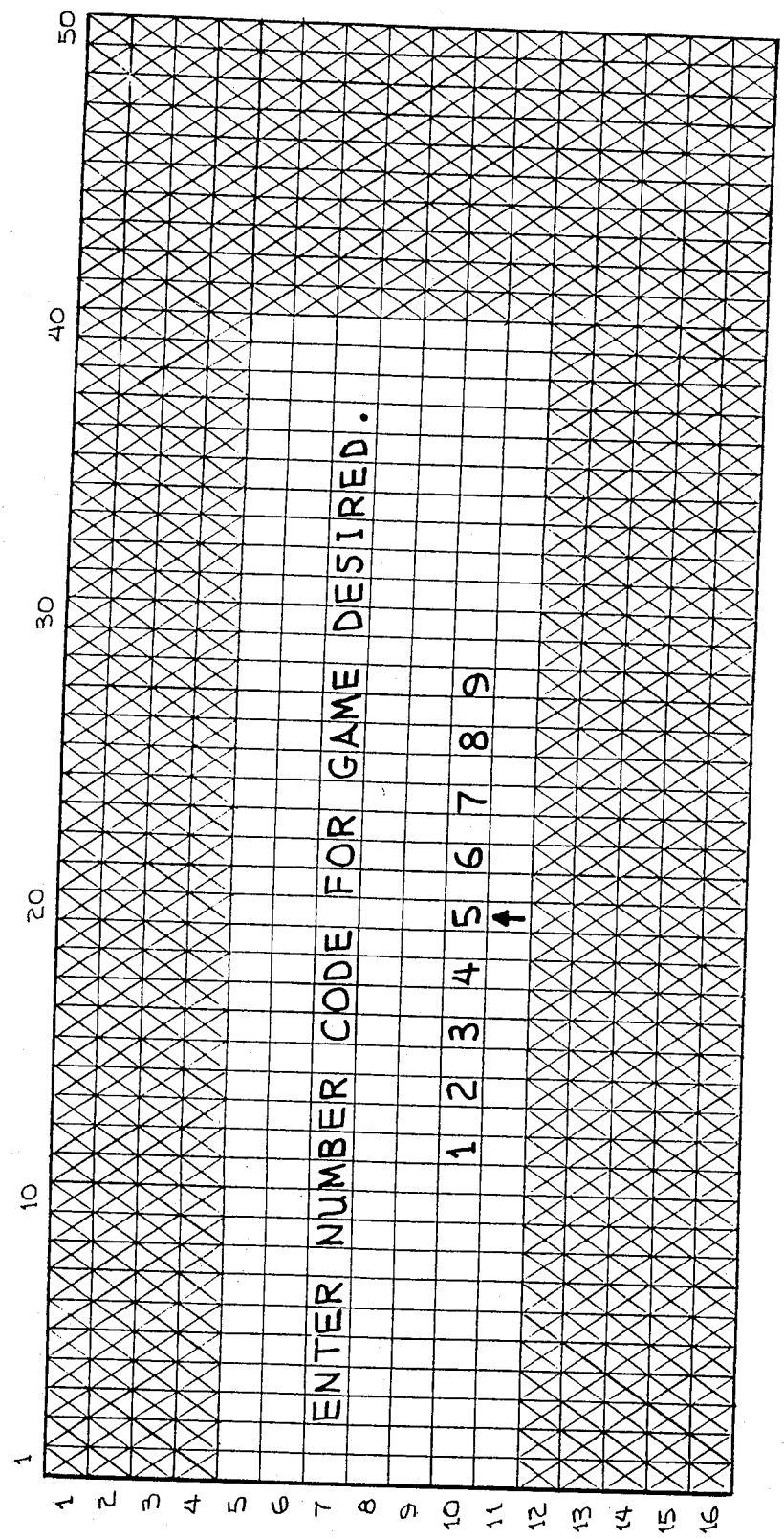
FIGS. 4a–h illustrate respective instruction messages presented on the instruction display.
Figure 4N:
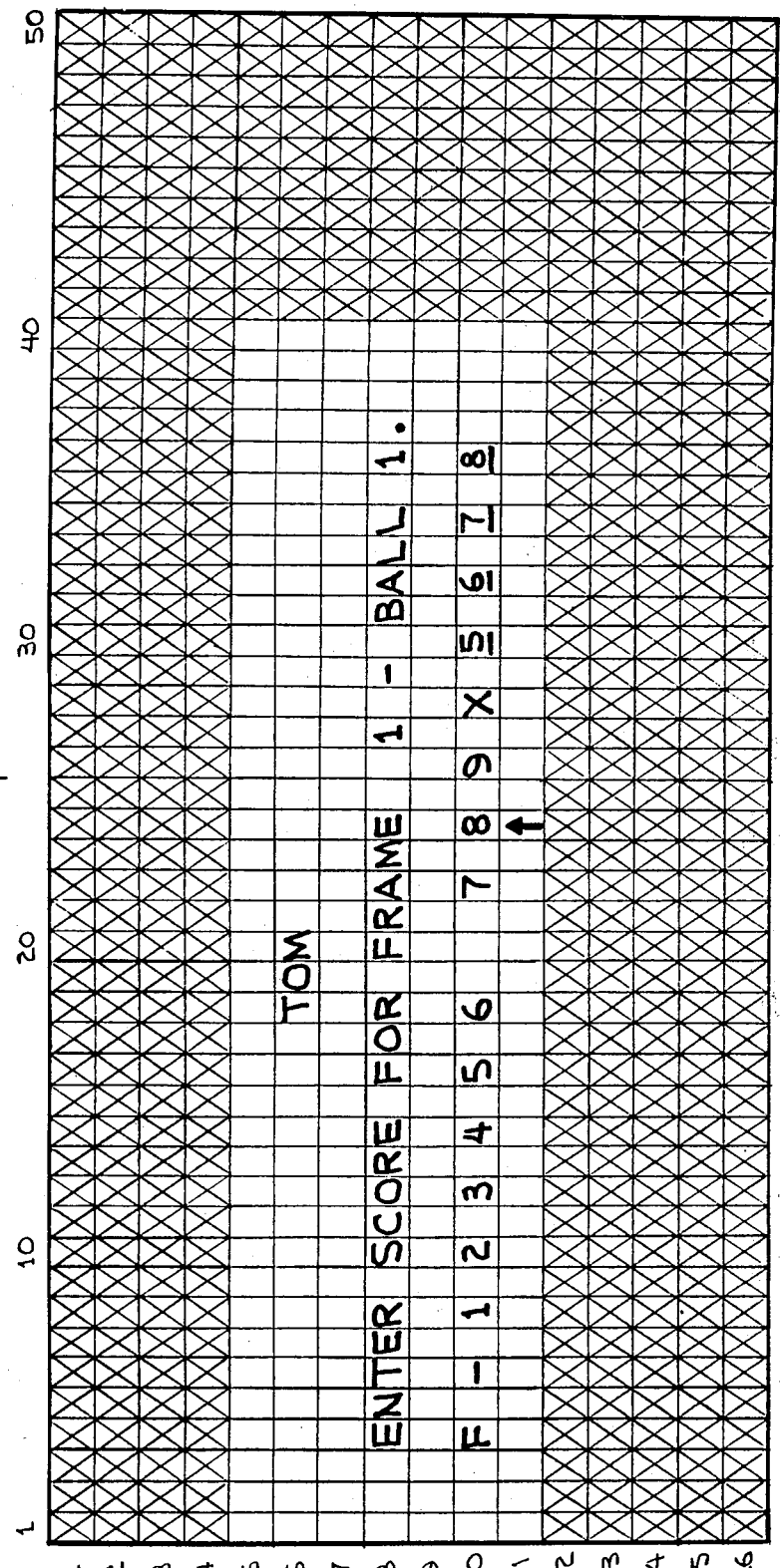

The instructions for keyboard entries resulting in presentations such as illustrated in FIG. 3, are shown in FIGS. 4a–n which depict the instructions for both of the score displays illustrated in FIG. 1, wherein the instructions set forth at the left and right instruction displays are associated respectively with the left and right score displays.

A first message which may be entered on the instruction display is PRESS "GAME SELECT" as depicted for example in FIG. 2, and also after that game select key 16 also indicated in FIG. 2 is actuated, the next message may be ENTER NUMBER CODE FOR GAME DESIRED as shown in FIG. 4a. The response to that instruction, one of the directional keys on the keyboard is actuated to transfer the cursor arrow initially indicated under the numeral 5, to the right or left whereupon when the cursor is aligned with a desired game number, the entry key is depressed causing entry of that number. Thus, one may have a library of games which may be selected when the cursor arrow illustrated in FIG. 4a is shifted to the selected game and the entry key is depressed. As a result of the game selection, the proper scoring format will be presented on the corresponding score display 10, and the instruction display 14 will exhibit a message requesting the scorekeeper to PLEASE WAIT while the proper scoring format is entered in the score display. Again in the following description, the instructions on the Instruction Display, and entries made in response to those instructions generate the scoring presentation illustrated in FIG. 3.

In sequence, the next message which may be automatically entered on the instruction display, as shown in FIG. 4b, may be the instruction ENTER TEAM NAME, and this assumes that the selected scoring format will correspond to a standard league bowling scoresheet. Directly beneath the above-quoted instruction, as shown in the upper portion of FIG. 4b, are all of the letters of the alphabet, in addition to the entries "Space", "." and "Erase". When the cursor is directed to the left or right by one of the appropriate arrow keys, the name of the team can be spelled out for entry on the score display by sequentially aligning the cursor with desired alpha characters and depressing the entry button, and the name so-entered will also appear letter-by-letter at the upper portion of the Instruction Display. A next instruction may be ENTER TEAM SCRATCH AVERAGE. In this case, the cursor may be used to select any numeral from 0–9 and the scratch average may be entered by depressing the entry key sequentially with the alignment of the cursor under appropriate numbers. Similarly, another instruction, not shown in the Figures, may be ENTER TEAM HANDICAP. A subsequent instruction may be ENTER NAME FOR PLAYER 1, wherein alpha selections will be presented again as in FIG. 4b, and wherein alignment of the cursor and depression of the entry key under the "." constitutes an indication that the response to the instruction has been completed. In sequence, another message, as shown in FIG. 4c, may be SELECT BOWLER TYPE and the possible selections, as indicated, are "Blind", "Regular", and "Pacer". In this regard, terms "Blind" relates to a situation where a league bowler may be absent, but provisions are made to enter a predetermined scratch average for that bowler, so that such average will be included in the scoring as described below. In the case of a "Pacer" bowler, a predetermined scratch average is entered for the absent bowler, but an individual other than the absentee member is permitted to bowl in his place to provide a "pacing" sequence for the turns taken by the bowlers, and score entries may be made on the display for the actual scores of the pacer bowler but the scratch average entry is utilized in the actual team scoring, also as described below. A next instruction, may be to enter a named "Blind" or "Pacer" bowler's scratch average, and a presentation of numerals will again be presented, as shown in FIG. 4a. Again, as shown in FIG. 3, the second named bowler has been identified as a "Blind" bowler, whereupon her scratch average is entered as "154".

Figure 4E:
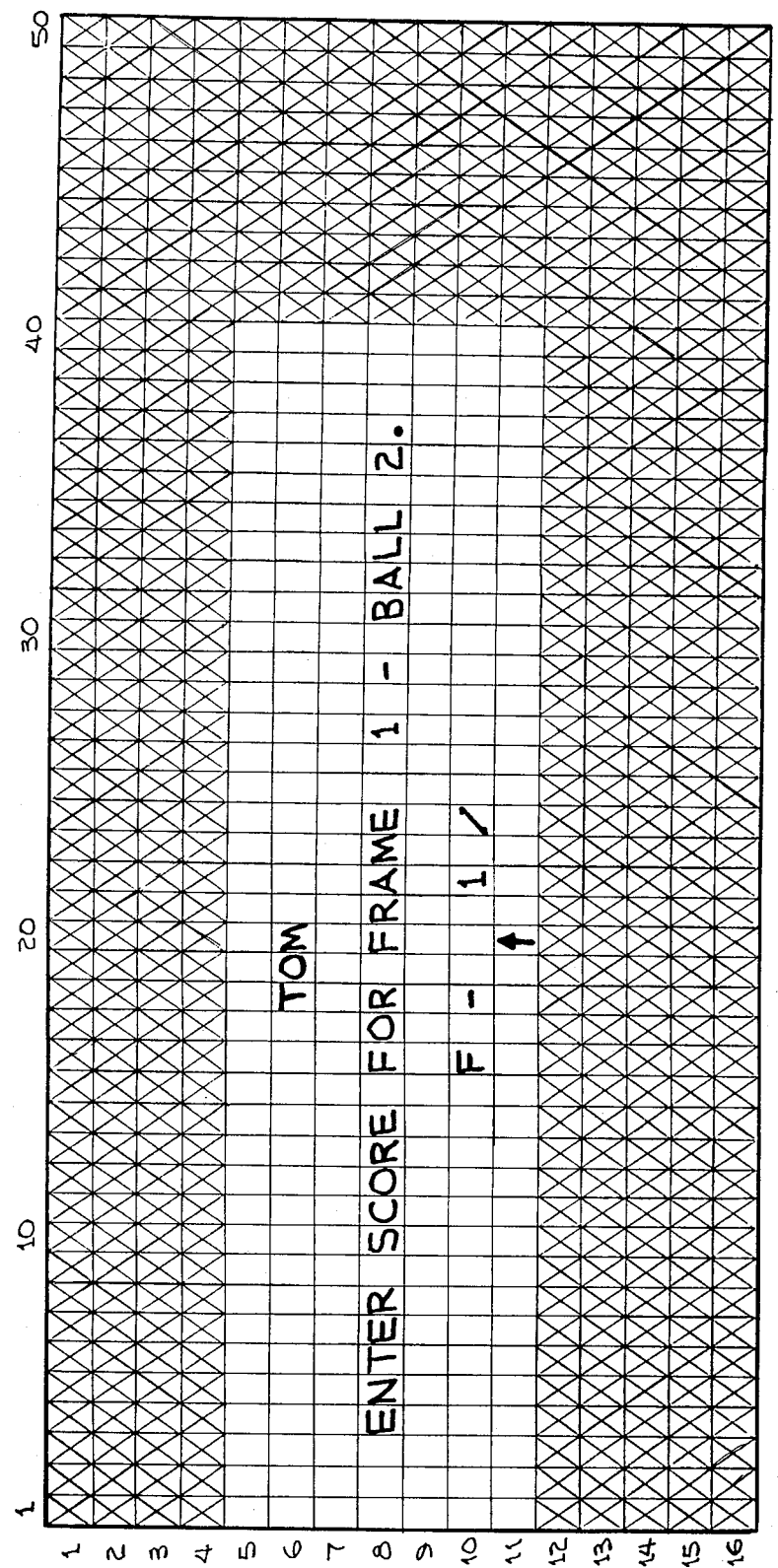

Upon completion of data entry for each of the players, the game may proceed, and the next instruction may be as depicted in FIG. 4d, namely, ENTER SCORES FOR FRAME 1 -BALL 1. As shown, the selection for entering a score may be "F" for indicating a foul, "-" for indicating a miss, "X" for indicating a strike, and the numbers "1–9" representing pin-fall scores. Also, split indications are provided as shown for example by the scores "5" and "3" in the third frame for the first bowler in FIG. 3. Correlating the scoring with the score of the fourth bowler "TOM" as shown in FIG. 3, and assuming that the selected entry for Frame 1, Ball 1, was an "8", the next instruction is to enter the score for the same player, for Frame 1, Ball 2, wherein the selection presentation includes the designations "F", "-", "1" and "/", as shown in FIG. 4e. That is, the system automatically limits the selection of the instruction display to the only possible scores which could be entered with respect to the second ball when an "8" was bowled with the first ball. As shown in FIG. 3, the player "TOM" fouled when rolling the second ball. Accordingly, the scoring presentation for "TOM" provides pin-fall entries "8" and "F" for the first frame, and therefore indicates a first frame score by a larger numeral "8". Instructions are provided also to guide the players as to turns taken by the opposing teams, and therefore an instruction message, not shown, may instruct the team to PLEASE WAIT FOR THE OTHER TEAM, thus helping to ensure that the teams alternate between the two lanes.

Figure 4F:
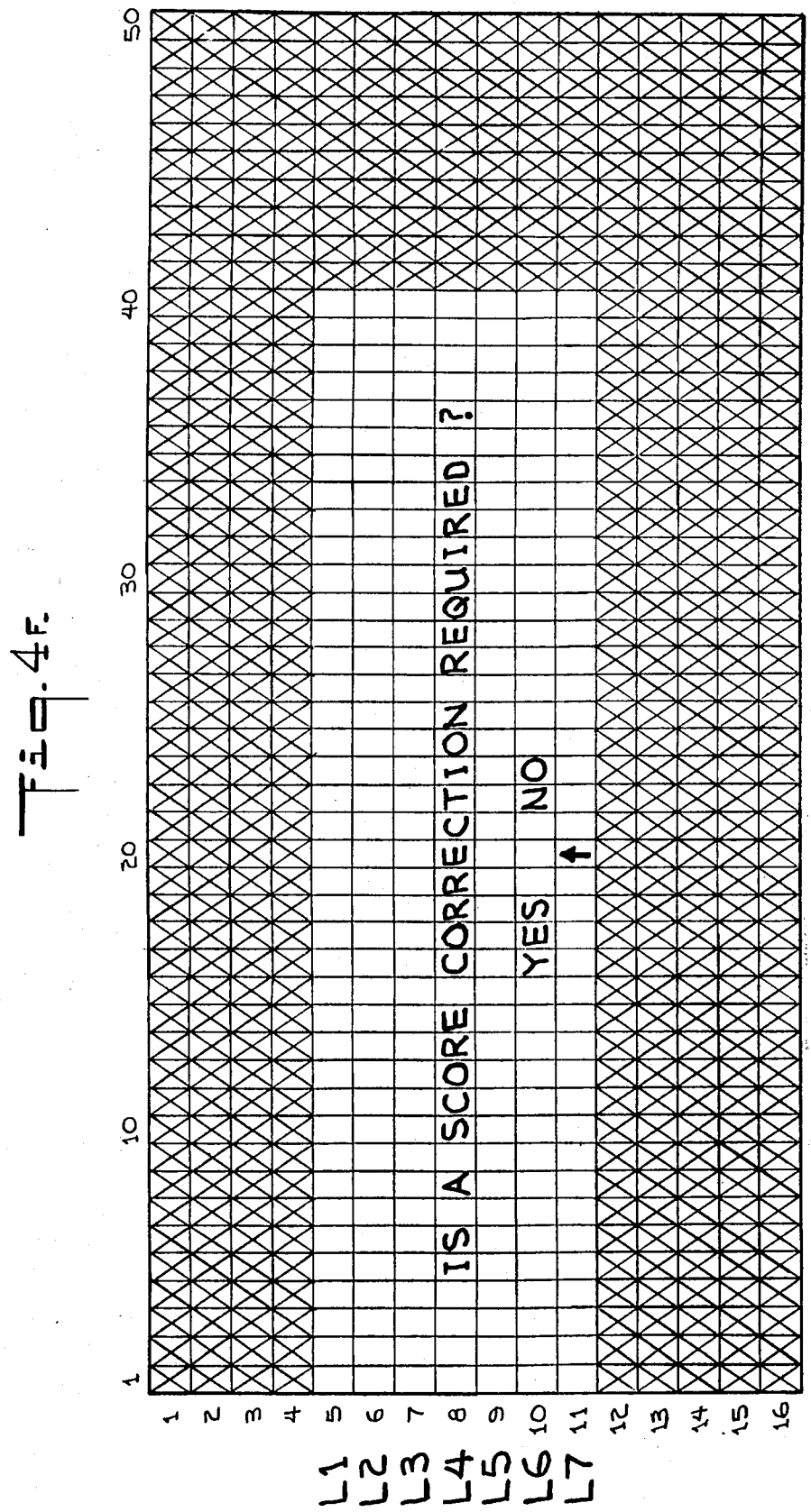
Figure 4G:
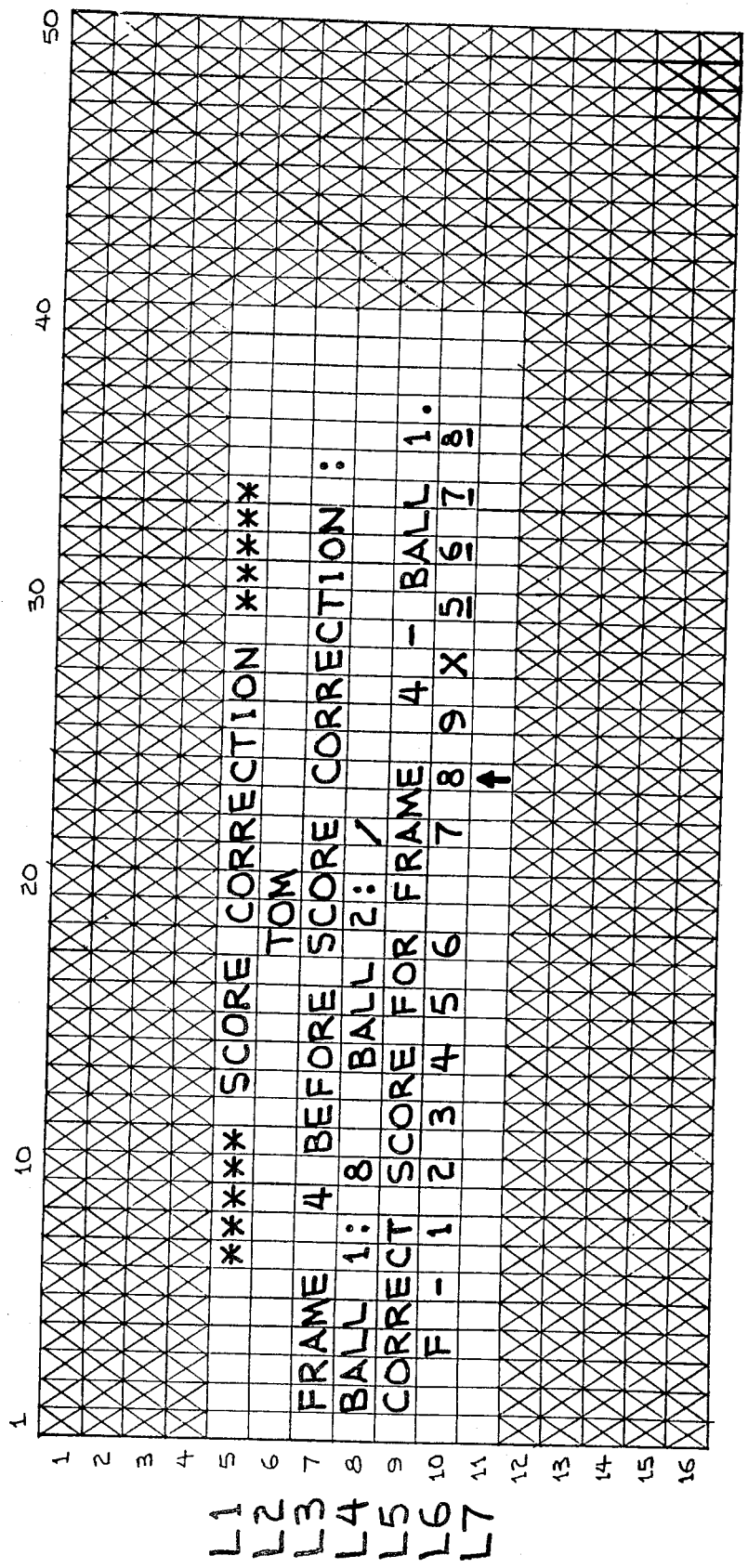

As discussed above, with respect to FIG. 2, one of the keys on the console is a "Correction" key 18 and upon its actuation, a message, as shown in FIG. 4f, asks the question IS A SCORE CORRECTION REQUESTED? Thus, if the correction key was actuated inadvertenty, the scorekeeper may merely select the answer "No", by means of the cursor, whereas if a correction is desired a "Yes" selection may be made whereupon the next message will request entry of the desired player's identification number. In this case, since the second player is a "Blind Player", there is no possibility of selecting that player for a score correction but all of the other scores may be corrected by an appropriate selection. In sequence, the next message will be WHICH FRAME? and upon making a selection, the next message will provide information with respect to the original score entry and will request a selection as to what correction should be made to the first ball score set forth in that earlier entry. A representative presentation of the last-mentioned message is shown in FIG. 4g, wherein the previously entered erroneous score is displayed as a reference for use by the scorekeeper, who then responds to the instruction messages to make entries which will correct the score. Similarly, subsequent messages will request the correction to be made to the second ball score, whereupon the corrected entries will be set forth in the display, as illustrated in FIG. 3. For example, after responding to the message requiring the identification of the bowler and the frame to be corrected, and after entering corrected ball scores for that frame, the score in that frame is automatically erased, the corrected score is entered, and a small "c" is displayed therein indicating that a correction has been made. That indication is retained on the scoring display for the remainder of the game. Furthermore, all calculated scores which had been entered on reliance on the erroneous data are recomputed and applied to the display.

Figure 4H:
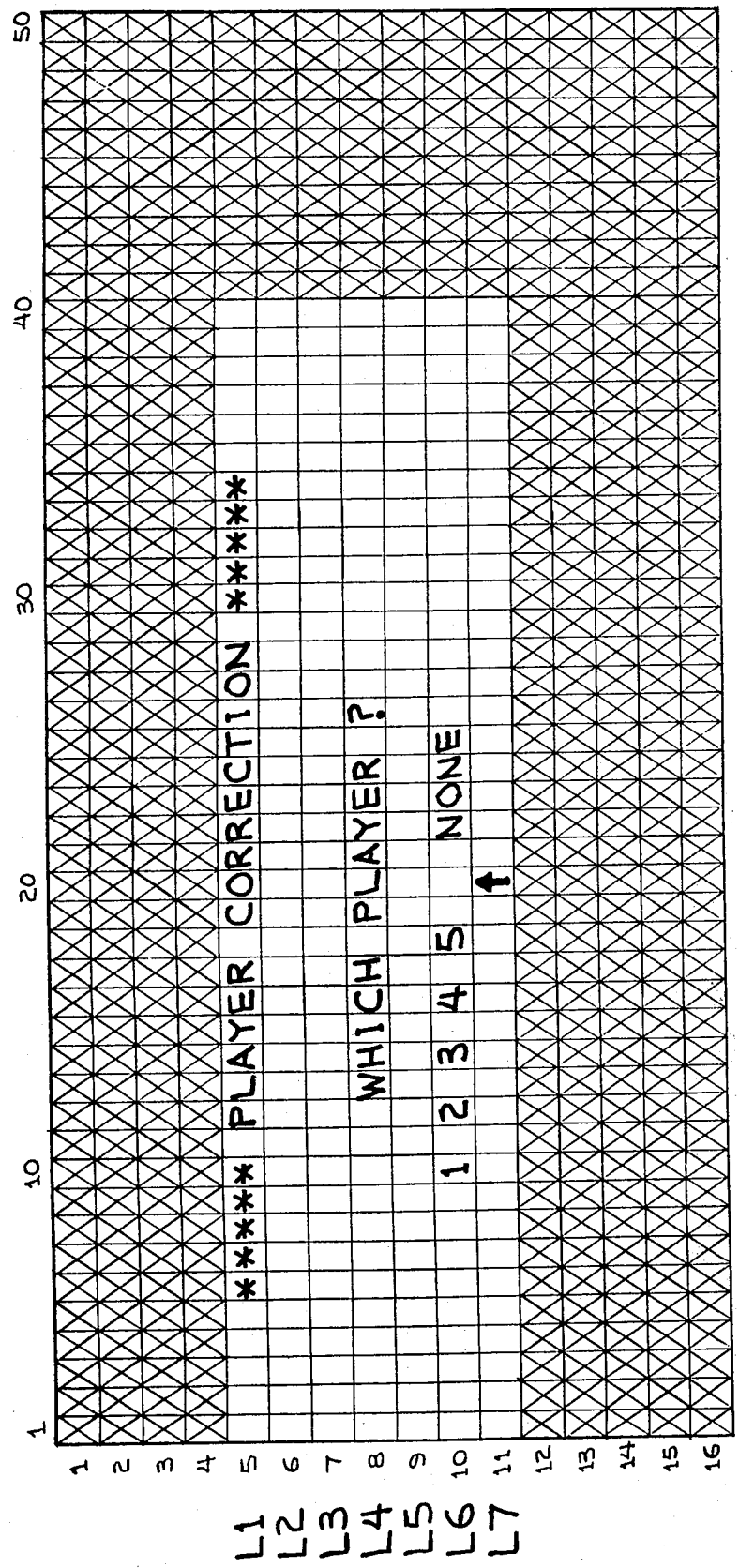

The apparatus also permits other corrections to be made. Thus, if a "No" answer is given to the instruction question IS A SCORE CORRECTION REQUIRED?, the next instruction would be the question IS A PLAYER CORRECTION REQUIRED? If that instruction question is answered affirmatively, an instruction display as shown in FIG. 4h is presented, whereby the scorekeeper may indicate the player's identification number related to the player's name correction. This selection is followed by an instruction to ENTER NAME FOR PLAYER. If on the other hand a negative response is made to the instruction question enquiring as to the necessity for a player correction, the next instruction message will be IS A TEAM CORRECTION REQUIRED? If the cursor and entry key are operated to answer such question affirmatively, then messages will be sequentially presented to permit corrections to team names, scratch averages, and handicaps.

Another feature of the apparatus disclosed herein is that if players make a decision to interrupt the scoring of a game, such as for the purpose of beginning a new of different game, the game select key constitutes a reset key. However, to prevent the reset cycle from commencing in response to an inadvertent actuation of the game select key, the instruction display presents a message requiring the scorekeeper to make another affirmative entry for the purpose of resetting the scoring procedure to an initial condition.

The operation of the scoring apparatus to affect the various functions discussed above is performed by electronic circuitry illustrated for example in FIGS. 5–12.

Particularly, FIG. 5 shows a block diagram of circuitry interconnecting the scoring console and the score displays, and as shown therein each of the displays constitutes a two port device wherein information is applied to the displays in response to accessing signals from a display controller logic or from CPU logic. Coupled to the input/output bus for the CPU logic are the manual entry keyboard and keyboard interface circuits, and the communications logic, which is used to communicate with a main house processing unit. That unit may be provided for use in conjunction with a plurality of the scoring systems shown in FIG. 1. The function of such communications logic will be discussed below. Also connected to the input/output bus of the CPU logic is a CPU RAM/ROM memory. The combination of these elements, connected for operation as described in detail below, may provide all of the scoring functions depicted in the drawing and give rise to various desirable advantages over scoring systems proposed in the past. As is apparent from the interconnection of elements depicted in FIG. 5, the present invention provides for the operation of a plurality of displays utilizing a single display controller device.

More specifically, FIG. 6 illustrates schematically the circuitry of the left and right manual entry keyboards illustrated in FIG. 2 of the drawings, wherein those keyboards are depicted as a plurality of switches connected through a bus to a manual entry keyboard (MEK) interface logic device. In this regard the logic device may comprise a commercially available IC device bearing a standard designation Z80-PIO sold by various manufacturers including ZILOG. Thus, by operating the eleven manual entry keys for the left and right keyboards as illustrated in FIG. 2, data entry signals may be interfaced through the abovementioned IC circuit for application to the CPU bus. Also, as illustrated in FIG. 6, an output from the MEK interface logic is applied to the left and right correction indicators, such output being provided through a driver circuit 7407 constituting a lamp drive chip. Accordingly, when one of the correction keys is actuated, and when the CPU generates a correction sequence, the MEK interface logic causes the lamp driver to operate one of the correction indicators.

Figure 7:
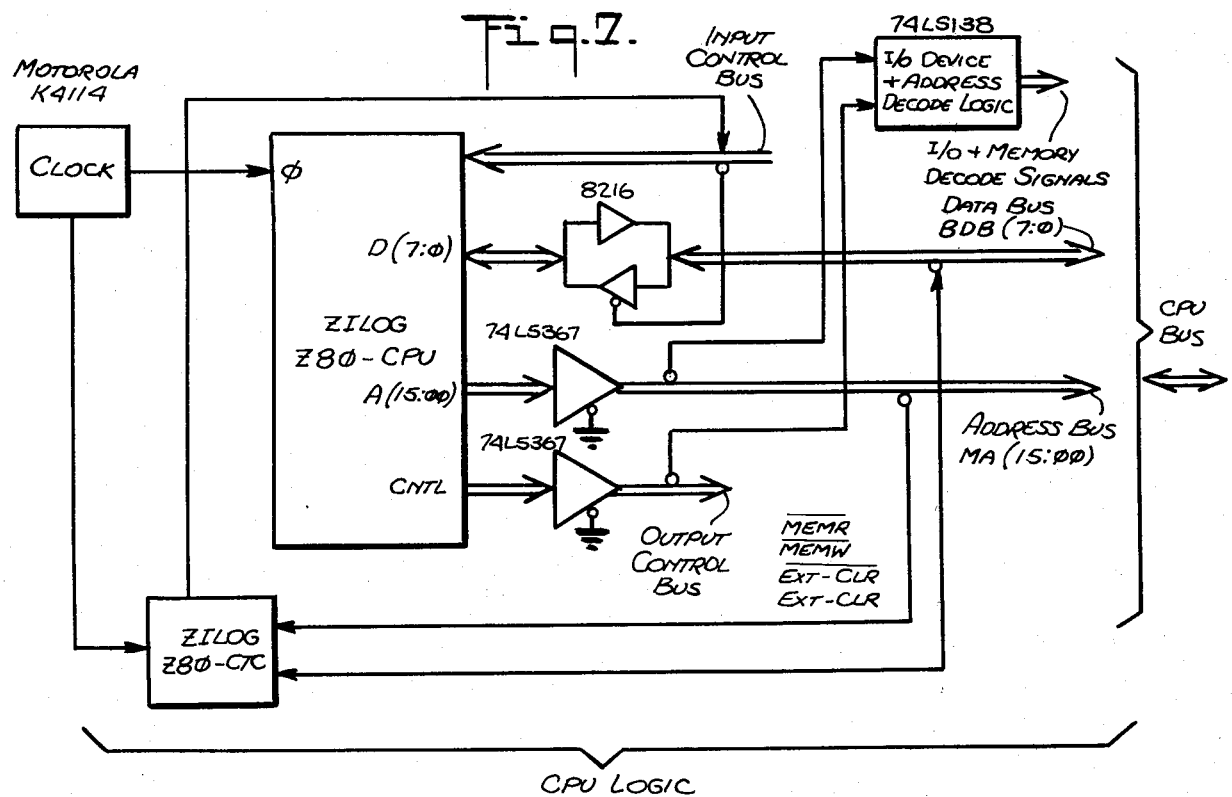
FIG. 7 is a schematic diagram of the central processing unit logic illustrated in FIG. 5.

The central processing unit logic is depicted in greater detail in FIG. 7 of the drawings wherein the CPU bus is shown as being formulated by an address bus embodying signals identified as MA (15:00): a bi-directional data bus embodying signals BDB (7:0); an output control bus embodying signal lines $\overline{\text{MEMR}}$, $\overline{\text{MEMW}}$, $\overline{\text{EXT-CLR}}$, and EXT-CLR, which signals are used in the operation of the display control logic and in the displays themselves; and input control bus and an I/O memory decode bus embodying a plurality of signal lines as follows:

$\overline{\text{DSB-LID}}$
$\overline{\text{ENB-LID}}$
$\overline{\text{DSB-RID}}$
$\overline{\text{ENB-RID}}$
$\overline{\text{DSB-LSCD}}$
$\overline{\text{ENB-LSCD}}$
$\overline{\text{DSB-RSCD}}$
$\overline{\text{ENB-RSCD}}$
$\overline{\text{READ-STS}}$
$\overline{\text{LID-SEL}}$
$\overline{\text{RID-SEL}}$
$\overline{\text{LSC-CHM SEL}}$
$\overline{\text{LSC-BM SEL}}$
$\overline{\text{RSC-CHM SEL}}$
$\overline{\text{RSC-BM SEL}}$ With respect to the above-mentioned signal lines, the designations have meanings as follows: DSB—disable; LID—left instruction display; RID—right instruction display; ENB—enable; LSCD—left score display; RSCD—right score display; STS—status; SEL—select; CHM—score display character memory; and BM—score display border memory. The CPU logic comprises a Z80-CPU IC commercially available from several sources including ZILOG, wherein a clock circuit such as Motorola K4114 device has one output connected to the CPU circuit and another output connected to a programmable clock such as a Z80-CTC device which receives inputs from the bi-directional data bus and the address bus, and which provides output to the bi-directional data bus and to the CPU circuit. Furthermore, the data bus is coupled to the CPU device by an 8216 IC circuit which receives a control input from the input control bus to determine whether data is fed to or out of the CPU. Furthermore, the address bus and the output control bus includes signal lines coupled from the CPU through individual IC circuits 74LS367, and outputs from those circuits are also applied through an IO device and address decode logic identified as a 74LS138 device having the ouputs listed hereinabove. It will be appreciated that the first eight of those identified outputs control switching of the two port memory, whereas the ninth signal line provides a capability for reading the status of the two port switching, and the remaining six signal lines are used to enable the memory banks to be used by the CPU bus.

Figure 8:
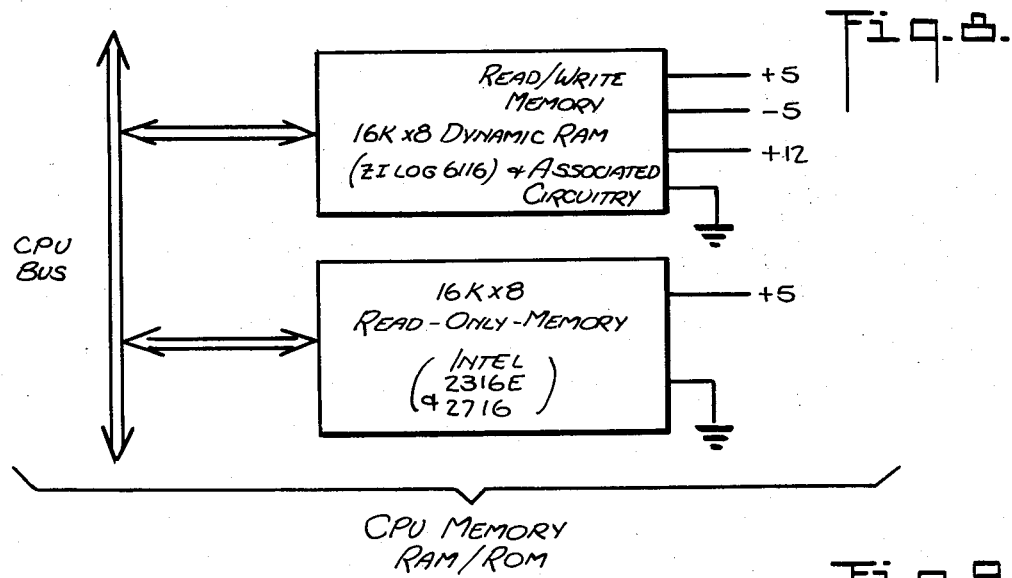
FIG. 8 is a schematic diagram of the central processing unit memory illustrated in FIG. 5.

The CPU RAM/ROM memory as illustrated in FIG. 8, may comprise a 16K×8 dynamic RAM such as a ZILOG 6116 device together with its associated circuitry, and a 16K×8 read-only-memory such as may be provided by an INTEL 2316E and 2716 circuit combination together with appropriate associated circuits well known in the art. The above-described memory are connected to the CPU bus. Conventionally, the read-only-memory includes appropriate software modules including instructions common to all of the various scoring formats capable of being performed by the apparatus, and the RAM memory includes software modules written therein with respect to selectable games, together with modules including descriptive memory tables to be discussed below.

Figure 9:
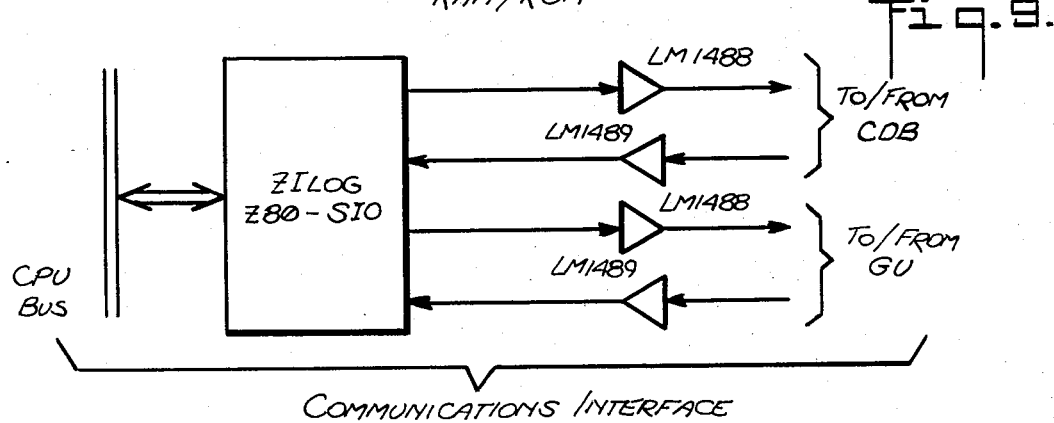
FIG. 9 is a schematic diagram of the communications interface logic illustrated in FIG. 5.

The communication interface, referred to above with respect to a main house processing unit utilized with a plurality of scoring systems, is illustrated in FIG. 9 wherein one set of gaming unit "GU" signal lines provide access to a central gaming unit memory which supplies data to the CPU bus in response to various different game selections made on the MEK device. The signal lines connected to and from the gaming unit are coupled through line driver/receivers LM 1488 and LM 1489 IC devices and through a Z80-SIO IC device also available from ZILOG, to the CPU bus. Furthermore, the same communications interface is coupled to the CPU bus through the Z80/DIO circuit and through another pair of LM 1488 and LM 1489 devices to a central data bank (CDB), and that interface may be utilized to provide scoring data to a central data bank.

Figure 12A:
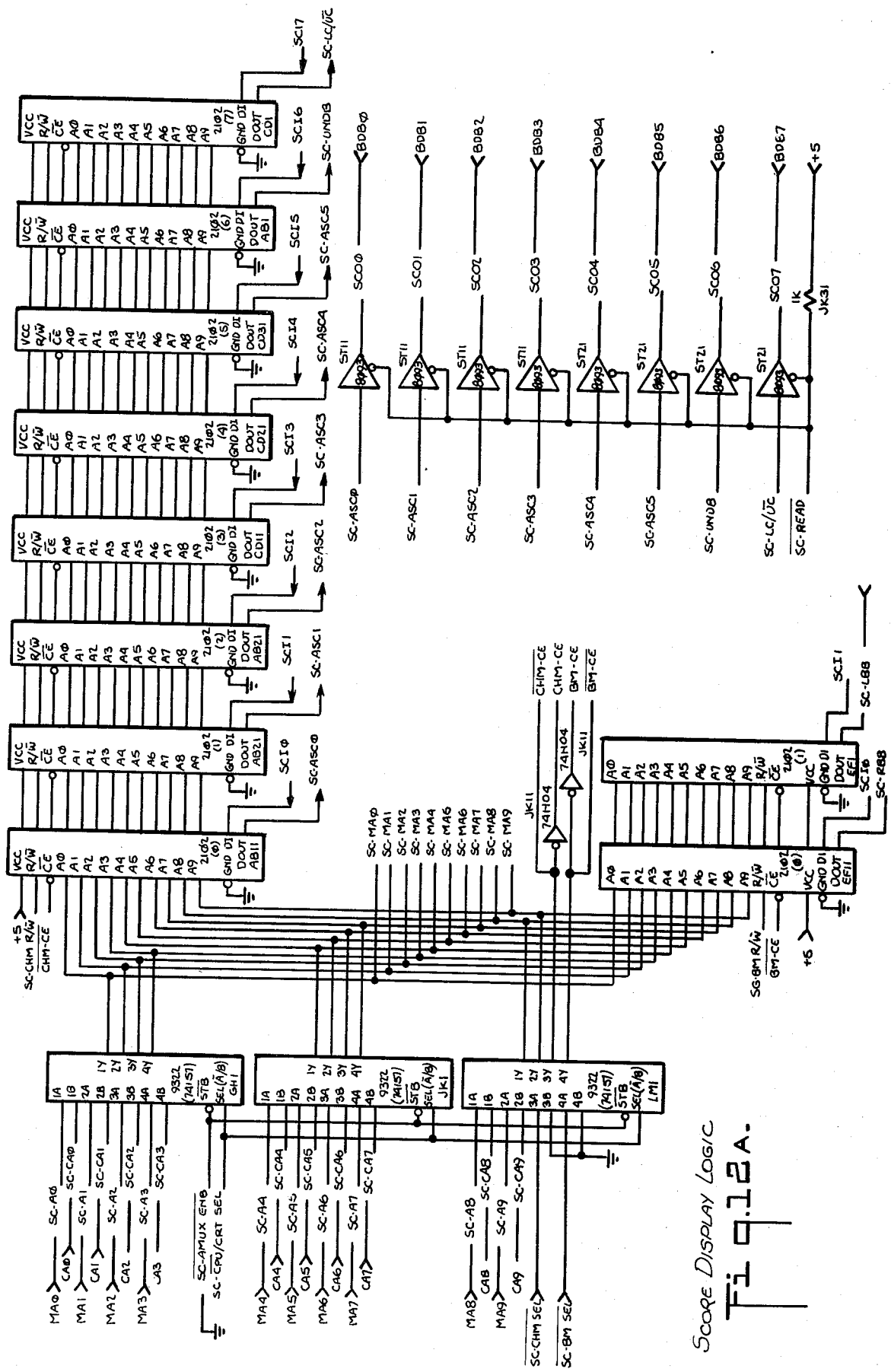
Figure 15B:
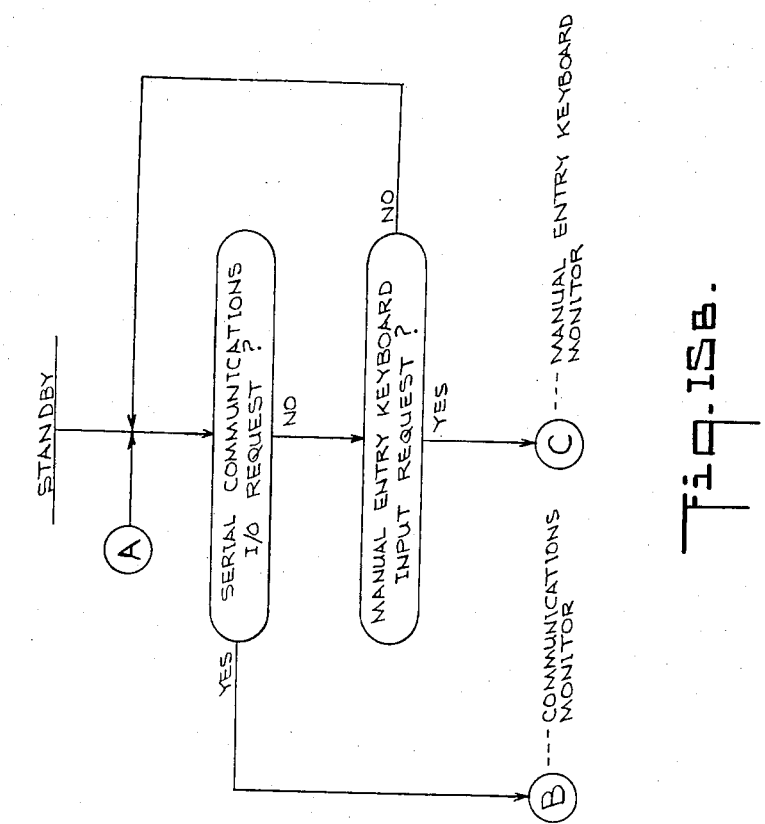
FIGS. 15a and 15b show initialization and standby monitor routines.
Figure 15A:
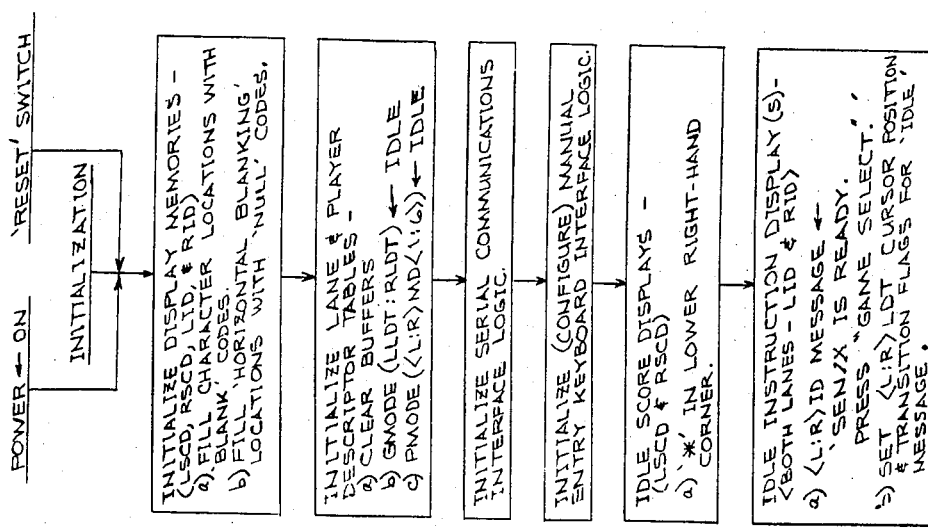

The display controller logic illustrated in FIG. 5 is shown in greater detail in FIGS. 10a and b. An input from the CPU bus, namely, EXT-CLR provides a clear signal to reset a combination of counters in the control device, wherein such counters provide for a display which has 50 characters in the horizontal direction and 16 characters in the vertical direction, such that each of the characters has 12 dots along the horizontal and 16 dots in the vertical direction. Accordingly, as shown in FIG. 10a, a first counter VW1 provides an output for use in establishing 12 horizontal dots per character, and a counter VW11 combined with an additional counter TU1 provides an output for establishing 50 characters per horizontal line, whereas a counter TU11 in FIG. 10b provides an output for establishing 16 lines per character and another character RS1 provides an output for establishing 16 vertical characters per screen. For purposes of illustration the above-mentioned 50 vertical and 16 horizontal lines are shown in each of the score displays depicted in the drawings, but it will be understood that such lines do not appear on the displays unless actually generated by the video signals, as in FIG. 3, for example. Furthermore, an additional counter RS11 illustrated therein is provided to establish 16 additional vertical lines in the completion of the abovementioned 16 vertical character blocks and the time provided by the additional counter RS11 is utilied to provide for a vertical synchronization function. It will be appreciated by those skilled in the design of commercially available computer hardware, that counters as identified in the drawing can be interconnected as shown, and can be supplied with a clock pulse from a crystal oscillator to provide the desired outputs as referred to above. In this regard, counter signals are utilized to operate each of the score displays and the instruction displays to provide 40 horizontal characters wherein the remaining 10 of the 50 horizontal signals referred to above are not utilized in the display, and wherein the time period occupied by those additional 10 character blocks, shown in cross-hatching in the various display drawings, is utilized for horizontal synchronization. In conjunction with these concepts, each of the refresh memories, shown in FIG. 12a, are controlled by the various clock signals and such memories have character data information for the video generation logic which is set in a format corresponding to the above-mentioned counter outputs; that is, such memories are set to be addressed in accordance with 50 horizontal character segments and 16 vertical character segments, each character having 12 horizontal dots and 16 vertical dots of information. In the memories, information is actually stored only in the addresses corresponding to the first 40 characters in the display, and all information is erased from the addresses corresponding to the last 10 character segments whereas the horizontal retrace period is set to occur during the last ten horizontal character segments, so that during such retrace there is no need for the horizontal blanking signal due to the fact that all information has been erased from the various memories in the addresses corresponding to those last ten characters.

The vertical sync period is effected during an additional 16 dot line vertical period and that additional 16 line period is determined by the counter RS11 in conjunction with a pair of flip-flop circuits TU 21a and TU 21b. During operation of the counter RS11, the video generation circuitry is disabled by an output signal LENB, whereupon in the completion of the 16 line count from the counter RS11, the flip-flop circuitry resets the counters TU11 and RS1 to again address each of the memories according to the 16 characters/16 line vertical format.

Figure 11A:
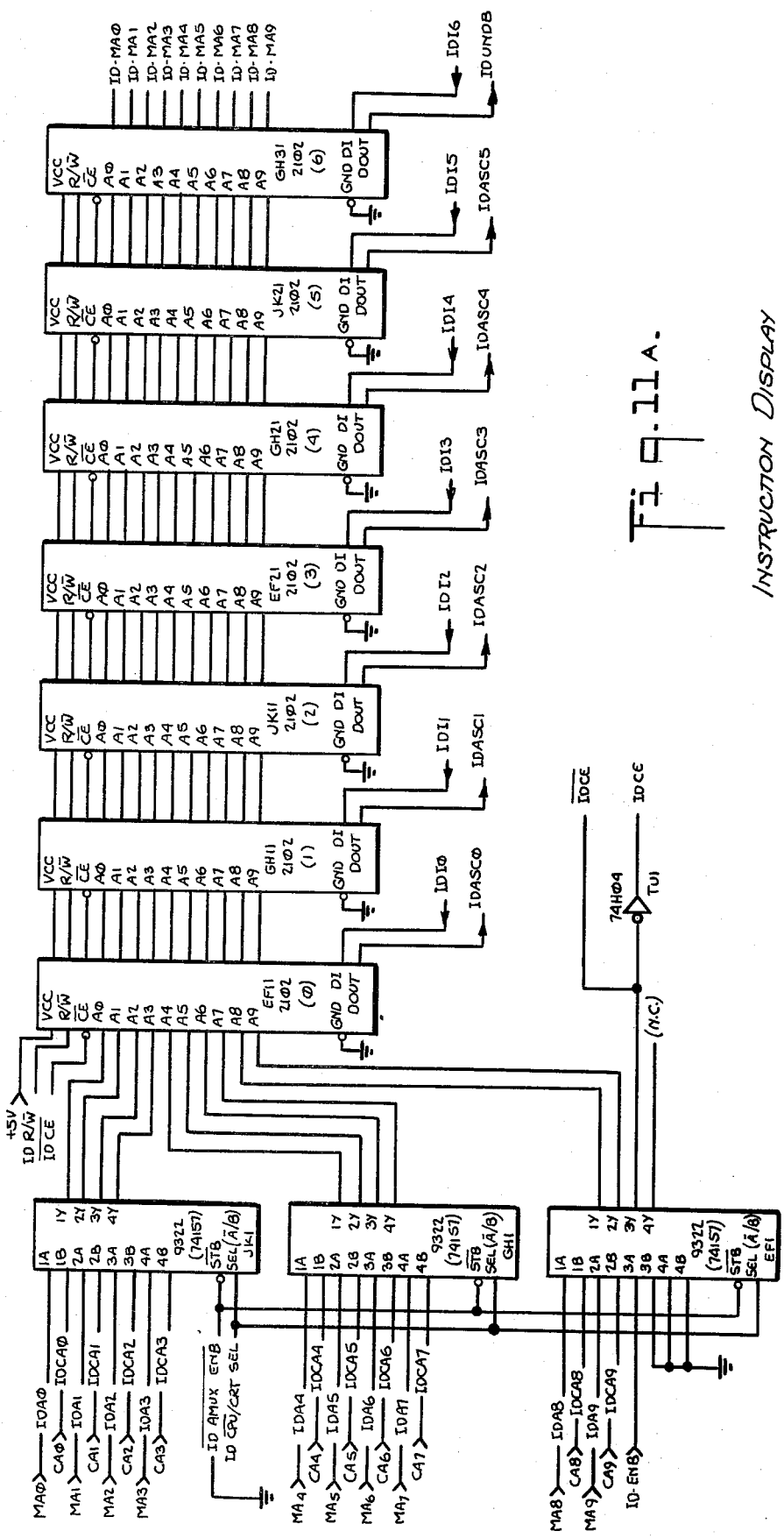

Circuitry constituting the instruction displays as illustrated for example in FIGS. 11a–d, may include seven individual read-write-memory components, constituting for example, 2102 IC's, six of which are used as conventional ASCII character codes for forming the characters of the instruction display, whereas the seventh 2102 memory component is utilized to selectively provide underlining for the ASCII characters. The memory locations are addressed by a multiplexing device constituting three 9322 IC's having inputs coupled for example to the CA(9-0) outputs from the counters of the display controller, and such inputs are utilized to read information from the memory components. The read-format is controlled by the presense or absence of an input signal as illustrated in FIG. 11a, while the multiplexor addresses the memory to write information therein in response to inputs from the MA(9:0) signal lines from the address bus portion of the CPU bus, as illustrated in FIG. 7. In conjunction with the addressing information described above, the multiplex circuitry provides output signals ID-CE and ID-CE which signals are utilized to enable the memory in its read or write functions as discussed above.

It is to be understood that two sets of the circuitry illustrated in FIGS. 11a–d are provided, one for each of the instruction displays.

Figure 11B:
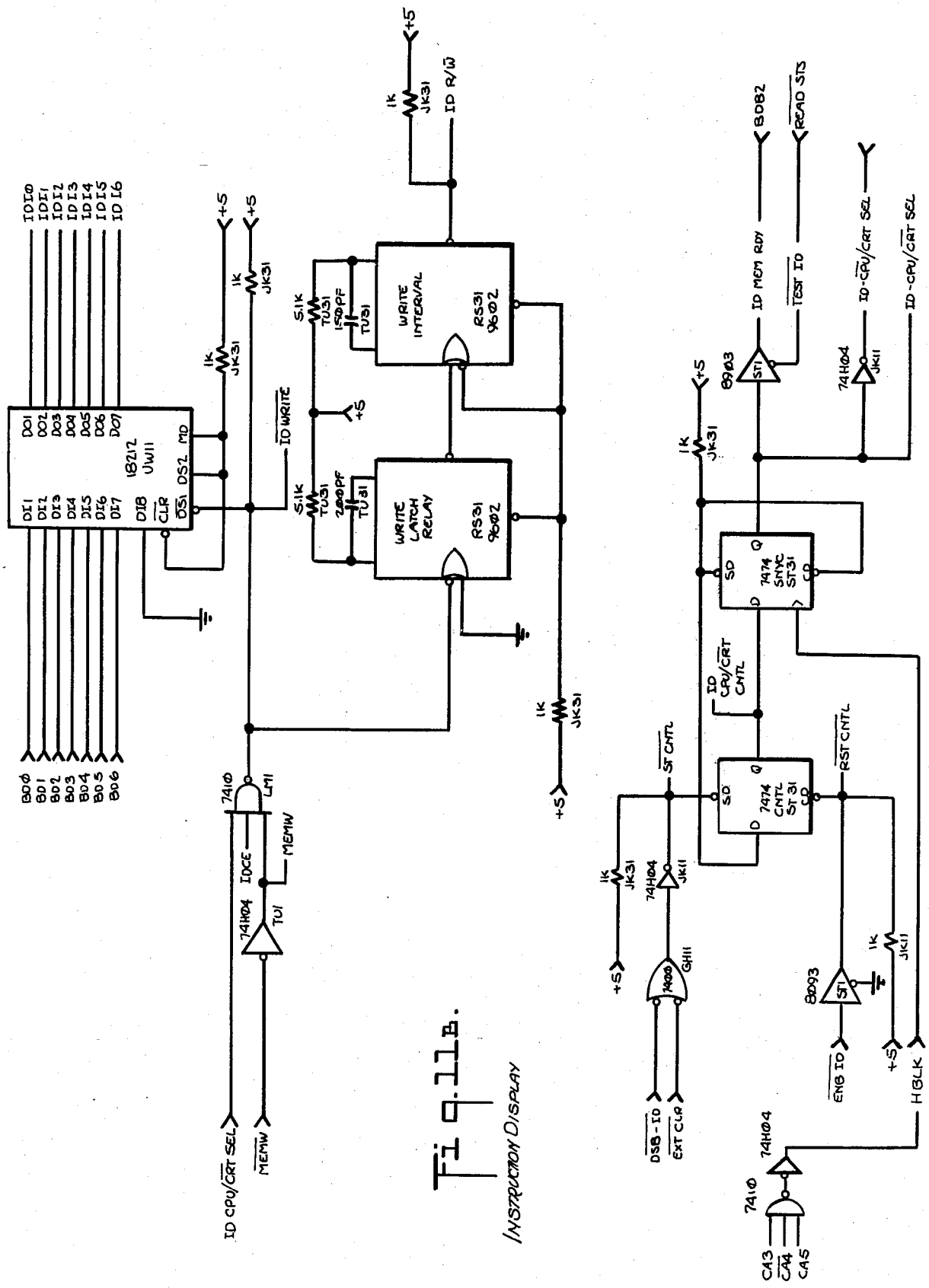

A switch control for the multiplexor circuitry, namely ID-$\overline{\text{CPU}}$/CRT SEL is generated by a synchronized switching circuit, illustrated in FIG. 11b of the drawings, wherein input signals $\overline{\text{DSB-ID}}$ and $\overline{\text{ENB-ID}}$ together with the external clear signal $\overline{\text{EXT CLR}}$ are applied to control a flip-flop which may constitute a 7474 IC, the outputs of which are applied to a sync flip-flop, also constititing a 7474 IC, and the output of the sync flip-flop generates the ID-$\overline{\text{CPU}}$/CRT SEL switching signal. An additional input to the sync flip-flop is provided from the display controller and identified as a horizontal blank (HBLK) signal and constitutes a clock pulse for switching the multiplexor during the horizontal retrace period described above.

As also illustrated in FIG. 11b, when the multiplexor is switched to address the memory by means of the CPU bus signals, and when a memory write signal $\overline{\text{MEMW}}$ is applied simultaneously through an inverter to an AND function circuit, along with the above-mentioned signal ID-CE, the AND function output is applied as an $\overline{\text{ID-WRITE}}$ signal to latch the bi-directional signal line outputs from the CPU bus as inputs to the memory by means of a latch circuit constituting an I8212 device. In this regard, the output of the latch device constitutes the WRITE information to the memory by means of the signal line IDI(6:0). A write synchronization circuit is provided by a monostable multivibrator constituting two 9602 IC's, wherein the circuit is utilized to ensure that data latched by the latch circuit is stabilized prior to activating the write line to the memory components shown in FIG. 11a.

The video generation logic is depicted in FIGS. 11c and d, wherein a memory component MP11 formed by a 2526/CM3941 IC device is provided with instruction display address data from the ASC(5:0) outputs from the memory components illustrated in FIG. 11a, and that memory component MP11 is also provided with address information from the display control logic along signal lines R(3:0), the addressing inputs constitute a matrix format for reading out video dot information from the memory MP11 in response to the ASCII code and the line information so that appropriate row dots are read out at correspondingly appropriate lines to provide a 7×9 character matrix for application to the CRT devices of the instruction displays. The dot information is coupled through a multiplexor circuit having a latch capability so that the seven dots are applied to a parallel to serial converter for application as video information to the corresponding CRT. At the timing of the twelth line of the 16 line character segment, the multiplexor switches to sample the underlined bit for latching that underlined information and feeding it as a common input through the multiplexor to the parallel 7 dot output which is applied to the parallel/serial converter. With respect to the timing of the circuitry described with reference to FIG. 11c, the $\overline{\text{ID-LD VIDEO}}$ signal and the $\overline{\text{ID-ICG READ}}$ signal enables the serialization process to occur synchronously with a character access of the memory MP11. The dot generation of the parallel/serial converter is blanked at all times when the instruction display memory component, illustrated in FIG. 11a, are addressed by the CPU, as illustrated by the disable input generated in response to the ID-$\overline{\text{CPU}}$/CRT SEL signal, and such video generation is also disabled during the vertical retrace in response to the signal identified as LENB, which signal is generated during the additional 16 line count described above with respect to FIG. 10b. As illustrated in FIG. 11c, the first five positions of the 12 dot character segment, which five positions correspond to the inputs E4-E8 of the serializer, are automatically blanked due to their ground connection as shown in the drawing.

As illustrated in FIG. 11d, the video signal from the serializer, namely, ID-VIDEO is applied to a standard composite video driver together with the vertical sync and horizontal sync signals from the display controller, and the output of that circuit is applied to a CRT such as a Ball Brothers MIRATEL CD-5 device.

Referring now to the score display logic as illustrated in FIGS. 12a-d, it will again be appreciated that two sets of such circuitry will be required, one for each of the score displays. A character generating memory for providing character codes constitutes eight memory components, six of which provide standard ASCII character signals wherein the remaining two memory components are provided, respectively, for instructing an underline function and for instructing the display of either a large or small character configuration as illustrated in the score display shown in FIG. 3. That is, the pin-fall characters, temporary score characters, and other special identification characters such as correction indicators constitute 5×7 character matrices, whereas underlining is provided to indicate a split, and wherein a 7×9 character matrix is utilized to indicate score calculations and other identifying information such as players' names and team names, etc. Operating in conjunction with the eight component character memory is a border memory comprising two memory components for generating, respectively, horizontal and vertical bore lines utilized on the score display. In a manner similar to operation of the instruction display, the score display memories are addressed by a multiplexor having inputs coupled from the MA(15:00) signal lines of the address bus, which forms a portion of the CPU bus, and the multiplexing circuit also receives addressing inputs from the display control logic, namely, the signal lines CA(9:0), as illustrated in FIG. 10b. In the above discussion of the instruction display logic, the multiplexor thereof was described as having an input identified as $\overline{\text{ID-ENB}}$ to permit the computer to access the memory; while, in the score display logic circuitry, two control signals are necessary to selectively permit accessing of the character memory portion and the border memory portion. In this regard, signals $\overline{\text{SC-CHM SEL}}$ and $\overline{\text{SC-BM SEL}}$, are applied to the multiplexing logic and utilized to permit character memory accessing signals (CHM) and border memory accessing signals (BM). As in the case with the instruction display, the bi-directional data bus signal lines BDB(7:0) are coupled to a write-latch circuit and operates in the same manner as described above with respect to the instruction displays. An additional function in this regard, however, exists with respect to a memory read $\overline{\text{MEMR}}$ signal for the character memory which creates a read enable signal which in turn allows the eight bit data from the character memory depicted in FIG. 12a to be accessed by the bi-directional data bus of the main CPU bus through the buffer circuits illustrated in FIG. 12a. In this way, the character data generated for the score display may be provided an an input to the central processing unit.

The horizontal blank signal (HBLK) is generated as illustrated in FIG. 11b in response to the display controller logic signals CA3, $\overline{\text{CA4}}$, and CA5, which are applied to an AND function circuit 7410 and an inverter constituting a 74H04 IC circuit.

As illustrated in FIG. 12b, a parallel video dot output from a multiplexor circuit JK21 and LM21 is applied to a parallel/serial video converter, the output of which provides a video signal for application to a composite video driver as discussed above with respect to the instruction display. The parallel video multiplexor has its inputs coupled to a 7×9 character matrix memory circuits, and a multiplexor which receives its inputs from a 5×7 character matrix memory and from underlined data supplied by one memory component of the eight component memory section of the score display logic illustrated in FIG. 12a.

The operation of character generation for the 7×9 and 5×7 characters together with the underlining for the 5×7 characters will be apparent to those skilled in designing computer hardware, but a comment will be made as to the generation of the border video. Again, the video dot generator NR21 is capable of producing outputs at positions E4-E15, and the positions E4 and E5 are grounded so that no dot will be produced at either of the two dot positions immediately preceding a vertical border position. Similarly, positions 7 and 8 are also grounded thus precluding the possibility of any dot generation at the two positions immediately succeeding a vertical border position. However, the vertical border position is located at dot position 6 and is generated by an output from the multiplex circuit wherein that output is latched regardless of the selection of large of small characters (i.e., 5×7 or 7×9) by the shorted inputs to positions D1 and D2 of the LM21 device. The horizontal borders, however, are produced by sampling the thirteenth line in each of the vertical character segments, and by over-riding the output from the parallel/serial converter when a line is to be generated as illustrated by the $\overline{\text{LSC-LBDR}}$ input to the OR circuit illustrated at the output of the parallel/serial converter. The horizontal border input signal applied to the OR circuit is generated by a latching circuit constituting a 74175 IC circuit, and that signal can only be generated when there is an occurrence of the SC-$\overline{\text{CPU}}$/CRT SEL signal which indicates that the computer has control over access of the border memory. Thus, at line 13 indicated by an output from the 7421 AND circuit in FIG. 12d, if the above described conditions exist, together with an output from the horizontal border memory component illustrated in FIG. 12a from the circuit EF1, a horizontal line is produced.

Figure 16:
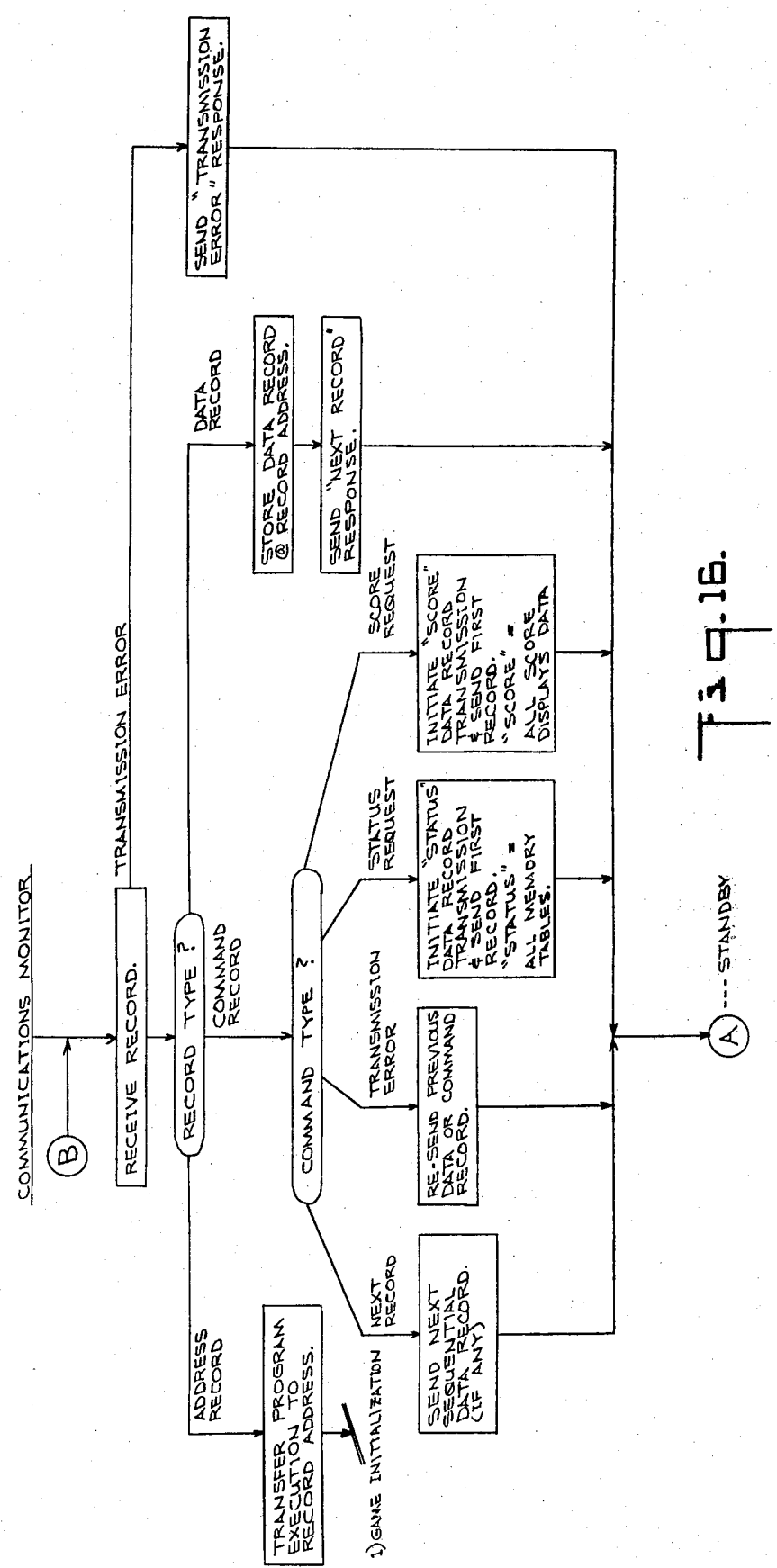
FIG. 16 relates to a communications monitor routine.
Figure 17J:
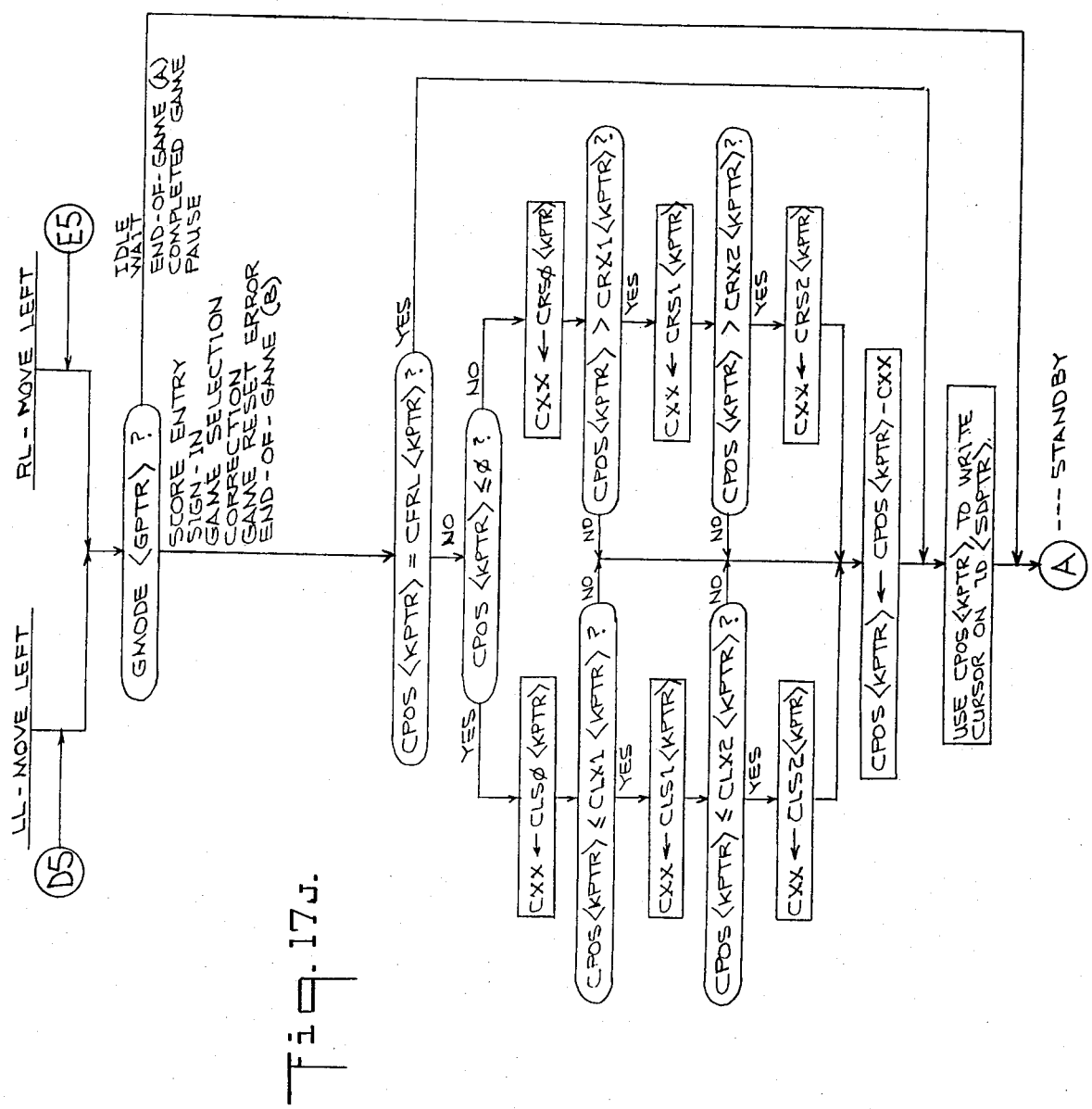
FIGS. 17a–n relate to the manual entry keyboard monitor routine.
Figure 17K:
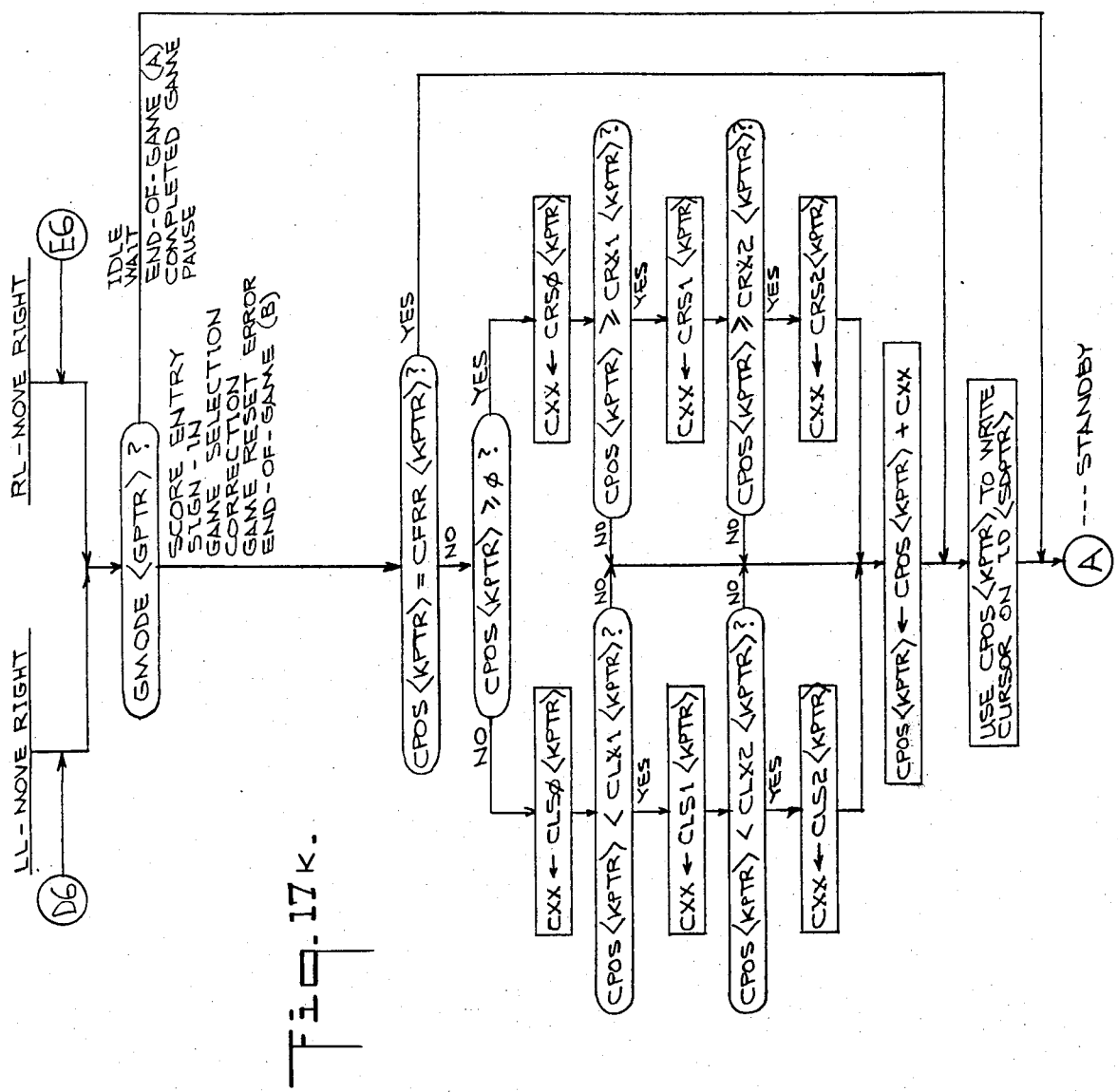

Information related to the control of the above-described system of elements, to attain for example the scoring format illustrated in FIG. 3, is presented in FIGS. 13-22. In particular, FIG. 13a is a general operational flow diagram illustrating two main processing loops, one for handling communications requests, and the other for receiving and processing MEK inputs. FIG. 13b describes, in greater detail, the flow of the loop for handling MEK inputs. The block portion of FIG. 13b disposed at the lower right hand portion thereof corresponds to processing conducted with information from the gaming unit coupled along the communication lines GU, and is directed specifically to the above-described scoring format for league bowling. Memory tables related to information associated with a pair of adjacent lanes are shown in FIG. 14a, while FIGS. 14b and 14c describe the contents of the tables of FIG. 14a. FIG. 15a describes the details of a cold-start initialization step, and FIG. 15b shows the standby monitor routine, both of which are set forth in FIG. 13a. A communications monitor for controlling routines involving the communications logic, described with respect to FIG. 5, is shown in FIG. 16, while the monitor for the manual entry keyboard is shown in FIGS. 17a-n. As described above, the manual entry keyboard is provided with a group of switches for entering scoring data, and the characters R1-R9 and L1-L9, shown in FIGS. 17a-n, designate the external linkage points related to the key switches. Referring to the linkage points for the left lane, for example, the ENTER key produces four external linkages, wherein L1 relates to the sign-in mode, L2 to the score entry mode, L3 to the correction mode, and L4 to the game-reset-error mode. L5, L6, and L7 are associated with the player identification keys when the scoring procedure relates to sign-in, score entry and correction modes. L8 is associated with the correction key, and L9 results from operation of the enter key and is produced in an end-of-game mode. FIGS. 17j and k relate particularly to the cursor control keys.

Figures 18D, 18E:
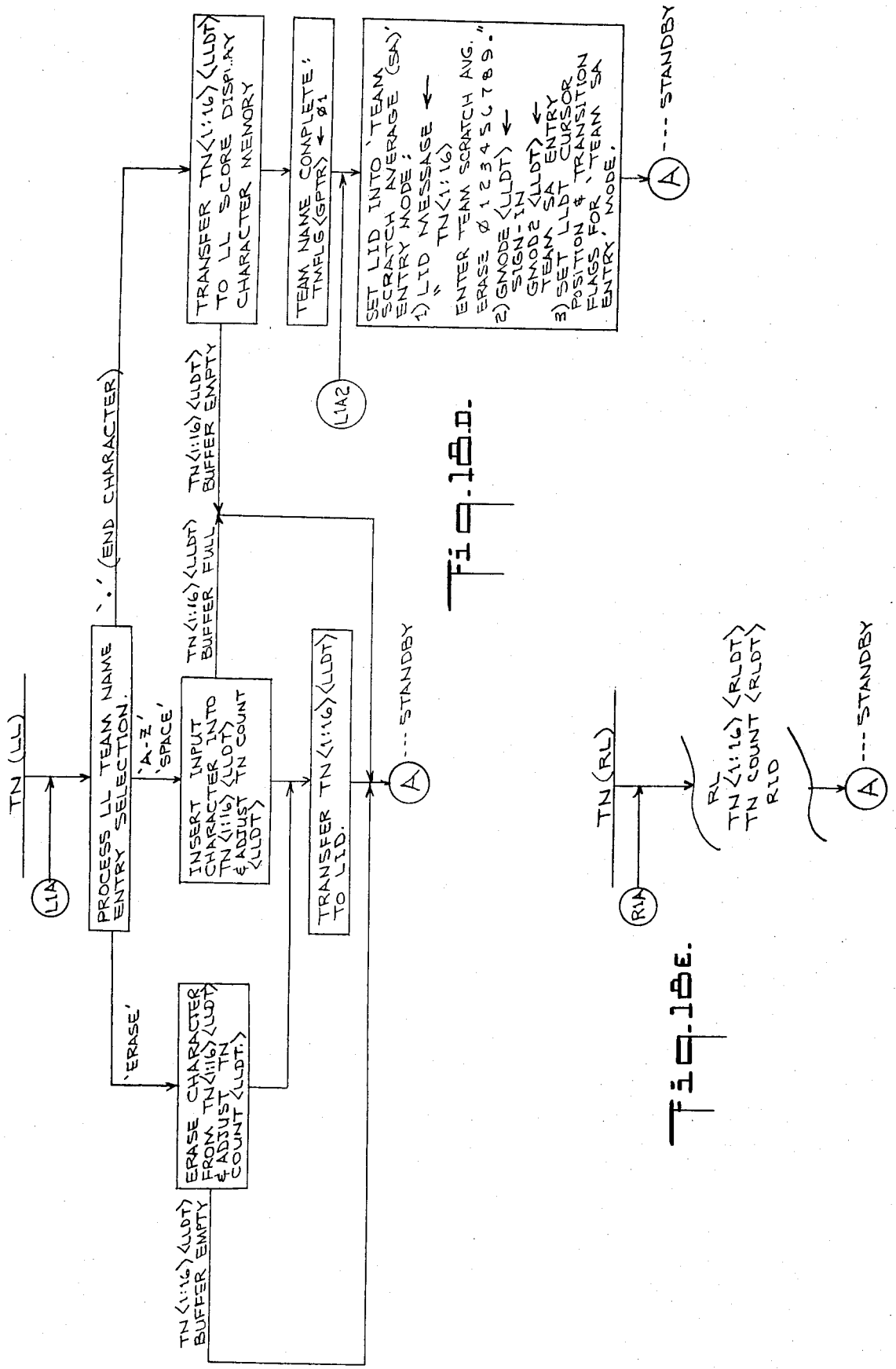
FIGS. 18a–p pertain to initialization and sign-in mode control and display routines for league bowling.
Figures 18F, 18G:
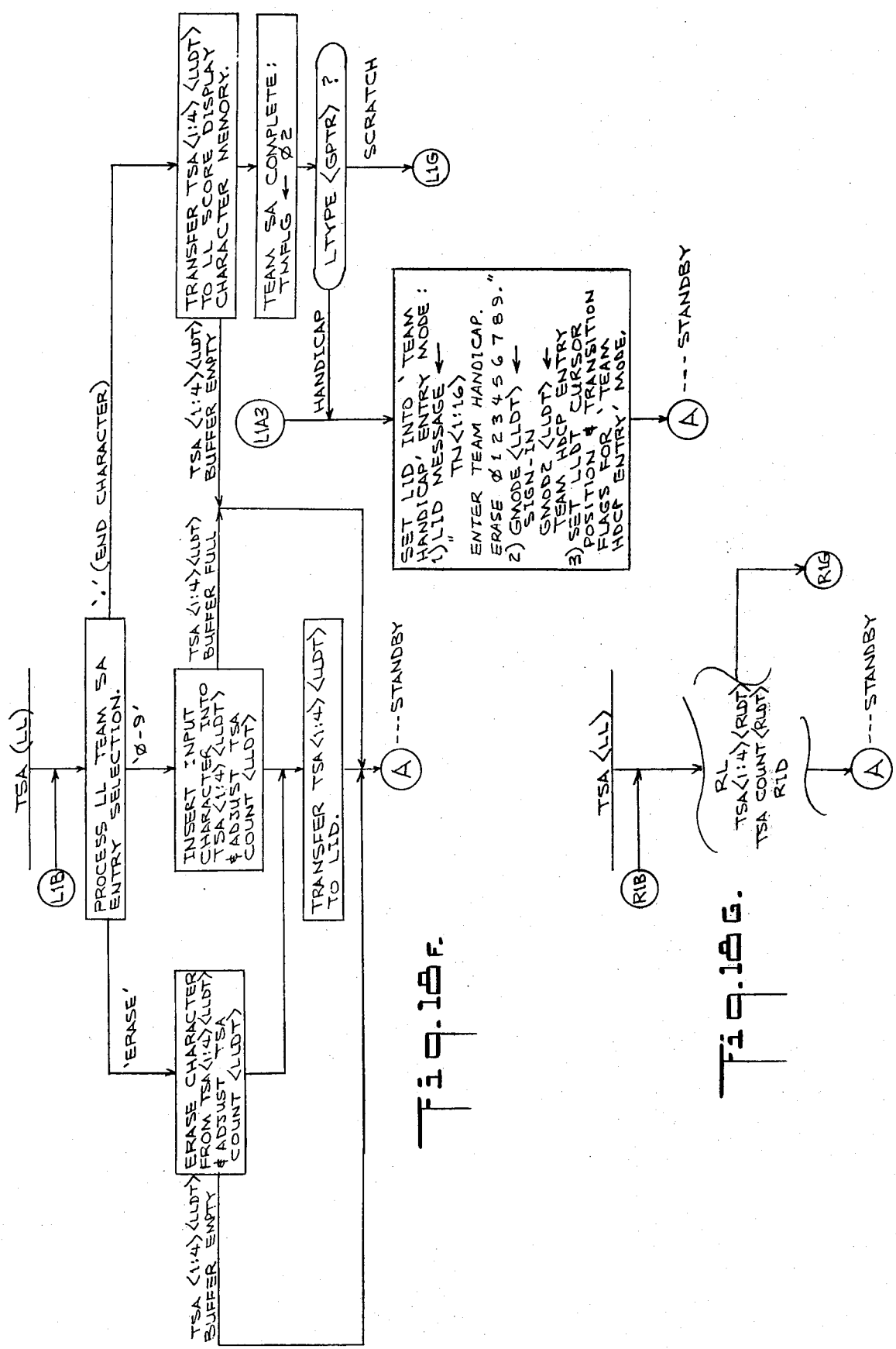

FIGS. 18-22 relate specifically to the league handicap bowling format of FIG. 3, wherein a game initialization routine is shown in FIG. 18a, while entry functions during sign-in modes, together with control and display routines are illustrated in FIGS. 18b-p. For example, the routines shown in FIGS. 18b and c are responsive to inputs received at the external linkage points referred to above as L1 and R1. FIGS. 18d-n show the processing for all sign-in entries described above with respect to FIGS. 4a-c. FIG. 18p relates to the external linkage point referred to above as L 5 and R5.

Figures 19C, 19D:
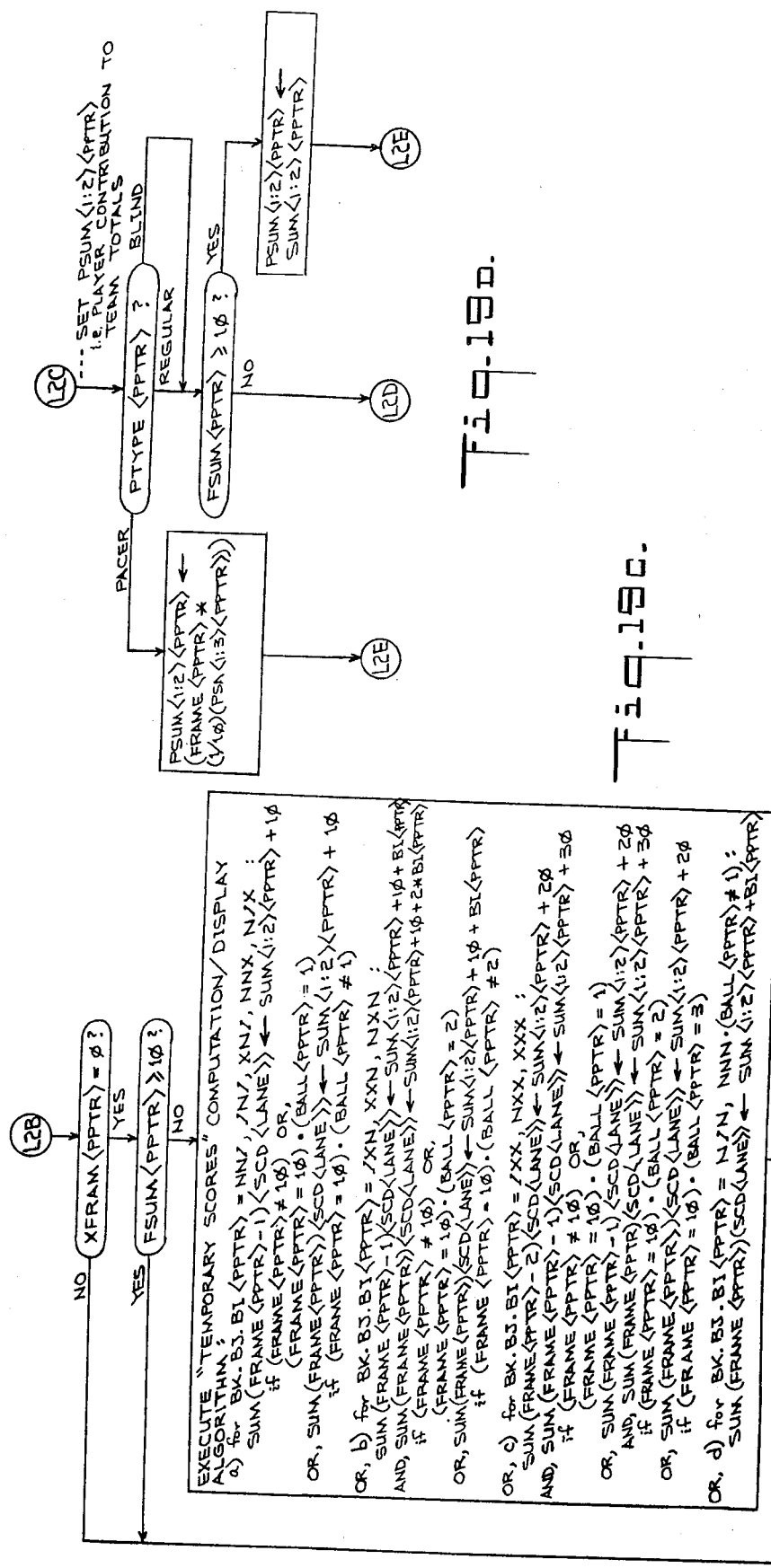
Figure 19H:
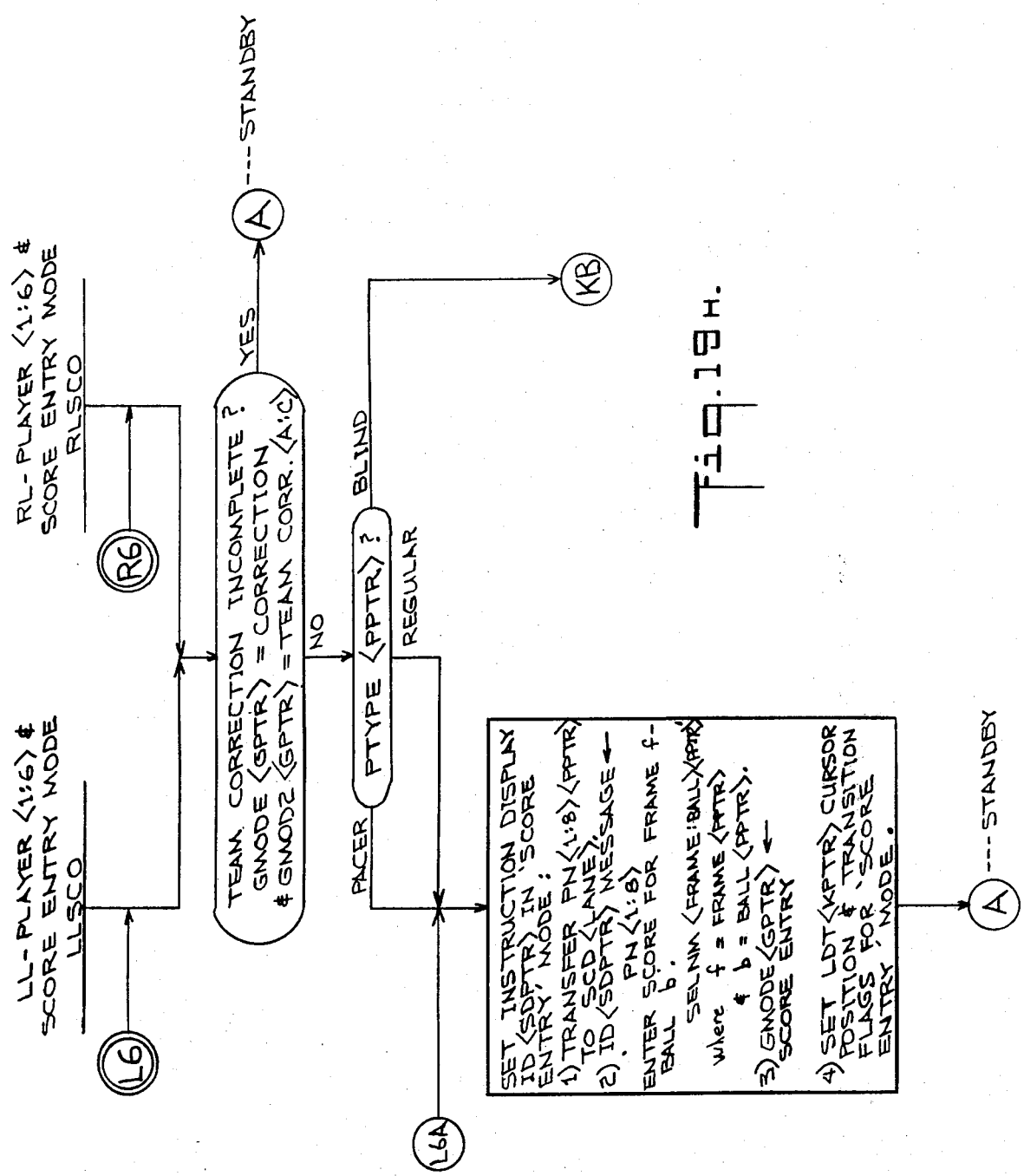

Score entry mode control, computation, and display routines are described in FIGS. 19a-h, and in this regard FIG. 19a relates to the L2, R2 linkages, and such drawing together with FIGS. 19b-g shows the standard permanent and temporary bowling score calculations, and all computation and display algorithms resulting the scoring format described above with respect to FIG. 3. The linkages referred to above as L6, R6 are associated with FIG. 19h.

Figure 20B:
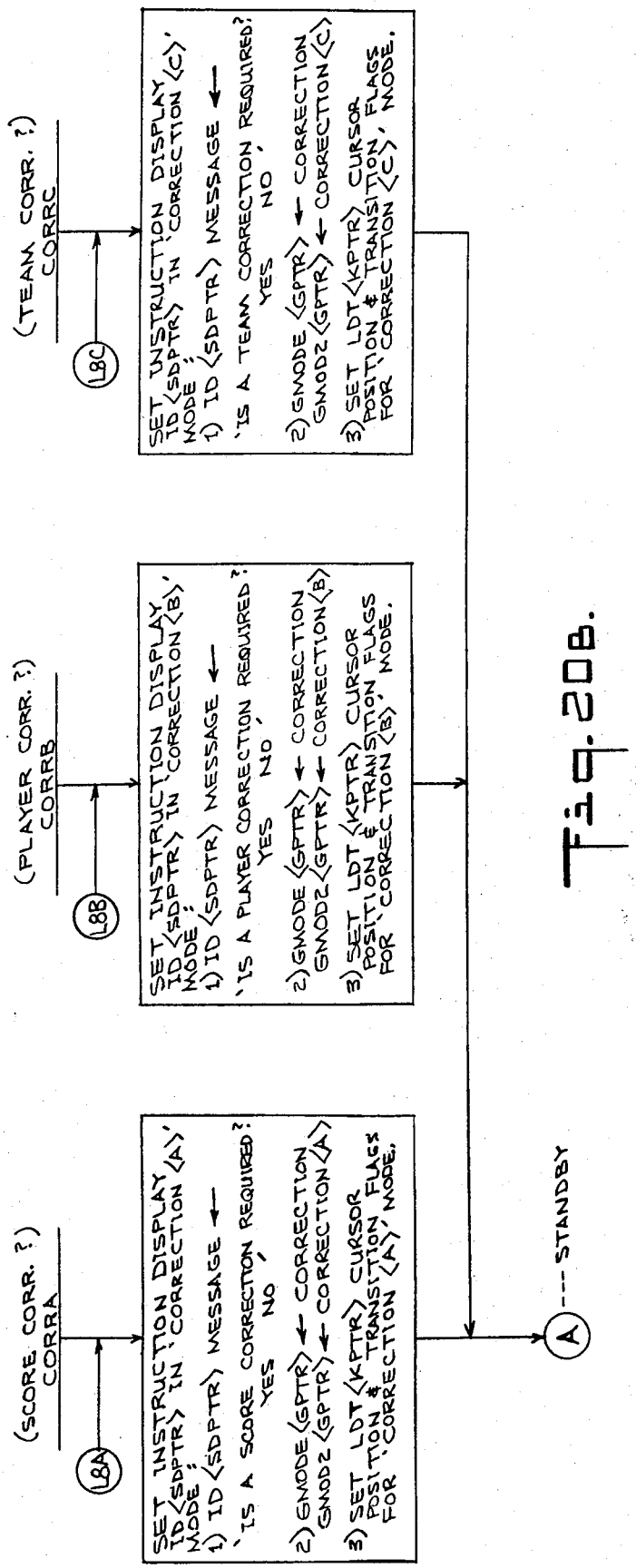
FIGS. 20a–t relate to correction mode control, computation and display routines for league bowling.
Figure 20E:
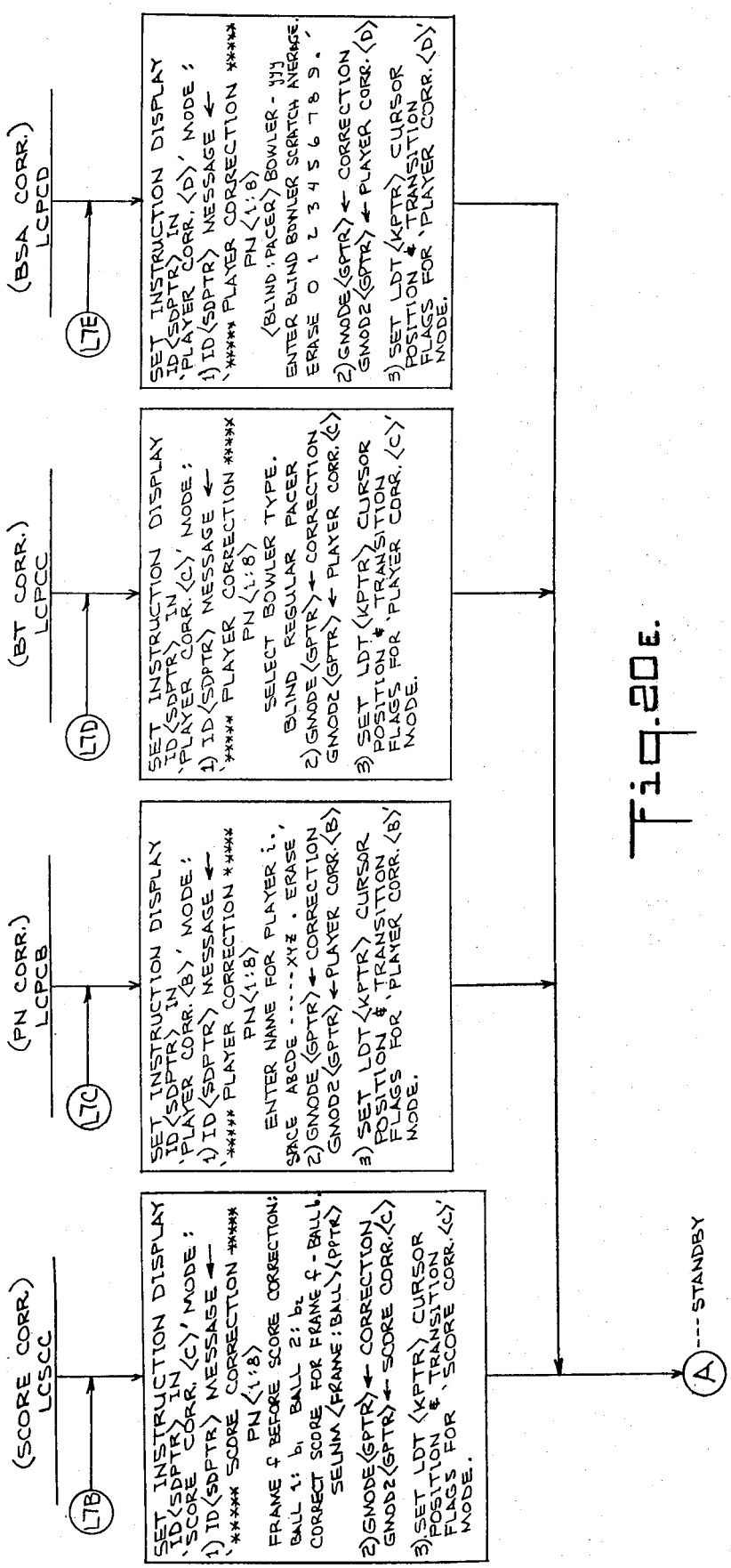
Figure 20F:
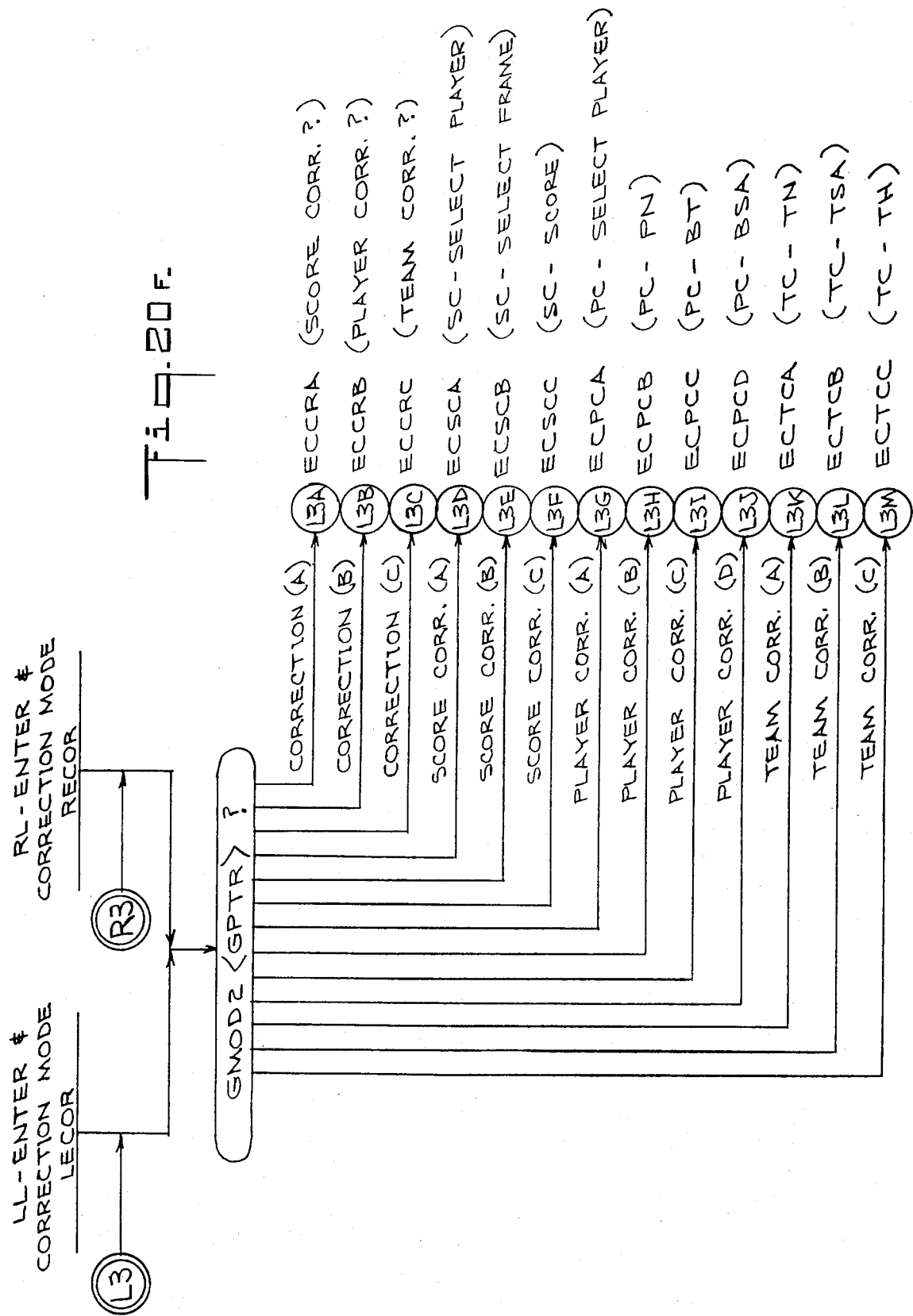
Figure 20J:
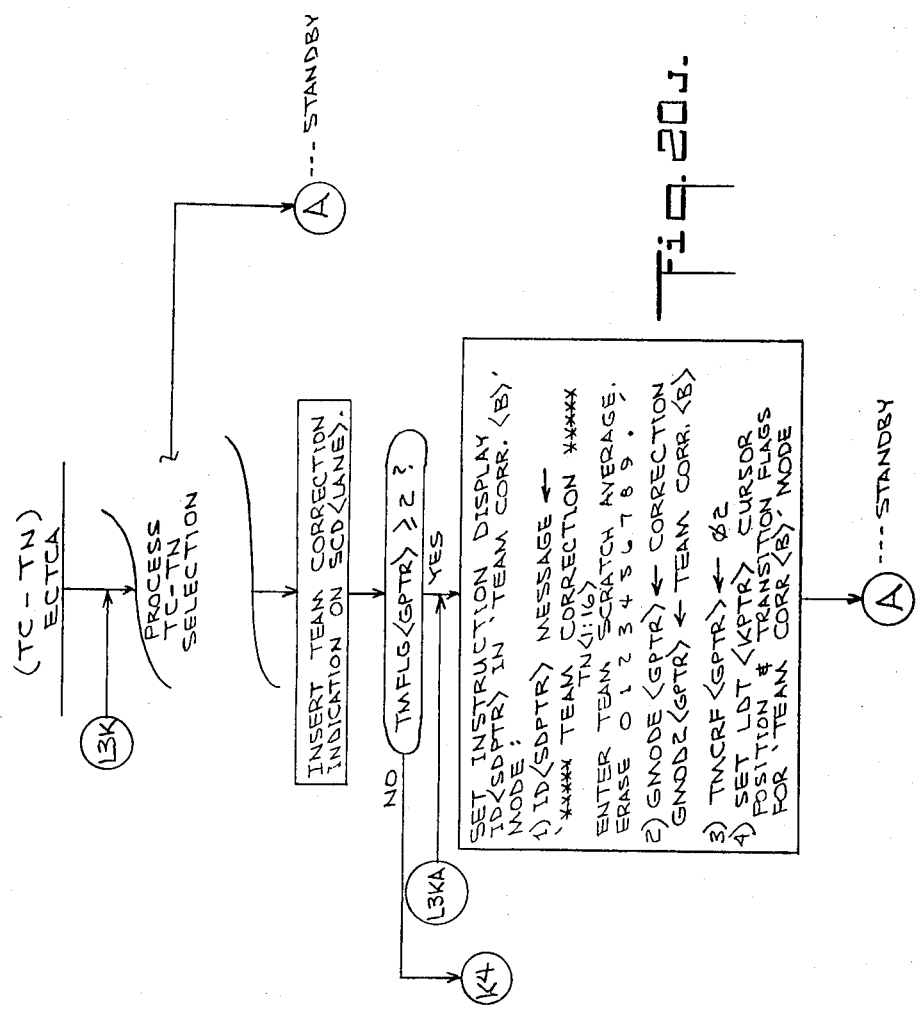
Figure 20I:
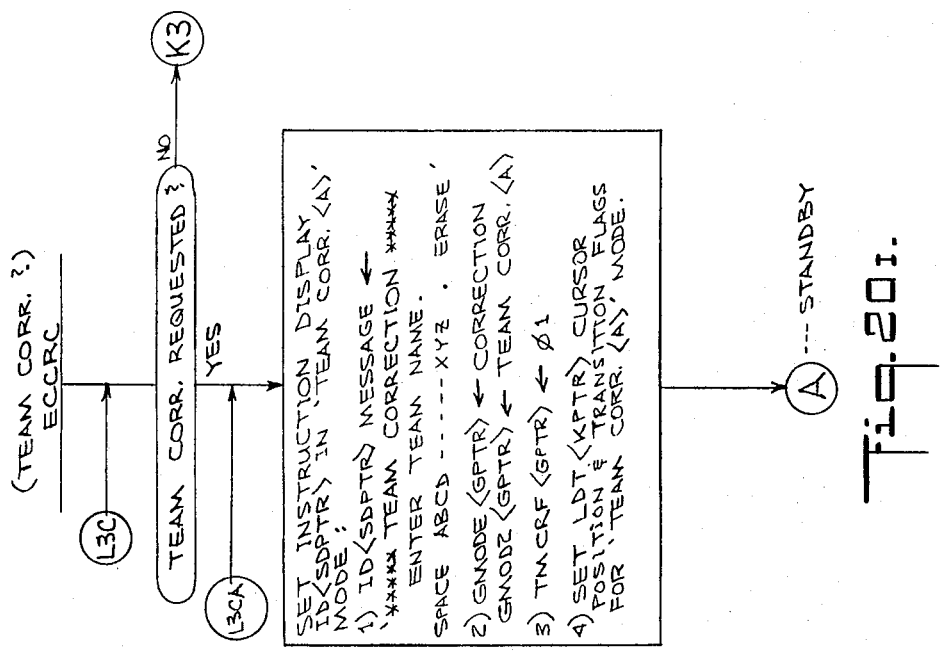
Figure 20L:
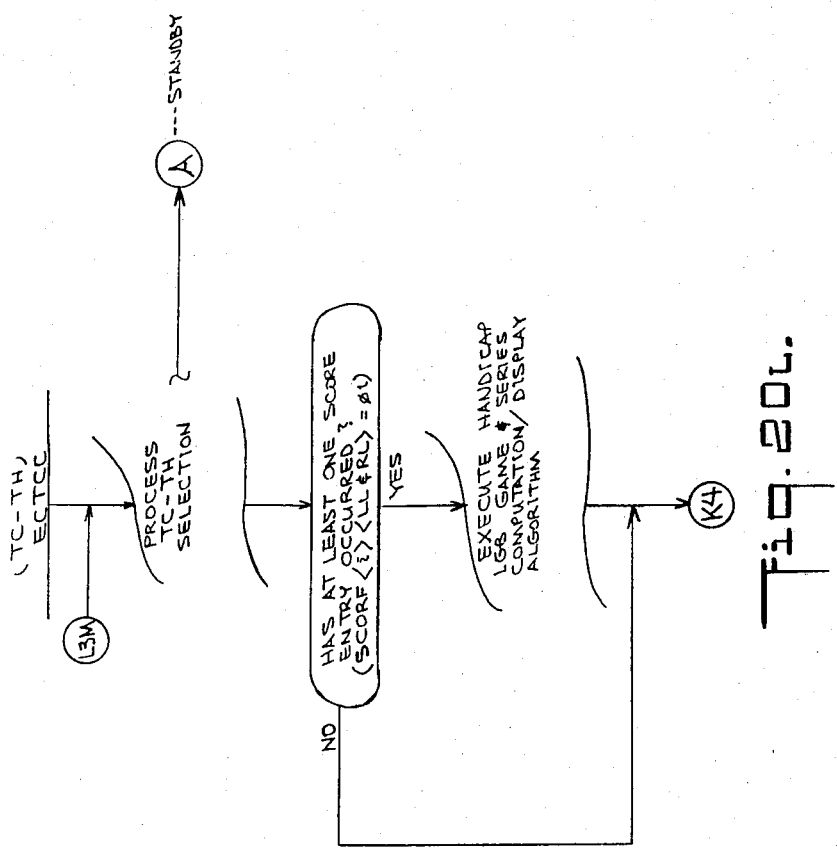
Figure 20K:
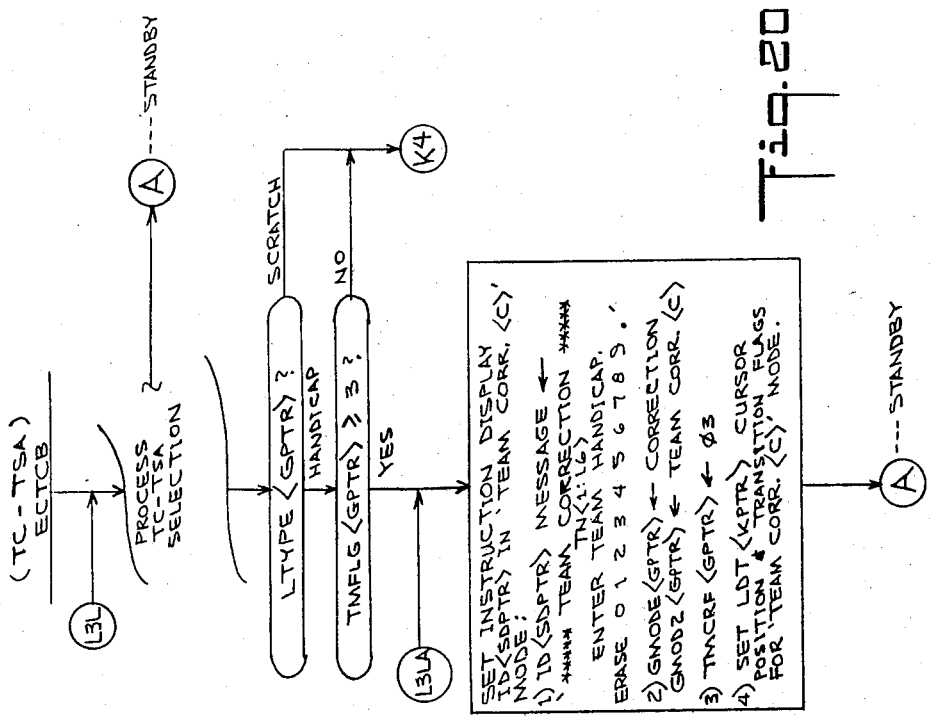
Figure 20A:
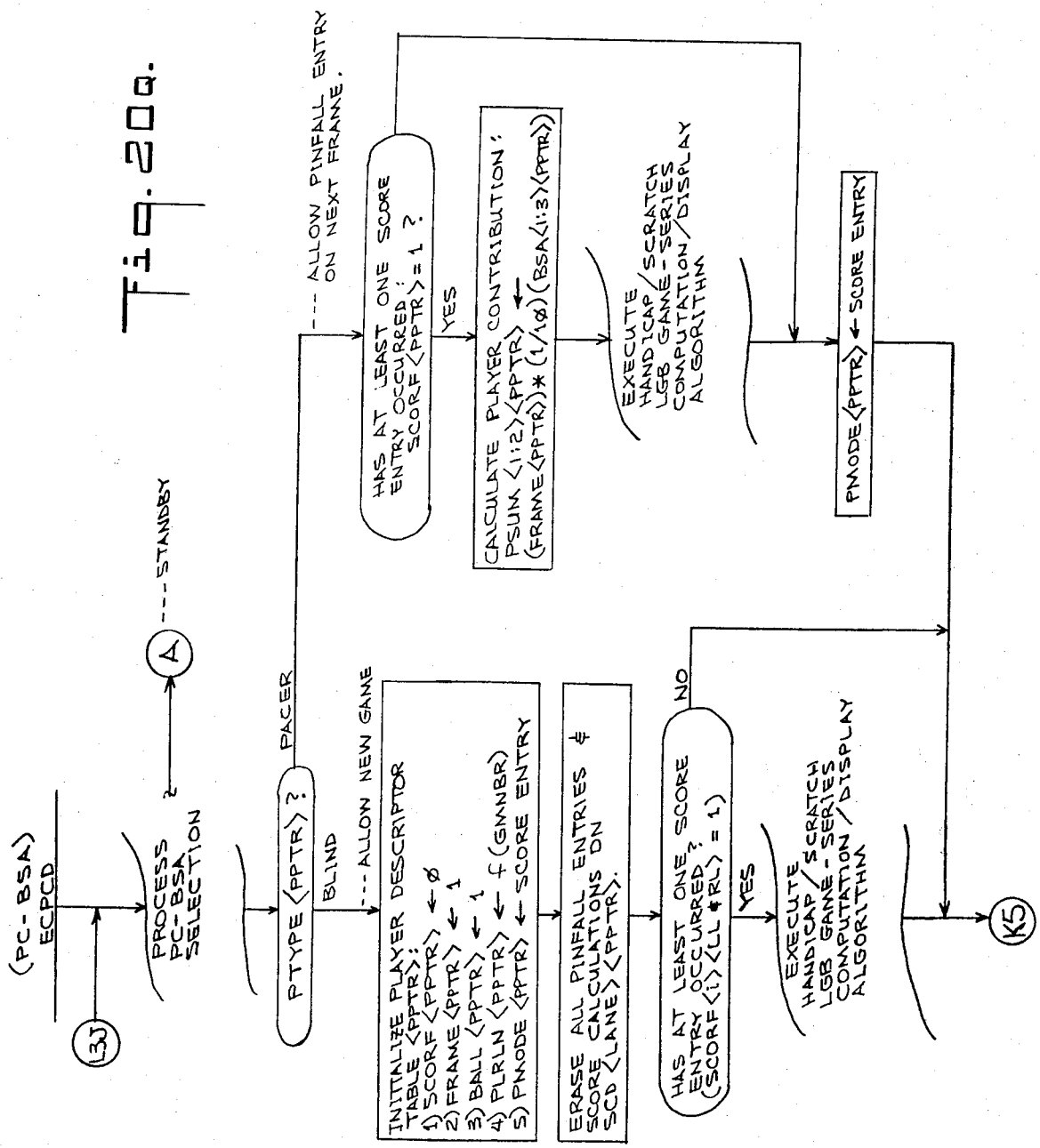
Figure 20T:
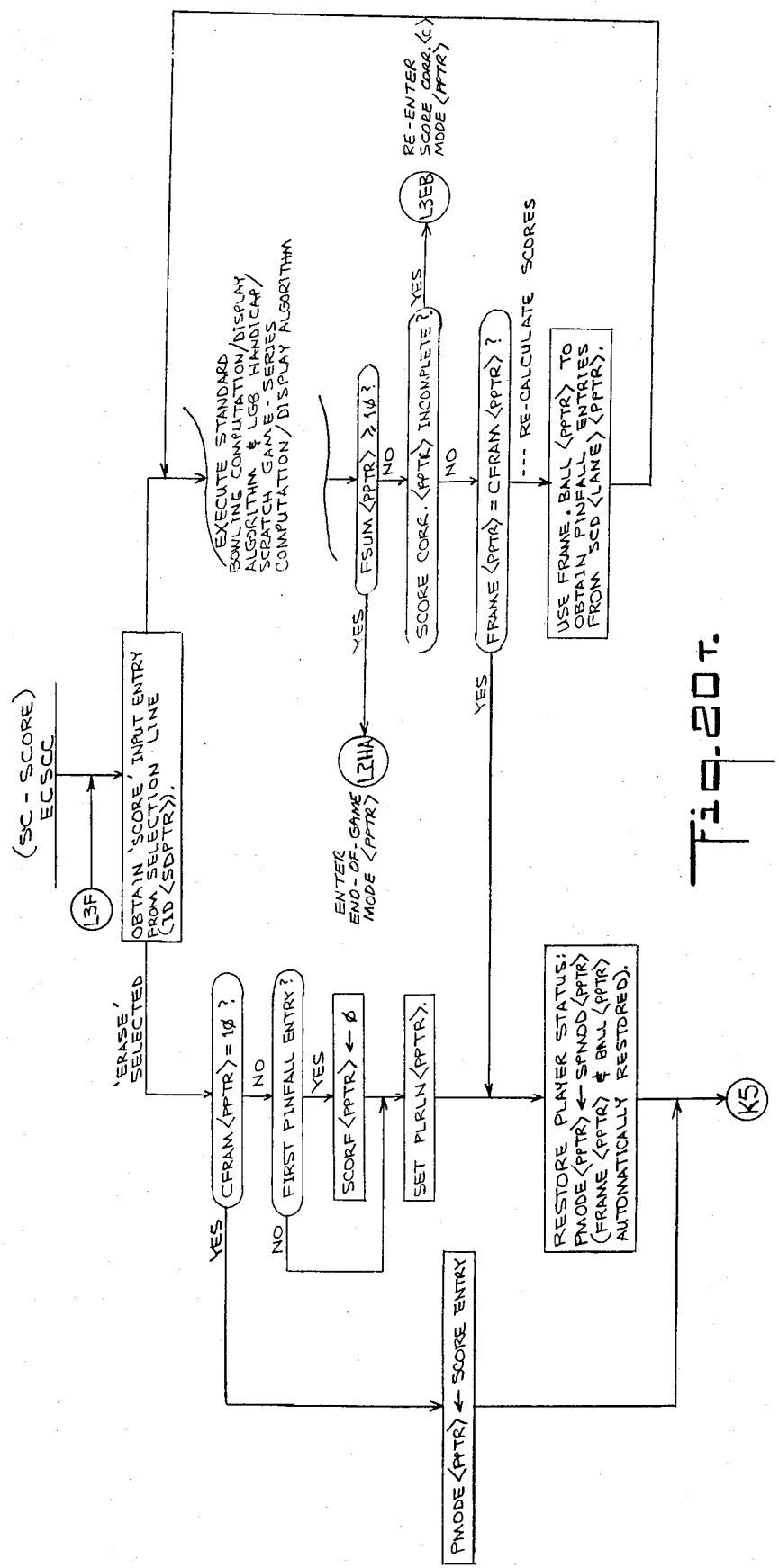
Figure 22B:
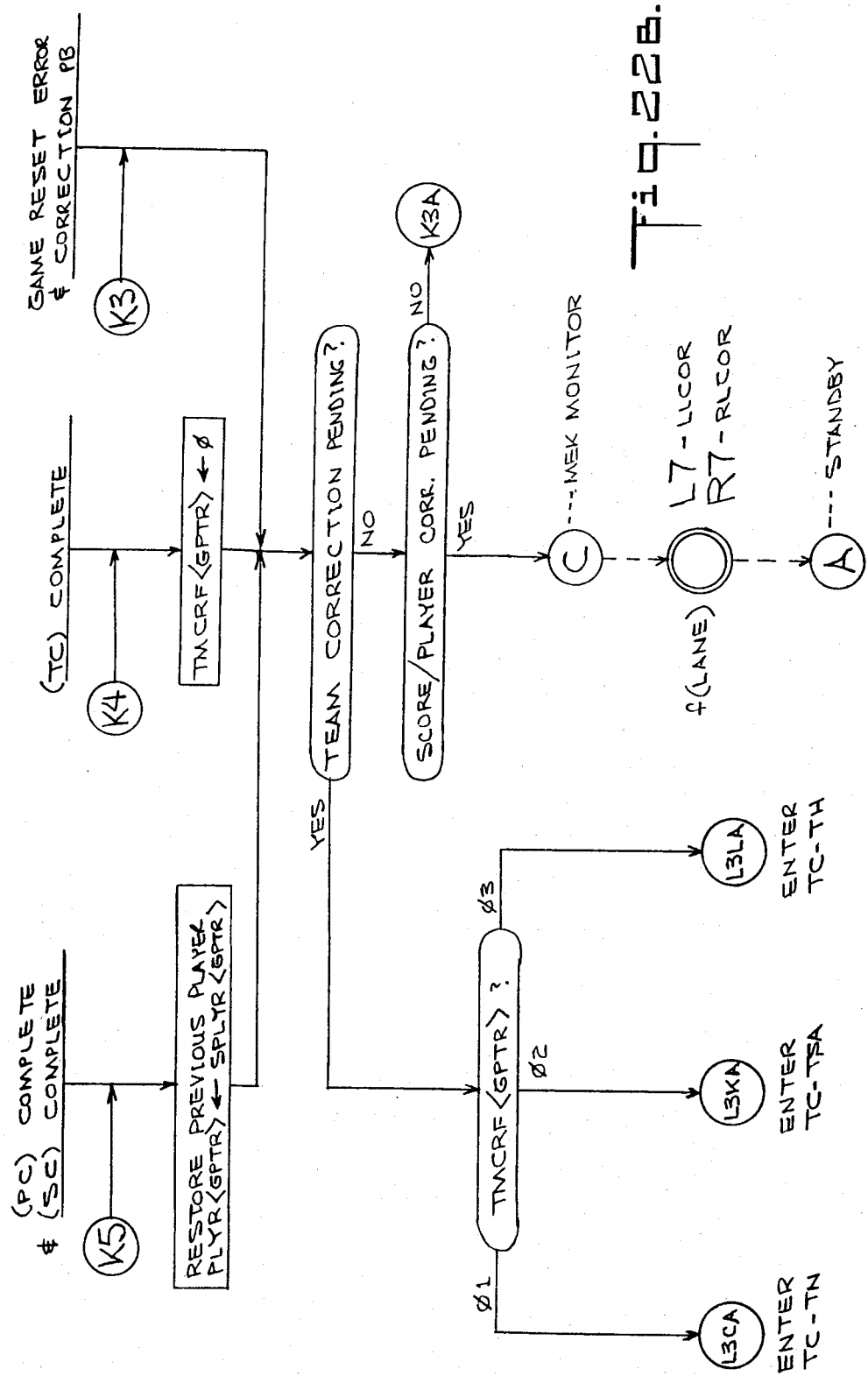
Figure 22C:
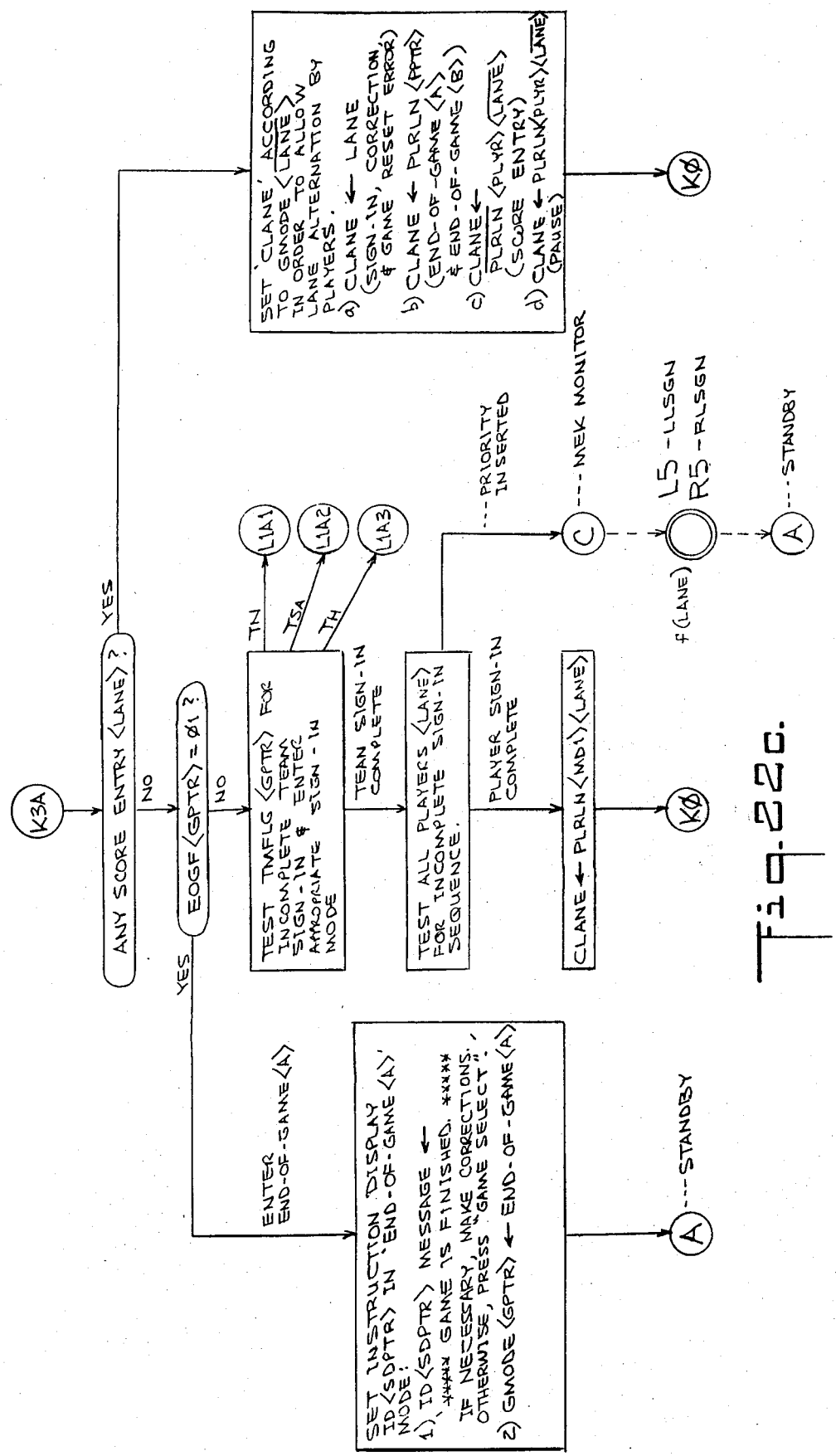
Figure 22E:
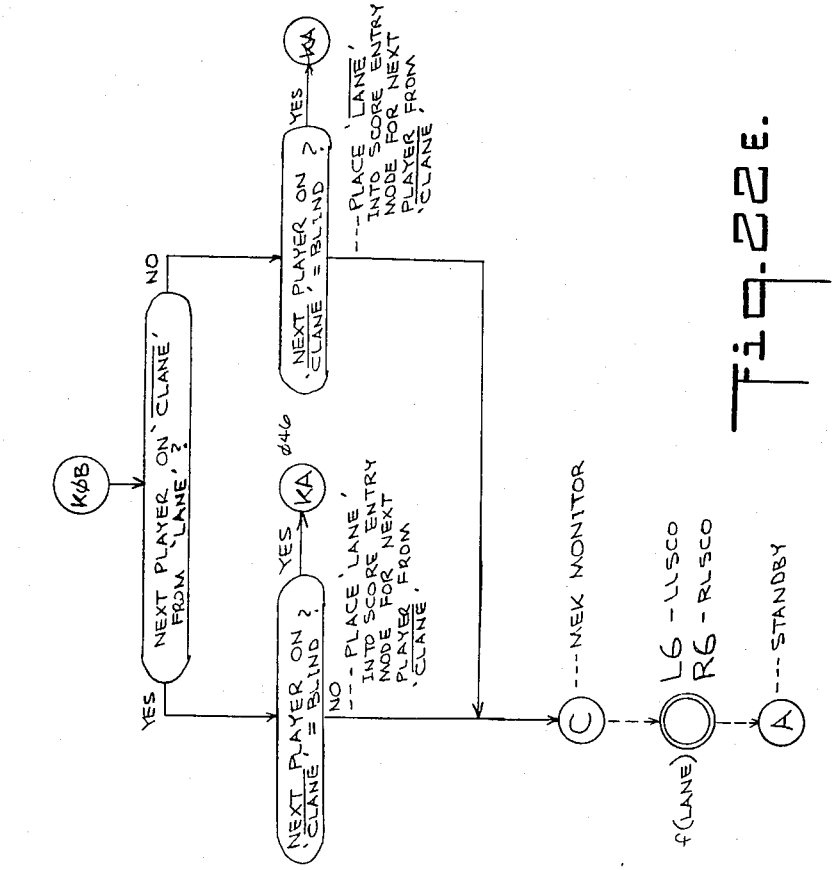
Figure 22D:
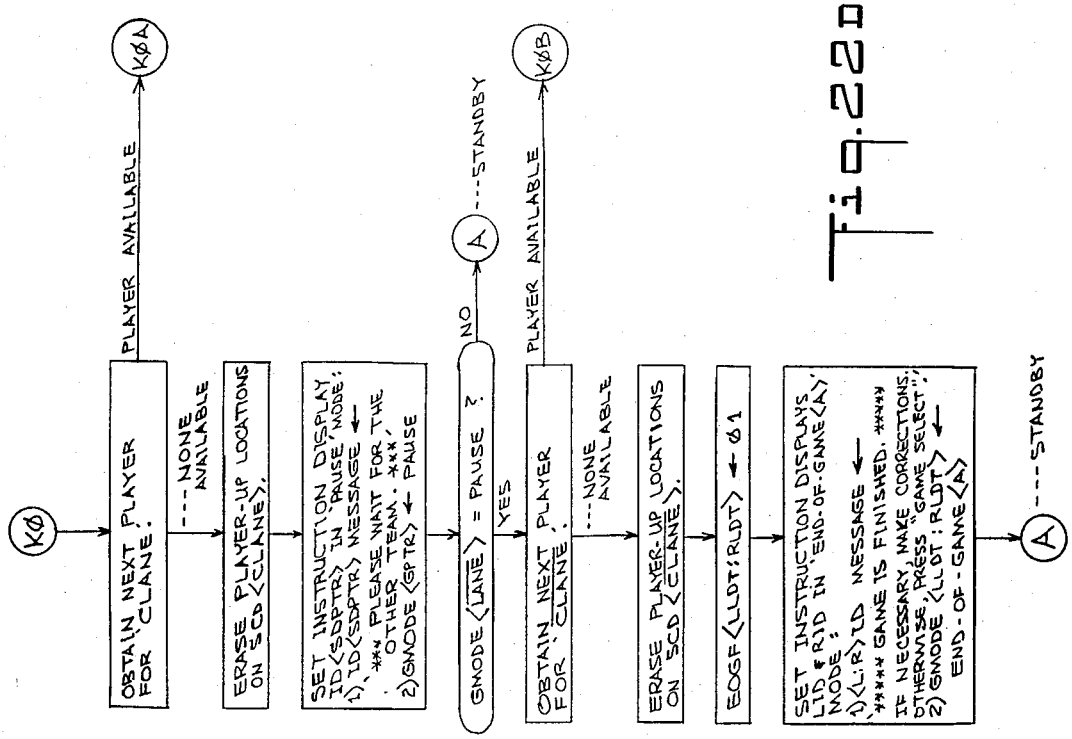

FIGS. 20a-t relate to correction mode control, computation, and display routines, and are associated particularly with external linkage points L8, R8. Therefore, it will be understood that such drawing figures express the algorithms used to effect team, player, and score corrections as described above with respect to FIGS. 4f-h. End-of-game mode control and display routines are shown in FIGS. 21a-e, wherein FIGS. 21a-c relate to the above-described external linkage points L4, R4, while FIGS. 21d-3 relate to such linkage points L9, R9.

Automatic control routines related to league bowling cycle control are shown in FIGS. 22a-h, which receive outputs from the sign-in, scoring, and correction routines, etc., referred to above, and which maintain predetermined instruction message priorities.

Each of a plurality of scoring systems such as described hereinabove may be coupled to a central data bank, for example as illustrated in FIG. 9, wherein that central data bank may be connected to a proprietor's console. Such a combination of scoring systems coupled to the main house processing unit is illustrated in FIG. 23 of the drawings. Each of the plurality of scoring systems is connected to the gaming unit memory, which may include a library of bowling game scoring formats, through communication lines GU, and, as also illustrated in FIG. 9, the data provided on the lines CDB may include pin-fall data transferred to the main data bank in response to each entry by a scorekeeper, as well as final-score data which may be transferred to the main data bank at the completion of a game. The above-described communications links between each of the scoring consoles, the proprietor's console, and the main data bank, provide various advantages wherein, for example, full data recovery may be attained after a power failure, since the central data bank may constitute a non-volatile memory. Also, it will be appreciated that all of the scoring will be available in the central data bank in the event it becomes necessary to transfer the scoring from one scoring system to another while a game is in progress. Another advantage of the system interconnections illustrated in FIG. 23 of the drawings, is that the scoring totals for league bowling games may be stored in the central data bank for subsequent data processing. Also, the bowler's handicaps may be recomputed and "written-in" between games of a series. Referring again to a league bowling advantages which result from the foregoing description of the invention, a proprietor, utilizing a control console, may address each of the scoring systems and enter data from the central data bank to "write-in" the instruction format, players' names and their advantages, so that such data, which is readily available in the central data bank, need not be entered by the scorekeeper. Accordingly, the sign-in procedures may be eliminated, since all of such data may be communicated directly to the respective scoring console memories under control of the proprietor's console.

Scoring formats for other bowling games are depicted in FIGS. 24-29, wherein the versatility of the above-described combination of elements, as depicted in FIG. 5, is illustrated. That is, due to the two-port memories constituting the border production and character production circuitry, a multitude of desired scoring formats may be presented on the scoring displays illustrated in FIG. 1. Referring first to FIG. 24, there is shown a standard open bowling score sheet for three bowlers, wherein only three scoring lines are presented on the scoring display for a single lane. This function of the invention is not attainable with known prior art scoring devices, since such prior art devices rely strictly on hardware for generating scoresheet formats. As shown in FIG. 24, the scoring on each frame is performed in the same manner as described above with respect to FIG. 3 wherein pin-fall entries are displayed, as well as large characters ($7 \times 9$ character matrix) indicating permanent frame scores, and smaller characters ($5 \times 7$ character matrix) indicating temporary frame scores. To effect the scoring format illustrated in FIG. 24, it is necessary only to replace the routines described with respect to the lower block in FIG. 13b with routines which perform the more limited functions depicted in the scoring sheet format of FIG. 24.

It will be understood that the routines utilized to generate the display of FIG. 24 will provide the necessary instruction messages to the scorer, by means of the instruction display, so that player name entries, pin-fall entries, corrections, etc., will be provided to instruct the scorekeeper to make the necessary data entries utilizing the keys of the manual entry keyboard depicted in FIG. 2, wherein the left half of the manual entry keyboard will be utilized to control the left scoring display. Accordingly, it will be appreciated that the characters "C", "7", "-", and "F", as shown in FIG. 24 are generated and displayed as described above with respect to FIG. 5.

Figure 25:
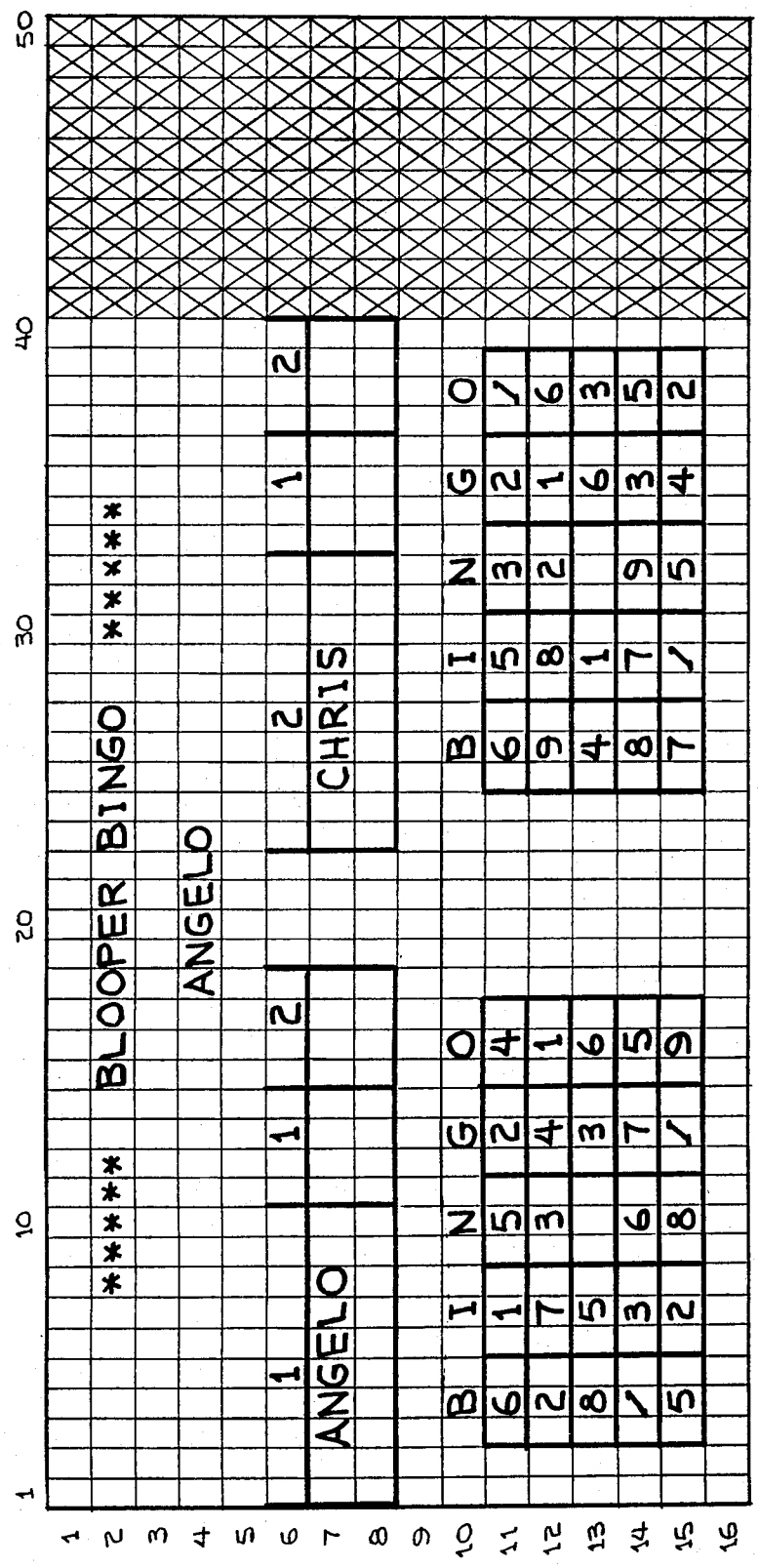

FIG. 25 also illustrates the versatility of score sheet presentations which may be provided by the combinations of elements shown in FIG. 5, and shows a game referred to as "Blooper Bingo" having a scoresheet format which is completely unlike standard bowling scoresheets. Again, the format of FIG. 25 will be presented on one of the scoring displays, controllable by the corresponding manual entry keyboard section aligned therewith, and will display two bingo cards together with associated player scoring lines. In this case, however, only two frames of scoring lines will be presented wherein entries made through the manual entry keyboard will be displayed in the line boxes. The control routines described with respect to FIGS. 13-17 apply to the control of the scoring system to effect the display of FIG. 25, wherein it is necessary only to replace the routines disclosed in the lowermost block of FIG. 13b, with instruction routines for scoring the bingo game. In this regard, the routines will treat strikes as "wild card" entries, permitting the bowler to blank out any desired bingo block. Also, the routines may permit the spelling out of the word "blooper", one letter at a time under a player's name if he rolls a frame score which does not appear on his card, or which has already been erased. Thus, for example, if the bowler using the leftmost bingo card format shown in FIG. 25, bowls a seven in frame one, the instruction sheet format on the instruction display, controlled by the manual entry keyboard, will permit a selection of I7 or G7, and by aligning the cursor, controlled by the arrow key on the keyboard, and by pressing the enter key, the player may erase the desired entry I7 or G7 from the card. It will be appreciated from the foregoing description that many variations of bowling games can be scored utilizing the apparatus disclosed in FIG. 5, and it will be appreciated further that specialized games, such as Blooper Bingo, cannot be scored by automatic scoring systems which have devices for sensing actual pin-fall. Furthermore, applicant knows of no prior system allowing the selection of a plurality of scoresheet formats for presentation on a scoring display.

Figure 26:
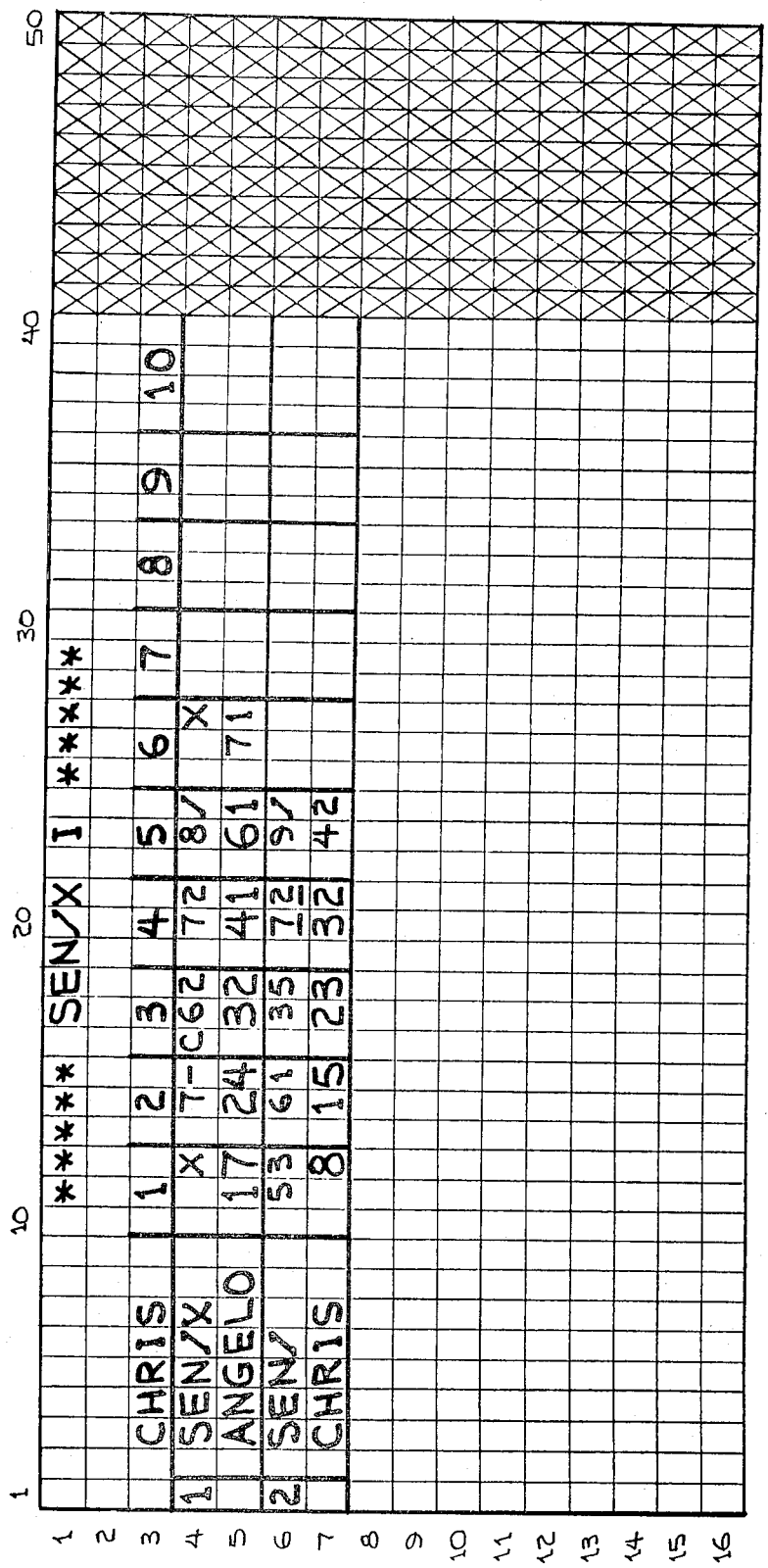

In FIG. 26 there is shown another bowling game scoring format characterized as a "SEN/X" game corresponding to the initials of Seven, Eight and Nine, and the characters "/" (spare), and "X" (strike). The object of this game is to roll sequential frames having scores of 7, 8, 9, spare, and strike, whereupon each letter of the word SEN/X is sequentially presented above the bowler's name on the score sheet display format. As illustrated in FIG. 26, the first bowler succeeded in rolling the sequence of frame scores in the second through sixth frames, thereby spelling out the word SEN/X above his name, whereas the second bowler was successful in rolling the first four of the sequential frame scores in frames 2-5, thereby causing the generation of the characters SEN/ above his name, whereas, as shown in FIG. 26, the scorekeeper has not yet entered a score for the second bowler's sixth frame. As in the case of the other scoring formats depicted in the drawings, the character and border memories described with respect to FIGS. 12a and b, may be controlled to provide the format of FIG. 26 as controlled by the routines disclosed in FIGS. 13-17, wherein the routines described in the lowermost portion of FIG. 13b would be replaced by specialized programming to provide instructions for scoring the SEN/X game.

Figure 27:
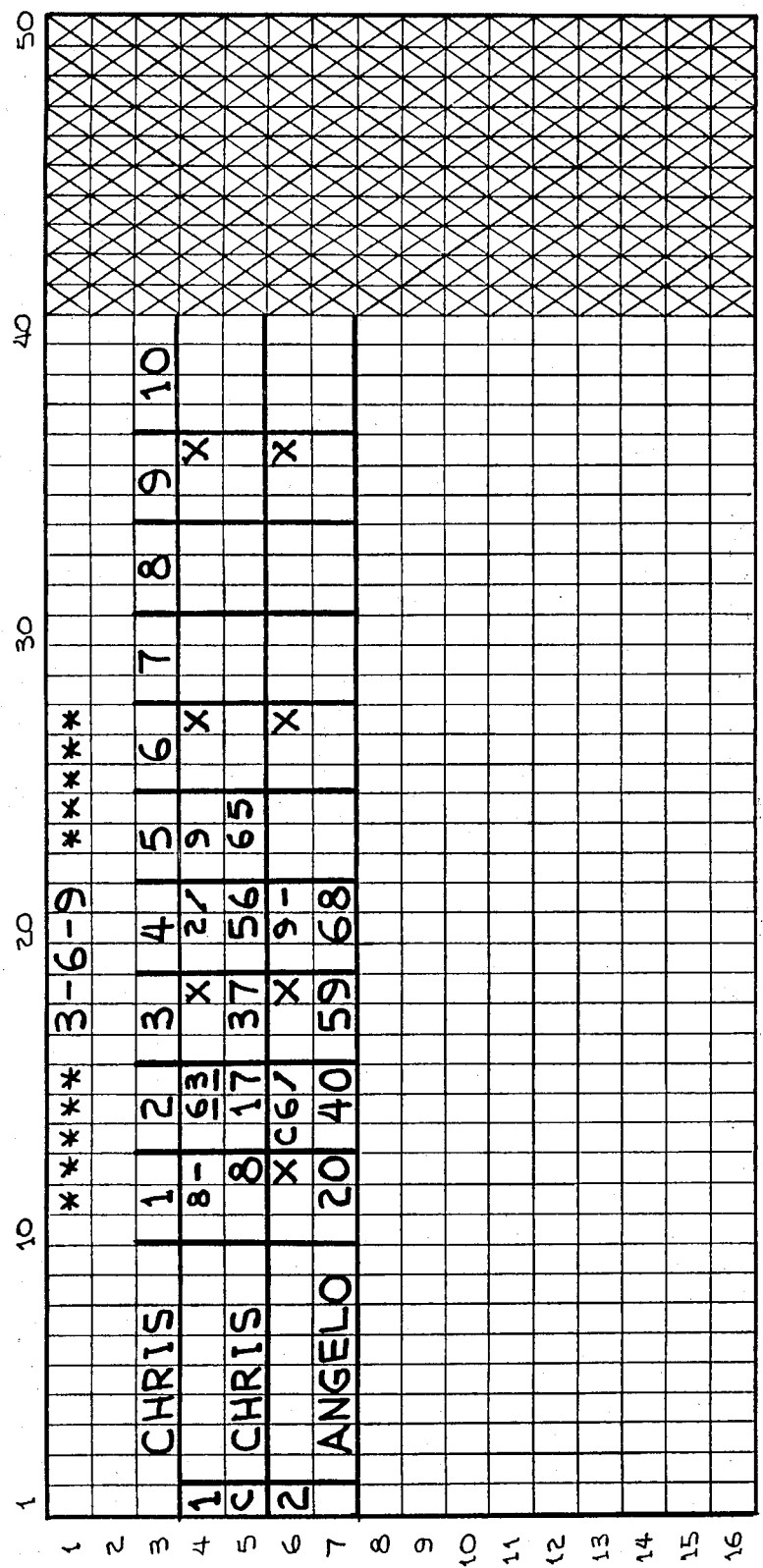

As a further demonstration of the versatility of the combination of elements disclosed wherein, there is depicted in FIG. 27 a format for a "3-6-9" game, wherein a strike score is automatically entered in the third, sixth and ninth frames of the scoring lines for the bowlers. Aside frm this modification in the scoring routines, the display and the control thereof is effected in the same manner described above with respect to FIG. 24. Again, the modifications necessary to present the "3-6-9" scoring format may be conducted with respect to the lowermost portion in FIG. 13b.

Two additional scoring formats among the myraid number which may be attained with the apparatus disclosed herein are shown in FIGS. 28 and 29, which refer respectively to scoring formats for handicap singles and doubles tournaments. Looking first to FIG. 28, relating to a format for a singles tournament, it will be appreciated that the format and scoring entries made therein are smaller to those described above with respect to FIG. 3, although the league scoring information associated with FIG. 3 does not apply to FIG. 28. That is, with respect to FIG. 28, player identification and handicap information will be entered on the keyboard as set forth with relation to FIG. 3, as well as frame correction information, and the display will also present pin-fall, and permanent and temporary frame scores, as described with respect to FIG. 3. On the other hand, the format of FIG. 28 presents, below the score sheet presentation, the game and series totals for each bowler. Accordingly, when utilizing the scoring apparatus disclosed herein for a handicap singles tournament, four bowlers would take turns utilizing a pair of adjacent lanes, whereas the scoring displays shown in FIG. 2 would be controlled by their associated manual entry keyboard portions, in accordance with scoring instructions depicted on the instruction displays aligned therewith. In the format of FIG. 28 it is seen, for example, that for Game 2, the first bowler had a score of 172 pins, which, when added to his handicap of 32 pins, provides a game total of 204, as depicted below his name. Again, the only modification of control routines necessary to affect the scoring format of FIG. 28, as compared to that of FIG. 3, involves the lowermost block of FIG. 13b.

FIG. 29 illustrates a format for a handicap doubles tournament wherein the scratch scores and handicap scores of each player are added together to obtain a total team score. As shown in the lower right-hand portion of FIG. 29, a running total of scratch scores for the bowlers is depicted, and immediately below the scoring lines of the format there is provided a table showing the game and series totals for the team. Here again, the only modification of the control routines necessary to effect the scoring program depicted in FIG. 29 involves the substitution of programs for those shown in the lowermost portion of FIG. 13b.

In summary, there is disclosed herein a manual-entry electronic bowling scorer, wherein electronic displays are controlled by video generating circuitry to provide a multitude of score sheet formats by utilizing a separate two-port border and character memories. Scoring instruction messages are provided on separate displays to permit scoring entries utilizing a minimum number of data entry keys. While a preferred embodiment of the invention has been disclosed herein, it will be appreciated that many modifications of such embodiments may be made by those skilled in the art, but that such modifications will be encompassed by the invention as expressed in the following claims.

What is claimed is:

1. In a manual-entry electronic scoring system for bowling, including a video scoring display and a manual entry keyboard for entering scoring data to be processed and applied to the scoring display, the improvement comprising:

a data processing unit for providing instruction signals in response to entries from said manual entry keyboard;

a video instruction display for displaying sequential messages to instruct a scorekeeper as to entries to be made on the keyboard;

video signal generating means coupled to drive said instruction display;

memory means coupled to receive signals from said data processing unit, and coupled to said video signal generating means for providing data to define the content of instruction messages to be displayed on said introduction display; and display control means coupled to said memory for selecting memory data to be coupled to said video signal generating means.

2. An improved manual-entry electronic scoring system, as set forth in claim 1, further comprising another video signal generating means coupled to drive said scoring display, and another memory means coupled to said scoring display video generating means for providing the scoring information to be applied to said scoring display, wherein at least a major portion of both of said displays are divided into identical display matrixes defining character field areas in which characters can be displayed, and wherein said control means comprises a common display control accessing means coupled to both said memory means for causing both said memory means to supply refresh information to each said display.

3. An improved manual-entry electronic scoring system, as set forth in claim 2, wherein said scoring display memory means includes separate character and border memories and wherein said border memory is for storing data to be applied to said video signal generating means to present scoring format lines at the edges of each of said character fields of said scoring display to define any desired scoresheet format.

4. An improved manual-entry electronic scoring system, as set forth in claim 3, wherein said memories comprise two-port refresh memories, each of which is coupled to said control means and said data processing unit.

5. An improved manual-entry electronic scoring system, as set forth in claim 2, wherein said memories comprise two-port refresh memories, each of which is coupled to said control means and said data processing unit.

6. An improved manual-entry electronic scoring system, as set forth in claim 2, wherein the video signal generating means for said scoring display comprises a device for generating at least two different size characters, and for underlining such characters, and wherein the smaller of said different size characters correspond to pin-fall entries and the larger of said characters correspond to frame score entries.

7. An improved manual-entry electronic scoring system, as set forth in claim 6, wherein the smaller of said two different size characters correspond also to temporary frame score entries and the larger of said different size characters correspond to permanent frame score entries.

8. An improved manual-entry electronic scoring system, as set forth in claim 2, wherein the video signal generating means for said scoring display comprises a device for generating at least two different size characters, and for underlining such characters, and wherein the smaller of said two different size characters correspond to temporary frame score entries and the larger of said different characters correspond to permanent frame score entries.

9. An improved manual-entry electronic scoring system, as set forth in claim 1, wherein said instruction display is controlled by said memory means to display a plurality of possible selections to be made by the scorekeeper, for entry through said keyboard.

10. An improved manual-entry electronic scoring system, as set forth in claim 9, wherein said instruction display presents a cursor for alignment with a selected one of said possible data selections presented on the instruction display, and wherein said keyboard includes three selection keys, including first and second cursor, keys, for advancing the cursor in opposite directions, and an entry for entering a data selection corresponding to the selection indicated by the cursor.

11. An improved manual-entry electronic scoring system, as set forth in claim 9, said plurality of possible selections, in the case where an instruction is displayed related to entry of a bowlers second ball score, includes a limited number of selections corresponding to the possibilities remaining after the first ball score is entered.

12. An improved manual-entry electronic scoring system, as set forth in claim 1, further comprising another video signal generating means coupled to drive said scoring display, and another memory means coupled to said scoring display video generating means for defining the scoring information to be applied to said scoring display, wherein the video generation signal means for said scoring display comprises means for generating at least two different size characters, and for underlining such characters.

13. An improved manual-entry electronic scoring system, as set forth in claim 1, further comprising another video signal generating means coupled to drive said scoring display, and another memory means coupled to said scoring display video generating means for defining the scoring information to be applied to said scoring display, wherein the video generation signal means for said scoring display comprises means for generating at least two types of characters for differentiating between temporary and permanent frame scores to be presented on said scoring display.

14. An improved manual-entry electronic scoring system, as set forth in claim 1, further comprising another video signal generating means coupled to drive said scoring display, and another memory means coupled to said scoring display video generating means for defining the scoring information to be applied to said scoring display, wherein the video generation signal means for said scoring display comprises a device for generating at least two different size characters, and for underlining such characters, and wherein the smaller of said different size characters correspond to pin-fall entries and the larger of said characters correspond to frame score entries.

15. An improved manual-entry electronic scoring system, as set forth in claim 1, further comprising another video signal, generating means coupled to drive said scoring display, and another memory means coupled to said scoring display video generating means for defining the scoring information to be applied to said scoring display, wherein the video generation signal means for said scoring display comprises a device for generating a least two different size characters, and for underlining such characters, wherein the smaller of said different size characters correspond to pin-fall entries, and wherein the smaller of said two different size characters correspond also to temporary frame score entries and the larger of said different characters correspond to permanent frame score entries.

16. An improve manual-entry electronic scoring system, as set forth in claim 1, further comprising another video signal generating means coupled to drive said scoring display, and another memory means coupled to said scoring display video generating means for defining the scoring information to be applied to said scoring display, wherein at least a major portion of both of said displays are divided into identical display matrixes defining character field areas in which characters can be displayed, wherein said scoring display memory means includes separate character and border memories and wherein said border memory is for storing data to be applied to said video signal generating means to present scoring format lines at the edges of each of said character fields of said scoring display to define any desired scoresheet format.

17. An improved manual-entry electronic scoring system, as set forth in claim 16, wherein the video generation signal means for said scoring display comprises a device for generating at least two different size characters, and for underlining such characters.

18. An improved manual-entry electronic scoring system, as set forth in claim 16, wherein the video generation signal means for said scoring display comprises a device for generating at least two different size characters, and wherein the smaller of said different size characters correspond to pin-fall entries and the larger of said characters correspond to frame score entries.

19. An improved manual-entry electronic scoring system, as set forth in claim 16, wherein the video generation signal means for said scoring display comprises a device for generating at least two different size characters, and for underlining such characters, and wherein the smaller of said two different size characters correspond to temporary frame score entries and the larger of said different characters correspond to permanent frame score entries.

20. An improved manual-entry electronic scoring system, as set forth in claim 16, wherein the video generation signal means for said scoring display comprises a device for generating at least two different size characters, and for underlining such characters, and wherein the smaller of said different size characters correspond to pin-fall entries, and wherein the smaller of said two different size characters correspond to temporary frame score entries and the larger of said different characters correspond to permanent frame score entries, and wherein said data processing unit, said scoring memory, and said video signal generating means for the scoring display further comprise means for applying video signals to said scoring display to present total game scores and total series simultaneously with said scoresheet formats.

21. An improved manual-entry electronic scoring system, as set forth in claim 16, wherein the video generation signal means for said scoring display comprises a device for generating at least two different size characters, and for underlining such characters, and wherein the smaller of said different size characters correspond to pin-fall entries, and wherein the smaller of said two different size characters correspond to temporary frame score entries and the larger of said different characters correspond to permanent frame score entries, and wherein said data processing unit, said scoring memory, and said video signal generating means for the scoring display further comprise means for applying video signals to said scoring display to present comparison scores, simultaneously with said scoresheet formats, related to the total series, and total game scores for a group of bowlers, wherein the frame scores for such bowlers are presented on the scoring display, as compared to the total series scores of a different selected group of bowlers.

22. An improved manual-entry electronic scoring system, as set forth in claim 16, wherein the video generation signal means for said scoring display comprises a device for generating at least two different size characters, and for underlining such characters, and wherein the smaller of said different size characters correspond to pin-fall entries, and wherein the smaller of said two different size characters correspond to temporary frame score entries and the larger of said different characters correspond to permanent frame score entries, and wherein said data processing unit, said scoring memory, and said video signal generating means for the scoring display further comprise means for applying video signals to said scoring display to present total game and series scores after each pin-fall entry is made on the keyboard, said total scores being presented simultaneously with said scoresheet formats.

23. An improved-manual entry electronic scoring system, as set forth in claim 1, further comprising a library memory embodying means for storing a plurality of different routines including instruction messages corresponding to the scoring of different bowling games, such as for open bowling, tournament, and league play, for application to said control means to provide different sequential instruction messages on said instruction display.

24. An improved manual-entry electronic scoring system, as set forth in claim 1, wherein said instruction messages display a plurality of possible selections to be made by the scorekeeper, for entry through said keyboard, and further comprising a library memory embodying means for storing a plurality of different routines including instruction messages corresponding to the scoring of different bowling games, for application to said control means to provide different sequential instruction messages on said instruction display.

25. An improved manual-entry electronic scoring system, as set forth in claim 1, wherein said instruction messages display a plurality of possible selections to be made by the scorekeeper, for entry through said keyboard; said display presents a cursor for alignment with a selected one of the possible data entries presented on the instruction display; said keyboard includes three selection keys, including first and second cursor control keys, for advancing the cursor in opposite directions, and an entry key for entering a data selection corresponding to the selection indicated by the cursor; and, further comprising a library memory embodying means for storing a plurality of different routines including messages corresponding to the scoring of different bowling games, for application to said control means to provide different sequential instruction messages on said instruction display.

26. An improved manual-entry electronic scoring system, as set forth in claim 1, further comprising a central data bank memory for storing league bowling data including players' names and averages, for later access by said data processing unit.

27. An improved manual-entry electronic scoring system, as set forth in claim 1, further comprising a library memory embodying means for storing a plurality of different routines including messages corresponding to the scoring of different bowling games, such as open bowling, tournament and league play, and further comprising a central data bank memory for storing league bowling data, including player names and averages, for later access by said data processing unit, for application to said control means to provide different messages to said instruction displaying.

28. An improved manual-entry electronic scoring system, as set forth in claim 1, wherein the elements defined therein are associated with one bowling lane, and further comprising a second set of elements including a second scoring display, a second manual entry key-board for entering scoring data to be processed and applied to the second scoring display, a second video instruction display for displaying sequential messages to instruct a scorekeeper as to entries to be made on the second keyboard, a second video signal generating means to drive said second instructions display, and a second memory means coupled to receive signals from said data processing unit, and coupled to said second video signal generating means for providing data to define the content of instruction messages to be displayed on said second instruction display, wherein the data processing unit and control means are connected in common to said two sets of elements, and wherein said scoring system is operable with respect to two adjacent bowling lanes.

29. An improved manual-entry electronic scoring system, as set forth in claim 28, wherein said data processing unit, said scoring memories, and said video signal generating means for the scoring display further comprise means for indicating which of said scoring data corresponds to games which were won by the bowlers whose scores are presented on the respective scoring displays.

30. An improved manual-entry electronic scoring system, as set forth in claim 28, wherein said data processing unit, said scoring memories, and said video signal generating means for the scoring displays further comprise means for applying video signals to said scoring displays to present comparison scores related to the total series and total game scores for a group of bowlers, wherein the frame scores for such bowlers are presented on one scoring display, as compared to total series scores presented on the second said scoring display.

31. An improved manual-entry electronic scoring system, as set forth in claim 28, wherein said data processing unit, said scoring memories, and said video signal generating means for the scoring displays further comprise means for applying video signals to said scoring displays to present total game and series scores after each pin-fall entry is made on the keyboards.

32. An improved electronic scoring system for bowling, as set forth in claim 1, further comprising a central data bank memory for storing league bowling data, including players' names and averages, for later access by said data processing unit.

33. An improved electronic scoring system for bowling, as set forth in claim 32, wherein said data processing unit includes means for generating game and calculation information, and further comprising a non-volatile memory for storing said game and calculation information from said data processing unit during the exercise of scoring procedures, wherein the loss of data resulting from power failures or equipment failures is precluded, and data recovery from said central data bank is permitted.

* * * * *